United States Patent Office 3,169,957
Patented Feb. 16, 1965

3,169,957
TRITERPENOID ACID DERIVATIVES AND COMPOUNDS PRODUCED THEREFROM
Josef Fried, Princeton, and Gerald W. Krakower, Elizabeth, N.J., assignors to Olin Mathieson Chemical Corporation, New York, N.Y., a corporation of Virginia
No Drawing. Filed May 29, 1962, Ser. No. 198,425
26 Claims. (Cl. 260—239.5)

This invention relates to and has as its objects the provision of new physiological active steroids, methods for preparing the same, and new intermediates useful in said preparation.

The final products of this invention can be represented by the formulae:

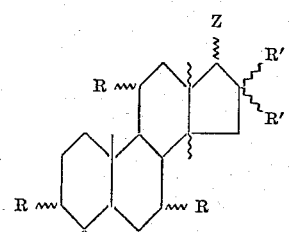

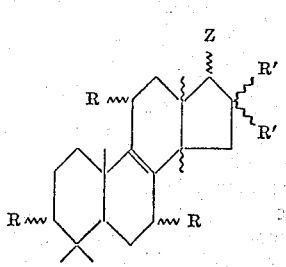

and

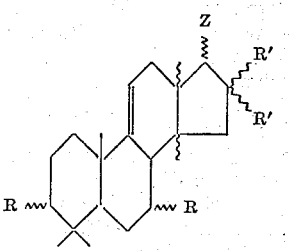

wherein Z is selected from the group consisting of hydrogen, hydroxy, oxo (O=), acyloxy and alkanoyl; R' may be the same or different and is selected from the group consisting of hydrogen, hydroxy and acyloxy, and together R' may be oxo (O=); and R may be the same or different and is selected from the group consisting of hydrogen, hydroxy, oxo (O=), and acyloxy. (Whenever, in this application and the claims appended hereto, a curved line [$] is employed in the linkage of atoms in a formula, it is meant to denote that the connected atom may be either in the alpha or beta position as is determined in the respective compounds.)

The preferred acryloxy radicals are those of hydrocarbon carboxylic acids of less than twelve carbon atoms, as exemplified by the lower alkanoic acids (e.g., acetic, propionic butyric and tert-pentanoic acids), the lower alkenoic acids, the monocyclic aryl carboxylic acids (e.g., benzoic and toluic acids), the monocyclic aryl lower alkanoic acids (e.g., phenacetic and β-phenylpropionic acids), the cycloalkane carboxylic acids and the cycloalkene carboxylic acids.

The alkanoyl groups preferably employed in the practice of this invention may be either straight or branched chain and are those having less than ten carbon atoms, for example, hexanoyl, pentanoyl, heptanoyl, lower alkyl-alkanoyl, such as methyl-hexanoyl, or di-lower alkyl-alkanoyl, such as dimethylhexanoyl.

The compounds of this invention are physiologically active steroids which possess protein-anabolic activity and which may be used in place of such known protein-anabolic steroids as 17-ethyl-17-nortestosterone in the treatment of post-operative shock and other conditions where tissue degeneration has occurred. Administration of the products of this invention may be accomplished either perorally or parenterally, in the same manner as 17-ethyl-19-nortestosterone, for example, the dosage and/or concentration being adjusted for the relative potency of the particular steroid. In addition, compounds of this invention are physiologically active steroids which possess androgenic activity and may be used in place of such known androgenically active steroids as testosterone in the treatment of eunuchoidism being formulated for such administration in the same manner and/or dosage as testosterone. It has also been found that compounds of this invention are physiologically active steroids which possess antiandrogenic activity, i.e., they inhibit the action of androgens, and they can be used in the treatment of such conditions as hyperandrogenic acne. The compounds may be formulated for such administration, the concentration and/or dosage being based on the activity of the particular compound and the requirements of the patient.

The final products of this invention are prepared by the process of this invention which entails a number of steps beginning with a triterpenoid acid as a starting material. By a triterpenoid acid, it is here meant a polymethylsteroid having a D-ring structure represented by the formula

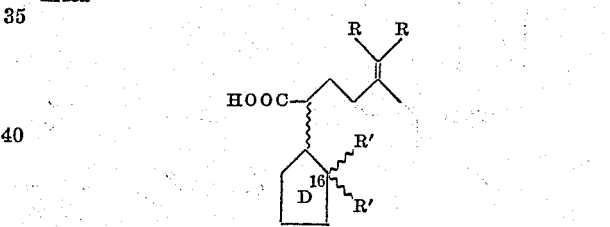

wherein R may be the same or different and may be either hydrogen or lower alkyl and R' may be the same or different and may be selected from the group consisting of hydrogen and hydroxy. Examples of the triterpenoid acids which may be employed in the practice of this invention include eburicoic, polyporenic, tumulosic, pinicolic, elemolic, elemonic, dehydroeburicoic, dehydroelemolic, dehydroelemonic and other like acids. The steps of the process (employing eburicoic acid as the starting material) are shown by the following equations wherein R, R' and R" are the same or different and represent hydrogen, lower alkyl, acyl and together with the oxygen atom to which they are joined may represent oxo (O=):

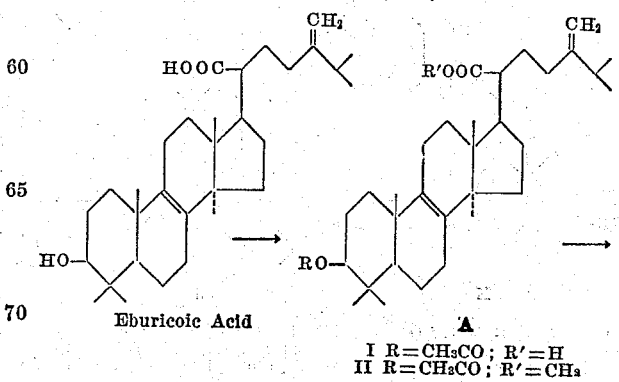

Eburicoic Acid     A
I R=CH₃CO; R'=H
II R=CH₃CO; R'=CH₃

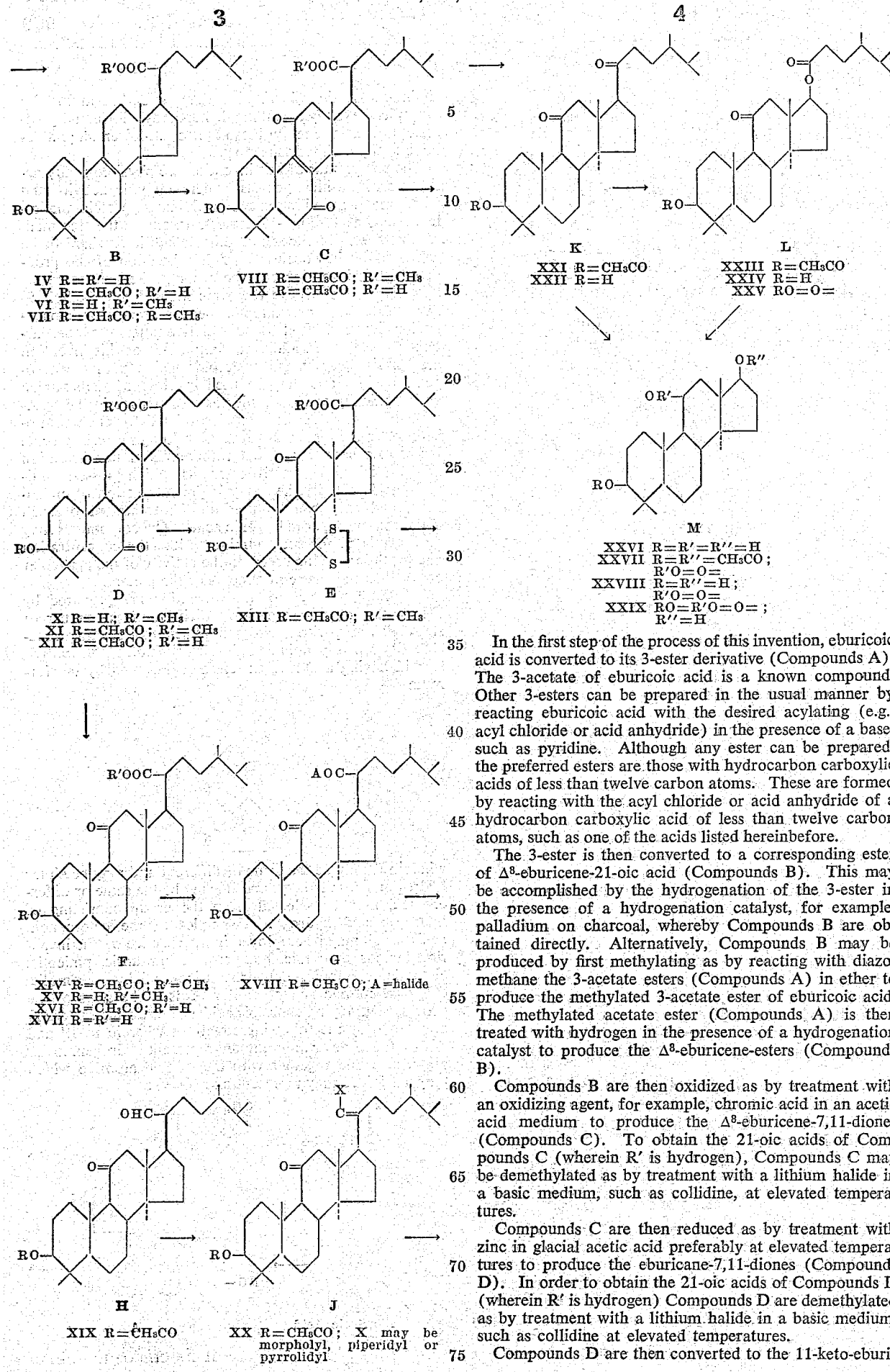

In the first step of the process of this invention, eburicoic acid is converted to its 3-ester derivative (Compounds A). The 3-acetate of eburicoic acid is a known compound. Other 3-esters can be prepared in the usual manner by reacting eburicoic acid with the desired acylating (e.g., acyl chloride or acid anhydride) in the presence of a base, such as pyridine. Although any ester can be prepared, the preferred esters are those with hydrocarbon carboxylic acids of less than twelve carbon atoms. These are formed by reacting with the acyl chloride or acid anhydride of a hydrocarbon carboxylic acid of less than twelve carbon atoms, such as one of the acids listed hereinbefore.

The 3-ester is then converted to a corresponding ester of $\Delta^8$-eburicene-21-oic acid (Compounds B). This may be accomplished by the hydrogenation of the 3-ester in the presence of a hydrogenation catalyst, for example, palladium on charcoal, whereby Compounds B are obtained directly. Alternatively, Compounds B may be produced by first methylating as by reacting with diazomethane the 3-acetate esters (Compounds A) in ether to produce the methylated 3-acetate ester of eburicoic acid. The methylated acetate ester (Compounds A) is then treated with hydrogen in the presence of a hydrogenation catalyst to produce the $\Delta^8$-eburicene-esters (Compounds B).

Compounds B are then oxidized as by treatment with an oxidizing agent, for example, chromic acid in an acetic acid medium to produce the $\Delta^8$-eburicene-7,11-diones (Compounds C). To obtain the 21-oic acids of Compounds C (wherein R' is hydrogen), Compounds C may be demethylated as by treatment with a lithium halide in a basic medium, such as collidine, at elevated temperatures.

Compounds C are then reduced as by treatment with zinc in glacial acetic acid preferably at elevated temperatures to produce the eburicane-7,11-diones (Compounds D). In order to obtain the 21-oic acids of Compounds D (wherein R' is hydrogen) Compounds D are demethylated as by treatment with a lithium halide in a basic medium, such as collidine at elevated temperatures.

Compounds D are then converted to the 11-keto-eburicane (Compounds F) by treatment first with an alkylenedithiol, e.g., ethane-dithiol, in the presence of a Lewis acid, such as, borontrifluoride etherate to produce the dithioethylene ketals (Compounds E), which are new compounds of this invention. Compounds E may then be treated at elevated temperatures with a sponge nickel catalyst in an organic solvent (e.g., ethanol), to produce Compounds F, which are also new compounds of this invention.

Alternatively, Compounds F may be obtained by treating Compounds D with hydrazine and a base, such as potassium hydroxide, at elevated temperature. In addition to the reduction of the 7-keto group, there occurs hydrolysis of the ester groups at $C_3$ and $C_{21}$ and the latter are reformed by treatment first with an acylating agent (i.e., acid anhydride or acyl chloride) in the presence of a base (e.g., pyridine) followed by treatment with a methylating agent (e.g., ethereal diazomethane), to produce Compounds F directly.

In order to obtain the 21-oic acids of Compounds F (wherein R' is hydrogen) Compounds F are demethylated as by treatment with a lithium halide in a basic medium, such as collidine, at elevated temperatures. The eburicane 21-oic acids, Compounds F (wherein R' is hydrogen), are then treated with an acid halide (e.g., thionyl chloride or thionyl bromide) to produce the eburicane-21-oyl chlorides (Compounds G). These are also new compounds of this invention.

Compounds G are then reduced as by treatment with hydrogen in the presence of a palladium catalyst at an elevated temperature to yield the eburicane-21-al-11-ones (Compounds H), which are new compounds of this invention.

Compounds H are then treated with a secondary amine, such as pyrrolidine, at an elevated temperature, with or without a strong acid, such as p-toluenesulfonic acid, to produce the 21 - (N-substituted)-$\Delta^{20}$-eburicene-11-ones (Compounds J), such as 21-(N-pyrrolidyl)-$\Delta^{20}$-eburicene-11-one, which are also new compounds of this invention. Similarly, additional 21 - (N-substituted)-$\Delta^{20}$-eburicenes (Compounds J) may be obtained by substituting other secondary amines for the pyrrolidine employed above. Examples of such secondary amines are morpholine and piperidine, which when employed in the practice of this invention, yield respectively 21-(N-morpholyl)-$\Delta^{20}$-eburicene-11-one, and 21-(N-piperidyl)-$\Delta^{20}$-eburicene-11-one (Compounds J) which are also new compounds of this invention.

Compounds J may then be ozonized with an excess of ozone at reduced temperatures. The ozonide formed is then reduced, as by treatment with zinc and acetic acid, to yield the 21-nor-eburicane-11,20-diones (Compounds K), which are also new compounds of this invention.

The final products of this invention are obtained by treating Compounds K with a peracid, such as trifluoroperacetic acid which yields the 3-acetate-17(4,5-dimethylhexanoate) of 4,4,14-trimethyl androstane (Compounds L), which are new compounds of this invention.

When in the practice of this invention, the acyl ester compounds (Compounds L) are obtained, the ester can be saponified in the usual manner, as by treatment with a base, such as potassium hydroxide, to yield the corresponding free hydroxy derivative and the free hydroxy compounds oxidized to the corresponding keto derivative in the usual manner as by treatment with chromium trioxide to yield Compounds M, which are new final products of this invention. Additionally, subsequent reduction of the final compounds, such as by treatment with lithium borohydride, results in the production of additional new final products of this invention (Compounds M).

In addition to the foregoing process, further steps may be employed to obtain further products of this invention. The basic starting material is the same triterpenoid acid employed in the hereinbefore disclosed process, which starting material is the source of the reactant employed in obtaining the additional products of this invention. The following equations represent the process whereby additional products are obtained; wherein R, R' and R" are as hereinbefore defined:

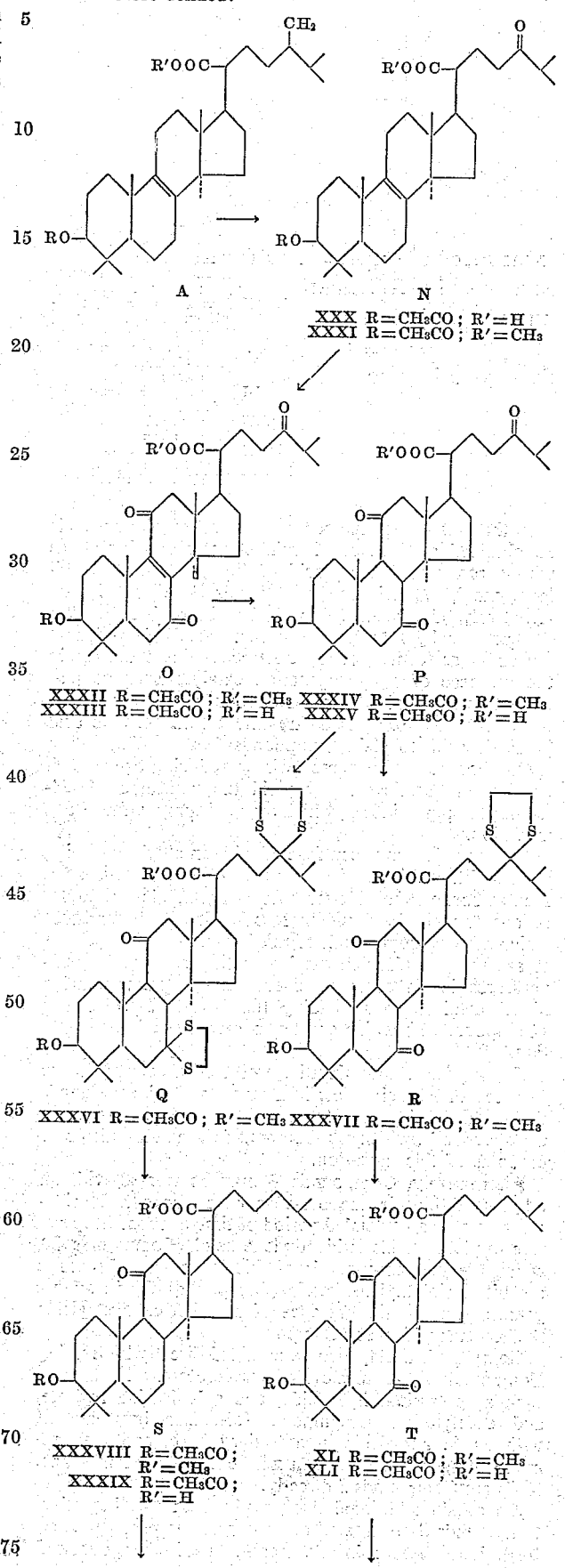

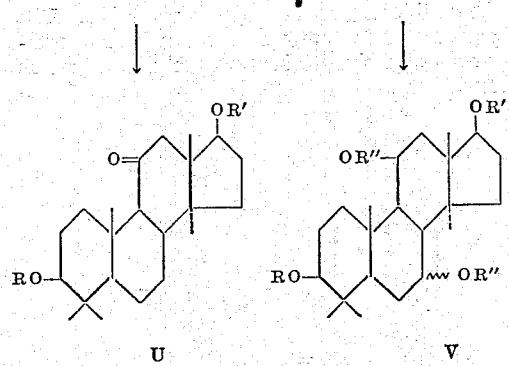

XLII R=CH₃CO; R'=(5-methylhexanoyl)
XLIII R=H; R'=(5-methylhexanoyl)
XLIV RO=O=; R'=(5-methylhexanoyl)
XLV RO=O=; R'=H
XLVI R=R'=H
XLVII R=R'=CH₃CO XLVIII R=CH₃CO; R'=(5-methylhexanoyl); R''O=O=
XLIX R=H; R'=(5-methylhexanoyl); R''O=O=
L R''O=RO=O=; R'=(5-methylhexanoyl)
LI RO=R''O=O=; R'=H
LII R=R'=H; R''O=O=
LIII R=R'=CH₃CO; R''O=O=
LIV R=R'=R''=H In the first step of the subsequent process, Compounds A, obtained as described hereinbefore, are oxidized, as with chromic acid in an acid medium, to yield the Δ⁸-lanostene-7,11,24-triones (Compounds O) directly. Alternatively, Compounds O may be obtained by a two-step process by first ozonizing Compounds A, reducing the ozonides formed, as by treatment with hydrogen in the presence of a hydrogenation catalyst, such as palladium on charcoal to obtain Compounds N. Compounds N are then oxidized, as by treatment with chromic acid in acetic acid, to yield Compounds O.

Compounds O are treated with a reducing agent, such as zinc and acetic acid, to yield the lanostane-7,11,24-triones (Compounds P), which are new compounds of this invention.

Compounds P are then reacted with an alkylene dithiol, such as ethanedithiol, in the presence of a Lewis acid, such as boron trifluoride-etherate catalyst under mild conditions, to yield the dithioethylene ketals (Compounds R) which are new compounds of this invention. Compounds R are then desulfurized as by heating at elevated temperatures in an organic solvent, in the presence of a nickel catalyst, thus yielding the lanostane-7,11-diones (Compounds T) which are new compounds of this invention.

Compounds T may then be processed according to the steps set forth hereinbefore in the treatment of Compounds E through M, in order to obtain the final derivatives of Compounds R, which are Compounds V and are also new products of this invention.

Alternatively, Compounds P may be treated with an alkylene dithiol in the presence of a boron trifluoride-etherate over an extended period of time at room temperature to yield the bis-dithioethylene ketal (Compounds Q) which are new compounds of this invention. Refluxing the bis-dithiolethylene ketals (Compounds Q) in an organic solvent in the presence of a nickel catalyst yields the lanostane-11-ones (Compounds S).

Compounds S may also be obtained directly by treating Compounds P, at an elevated temperature, with a base, such as potassium hydroxide, and a hydrazine hydrate, and reacetylating the compound formed, as by treatment with acetic anhydride in a tertiary base, and then remethylating, as by treatment with ethereal diazomethane, to obtain Compounds S directly.

To obtain additional final products of this invention, Compounds S are treated according to the procedures set forth hereinbefore in the treatment of Compounds F through M, thus yielding the 11-keto androstane derivatives (Compounds U) which are also new final products of this invention.

An additional method of producing the final products of this invention involves the employment of the derivatives of Compounds B, as starting material. The different steps of the process and the compounds obtained therefrom can be represented by the following equations, wherein R, R' and R'' are as hereinbefore described.

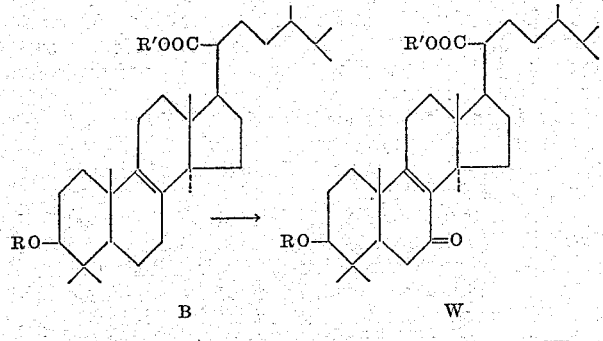

LV R=CH₃CO; R'=CH₃

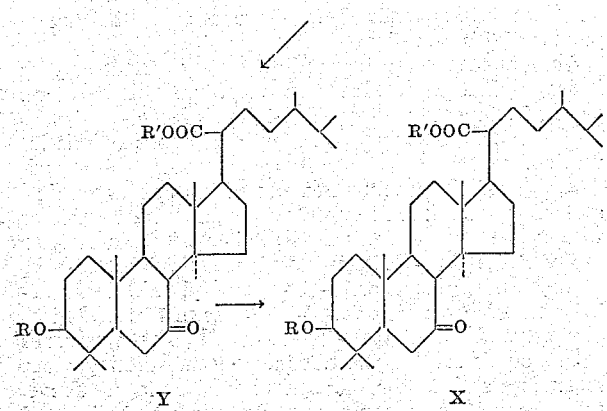

LVI R=CH₃CO; R'=CH₃      LVII R=CH₃CO; R'=H

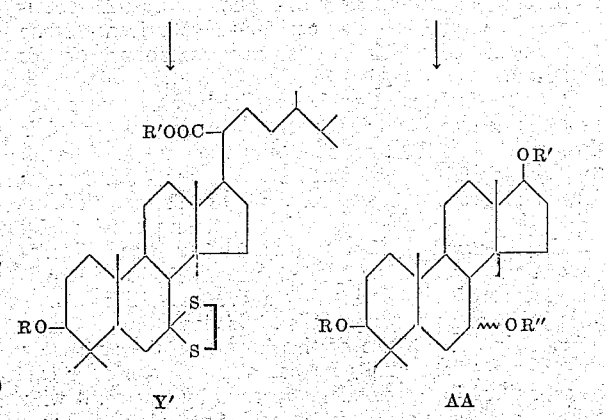

R=CH₃CO; R'=CH₃

LVIII R=CH₃CO; R'=(4,5-dimethyl hexanoyl) R''O=O=
LVIX R=H; R'=(4,5-dimethyl hexanoyl) R''O=O=
LX R''O=R=O=O=; R'=(4,5-dimethyl hexanoyl)
LXI R''O=RO=O=; R'=H
LXII R=R'=H; R''O=O=
LXIII R=R'=CH₃CO; R''O=O=
LXIV R=R'=R''=H

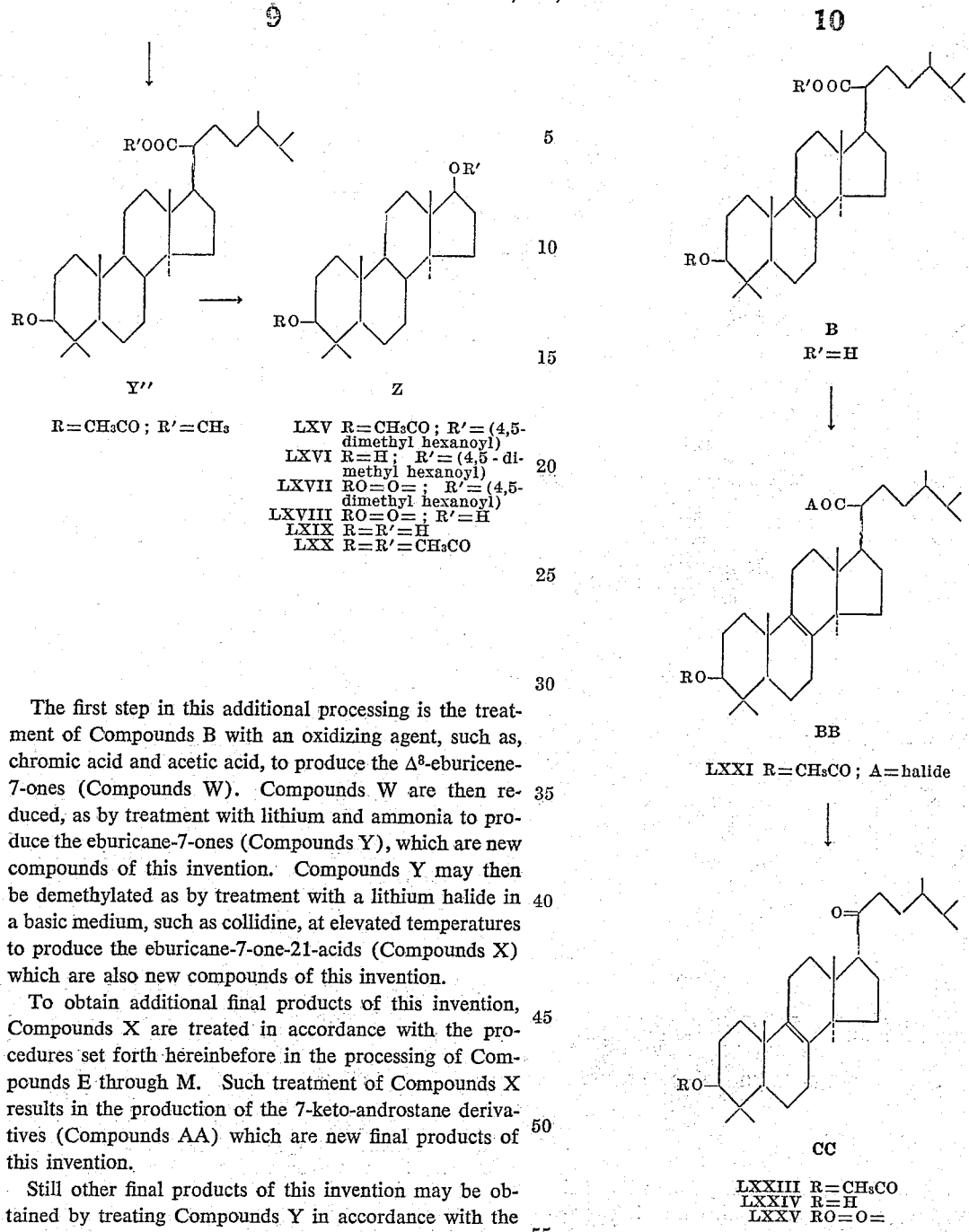

R=CH₃CO; R'=CH₃
LXV R=CH₃CO; R'=(4,5-dimethyl hexanoyl)
LXVI R=H; R'=(4,5-dimethyl hexanoyl)
LXVII RO=O=; R'=(4,5-dimethyl hexanoyl)
LXVIII RO=O=; R'=H
LXIX R=R'=H
LXX R=R'=CH₃CO The first step in this additional processing is the treatment of Compounds B with an oxidizing agent, such as, chromic acid and acetic acid, to produce the Δ⁸-eburicene-7-ones (Compounds W). Compounds W are then reduced, as by treatment with lithium and ammonia to produce the eburicane-7-ones (Compounds Y), which are new compounds of this invention. Compounds Y may then be demethylated as by treatment with a lithium halide in a basic medium, such as collidine, at elevated temperatures to produce the eburicane-7-one-21-acids (Compounds X) which are also new compounds of this invention.

To obtain additional final products of this invention, Compounds X are treated in accordance with the procedures set forth hereinbefore in the processing of Compounds E through M. Such treatment of Compounds X results in the production of the 7-keto-androstane derivatives (Compounds AA) which are new final products of this invention.

Still other final products of this invention may be obtained by treating Compounds Y in accordance with the procedure set forth hereinbefore for the processing of Compounds D through M. Thus, Compounds Y are first treated with an alkylenedithiol in the presence of a Lewis acid to produce the 7-dithioethylene ketals (Compounds Y') which compounds are then desulfurized to produce the 3-substituted eburicanes (Compounds Y''). Compounds Y'' may then be treated in accordance with the procedures set forth hereinbefore for the treatment of Compounds F through M, thus providing new final products of this invention (Compounds Z).

Additional final products of this invention are obtained by the subsequent processing of the derivatives of Compounds B (wherein R' is hydrogen), obtained as set forth hereinbefore. The different steps of the process and the compounds obtained therefrom may be represented by the following equations wherein R and R' are as hereinbefore defined:

LXXI R=CH₃CO; A=halide

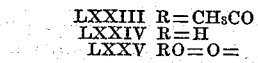

LXXIII R=CH₃CO
LXXIV R=H
LXXV RO=O=

In the first step of the process yielding additional final products of this invention, Compounds B (wherein R' is hydrogen) are treated with a halogenating agent, such as, thionyl chloride, at an elevated temperature to yield dihydroeburicoyl chloride (Compound BB).

Compound BB is then treated in accordance with the procedures set forth hereinbefore in the processing of Compounds F through K to obtain the Δ⁸-21-nor-eburicanes (Compounds CC) which are additional new final compounds of this invention.

Still further additional final products of this invention may be obtained by the processing of the derivatives of Compounds F or Compounds S (wherein R' is hydrogen), obtained as set forth hereinbefore. The additional products are obtained by the process represented by the following equations wherein R, R' and R'' are the same as defined hereinbefore; and R''' may be hydrogen or lower alkyl:

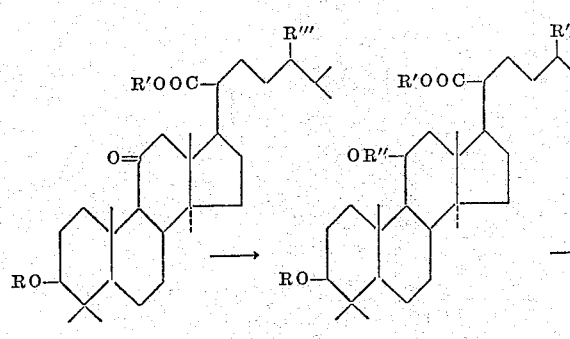

F
R'''=CH₃ or H

DD
LXXVI R=CH₃CO; R'=R''=H, R'''=H or CH₃
LXXVII R=CH₃CO; R'=CH₃; R''=H; R'''=H or CH₃
LXXVIII R=R''=H; R'=CH₃; R'''=H or CH₃

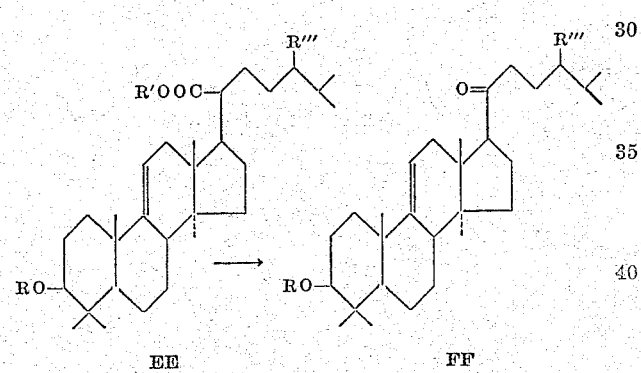

EE
LXXIX R=CH₃CO; R'=CH₃
LXXX R=CH₃CO; R'=H

FF
LXXXI R=CH₃CO; R'''=H or CH₃
LXXXII R=H; R'''=H or CH₃
LXXXIII RO=O=; R'''=H or CH₃

In the first step of the process yielding these additional final products, Compounds F or S (wherein R' is hydrogen), obtained as set forth hereinbefore, are treated with lithium borohydride in tetrahydrofuran to produce the 11-hydroxy-lanostanes (Compounds DD) which are new compounds of this invention.

Compounds DD are then treated with methanesulfonyl chloride and pyrridine in dimethylformamide to yield the Δ⁹⁽¹¹⁾-lanostenes (Compounds EE), which are also new compounds of this invention.

Compounds EE are then treated in accordance with the procedures set forth above for obtaining Compounds G through K, thus yielding the Δ⁹⁽¹¹⁾-21-nor-lanostenes (Compounds FF), which are new additional final products of this invention.

Still more final products may be obtained from the further processing of Compounds C and D (wherein R' is hydrogen). Instead of further degradation of these compounds as set forth hereinbefore they are treated directly to obtain new final products of this invention by the process set forth in the following equations; wherein R, R' and R'' are as hereinbefore defined:

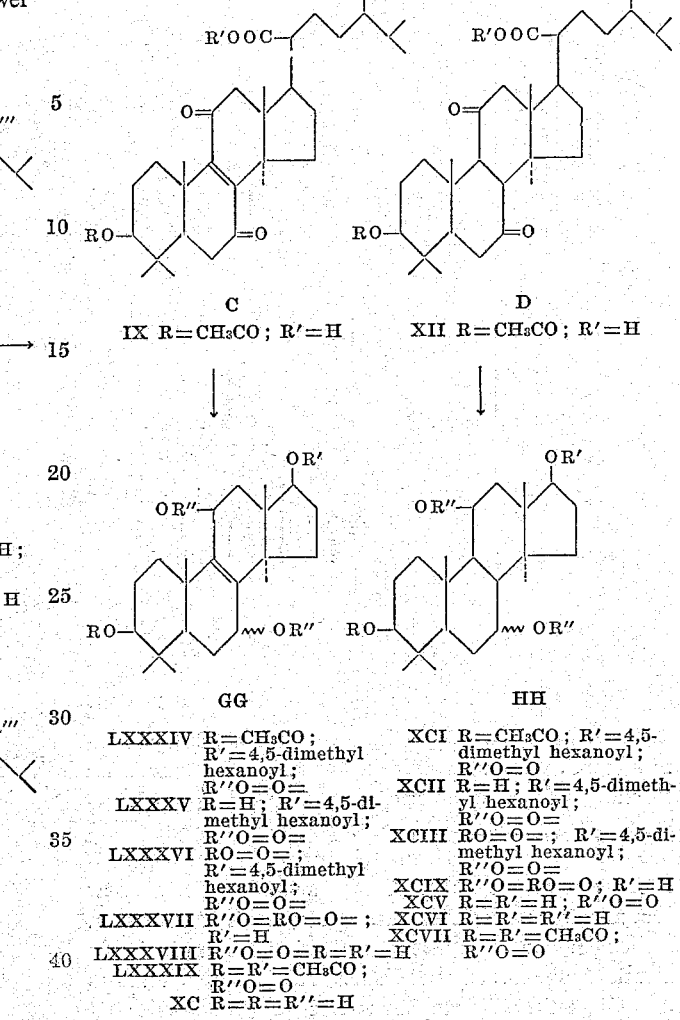

C
IX R=CH₃CO; R'=H

D
XII R=CH₃CO; R'=H

GG
LXXXIV R=CH₃CO; R'=4,5-dimethyl hexanoyl; R''O=O=
LXXXV R=H; R'=4,5-dimethyl hexanoyl; R''O=O=
LXXXVI RO=O=; R'=4,5-dimethyl hexanoyl; R''O=O=
LXXXVII R''O=RO=O=; R'=H
LXXXVIII R''O=O=R=R'=H
LXXXIX R=R'=CH₃CO; R''O=O
XC R=R=R''=H HH
XCI R=CH₃CO; R'=4,5-dimethyl hexanoyl; R''O=O
XCII R=H; R'=4,5-dimethyl hexanoyl; R''O=O=
XCIII RO=O=; R'=4,5-dimethyl hexanoyl; R''O=O=
XCIX R''O=RO=O; R'=H
XCV R=R'=H; R''O=O
XCVI R=R'=R''=H
XCVII R=R'=CH₃CO; R''O=O Compounds C and D (wherein R' is hydrogen) are processed according to the procedures set forth hereinbefore in the production of compounds G through M, thus yielding as now additional final products of this invention the 7,11-diketo-Δ⁸-androstenes (Compounds GG) and the 7,11-diketo-androstanes (Compounds HH).

The results described above in the treatment of eburicoic acid may likewise be obtained when another triterpenoid acid is substituted as the starting material. Thus, when tumulosic acid is treated in accordance with the procedures set forth above in obtaining Compounds A through M the results represented by the following equations are obtain, R, R' and R'' being the same as defined hereinbefore:

TUMULOSIC ACID (II)

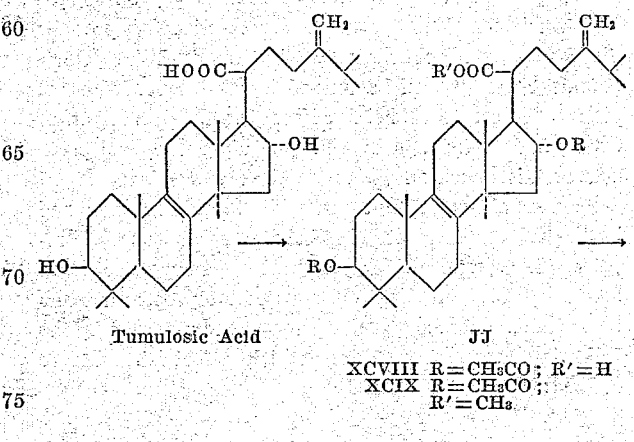

Tumulosic Acid

JJ
XCVIII R=CH₃CO; R'=H
XCIX R=CH₃CO; R'=CH₃

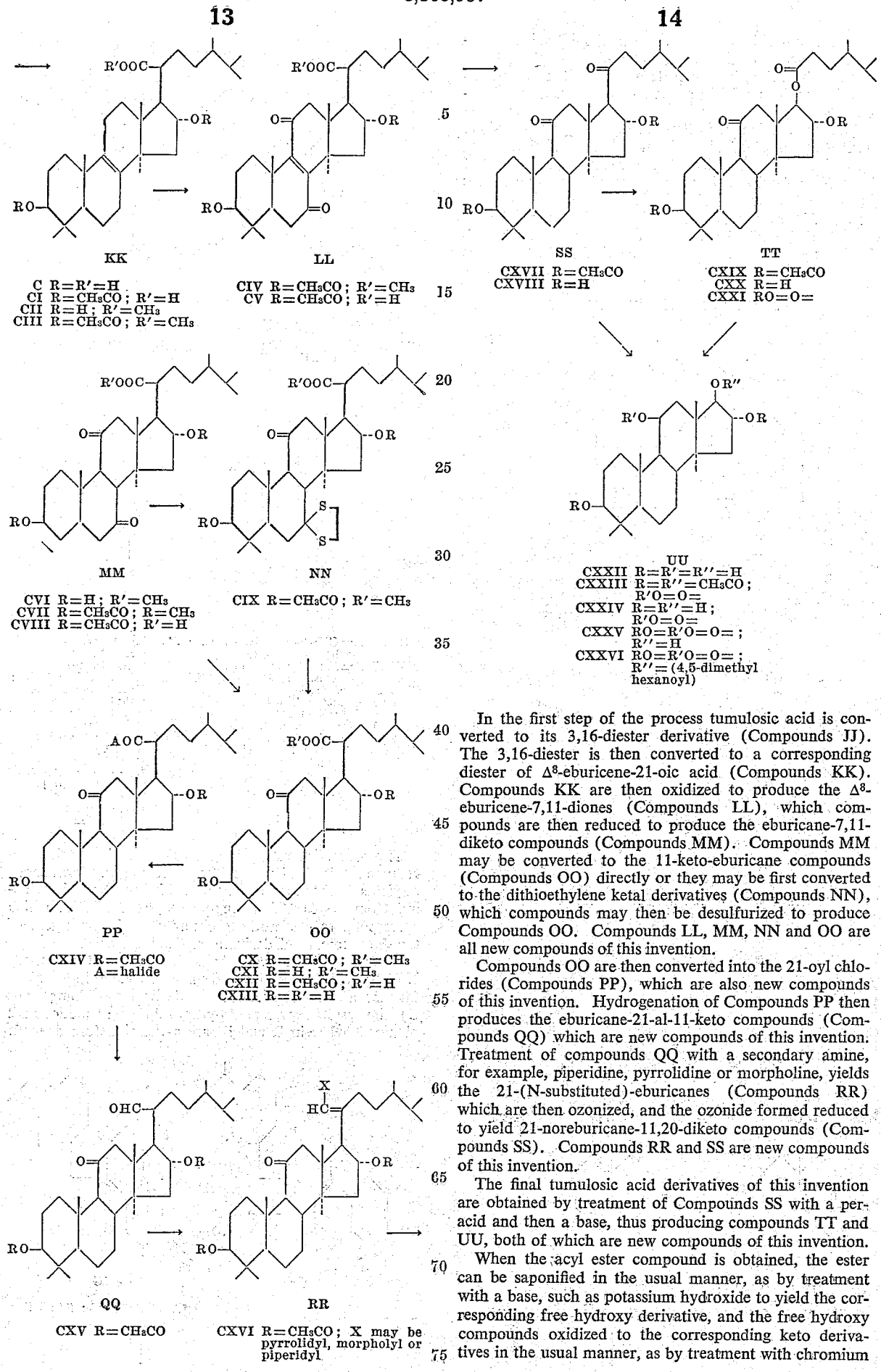

In the first step of the process tumulosic acid is converted to its 3,16-diester derivative (Compounds JJ). The 3,16-diester is then converted to a corresponding diester of Δ⁸-eburicene-21-oic acid (Compounds KK). Compounds KK are then oxidized to produce the Δ⁸-eburicene-7,11-diones (Compounds LL), which compounds are then reduced to produce the eburicane-7,11-diketo compounds (Compounds MM). Compounds MM may be converted to the 11-keto-eburicane compounds (Compounds OO) directly or they may be first converted to the dithioethylene ketal derivatives (Compounds NN), which compounds may then be desulfurized to produce Compounds OO. Compounds LL, MM, NN and OO are all new compounds of this invention.

Compounds OO are then converted into the 21-oyl chlorides (Compounds PP), which are also new compounds of this invention. Hydrogenation of Compounds PP then produces the eburicane-21-al-11-keto compounds (Compounds QQ) which are new compounds of this invention. Treatment of compounds QQ with a secondary amine, for example, piperidine, pyrrolidine or morpholine, yields the 21-(N-substituted)-eburicanes (Compounds RR) which are then ozonized, and the ozonide formed reduced to yield 21-noreburicane-11,20-diketo compounds (Compounds SS). Compounds RR and SS are new compounds of this invention.

The final tumulosic acid derivatives of this invention are obtained by treatment of Compounds SS with a peracid and then a base, thus producing compounds TT and UU, both of which are new compounds of this invention.

When the acyl ester compound is obtained, the ester can be saponified in the usual manner, as by treatment with a base, such as potassium hydroxide to yield the corresponding free hydroxy derivative, and the free hydroxy compounds oxidized to the corresponding keto derivatives in the usual manner, as by treatment with chromium trioxide, to yield Compounds UU. Additionally, subsequent reduction of the final compounds, such as by treatment with lithium borohydride, results in the production of additional new final products of this invention (Compounds UU).

Similarly, as is true in the case of the processing of the derivatives of Eburicoic Acid, new additional final products of this invention are obtained when the derivatives of Tumulosic Acid are likewise processed according to this invention. When the Tumulosic Acid derivative (Compounds JJ) are substituted for the Eburicoic Acid derivatives (Compounds A), the results represented by the following equations are obtained, wherein R, R' and R'' are as hereinbefore defined:

TUMULOSIC ACID DERIVATIVES

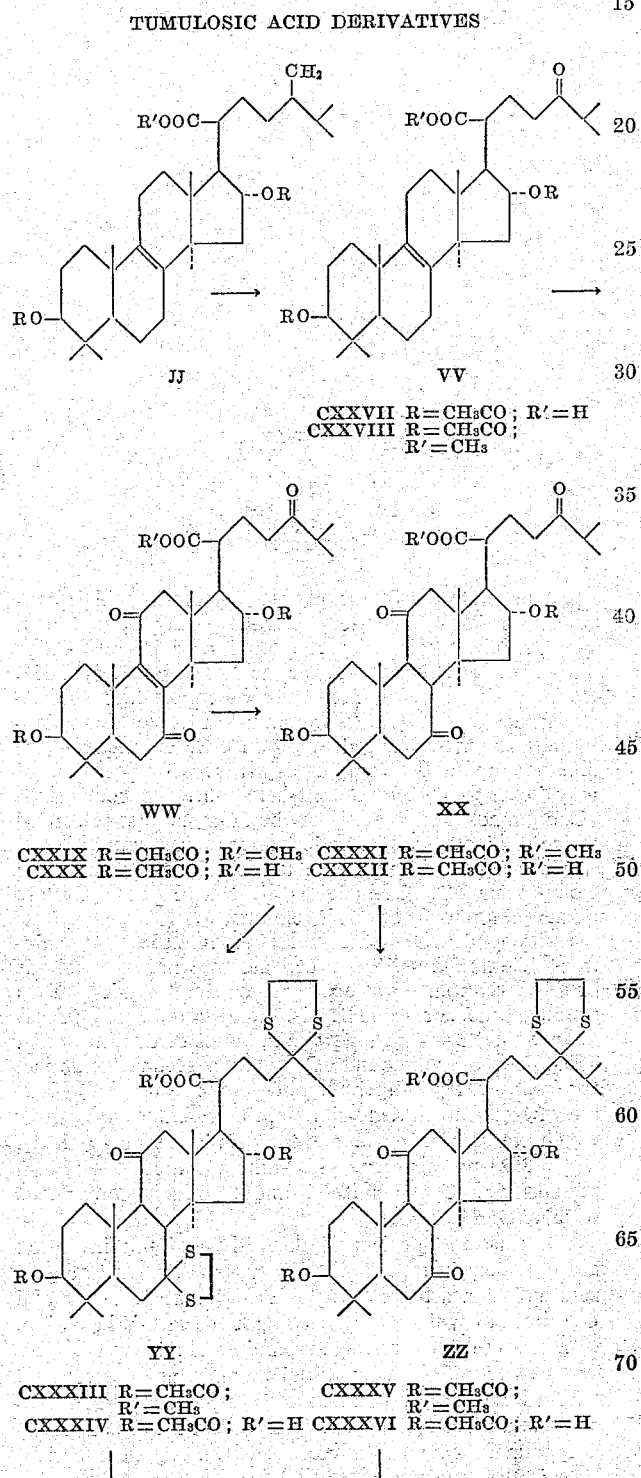

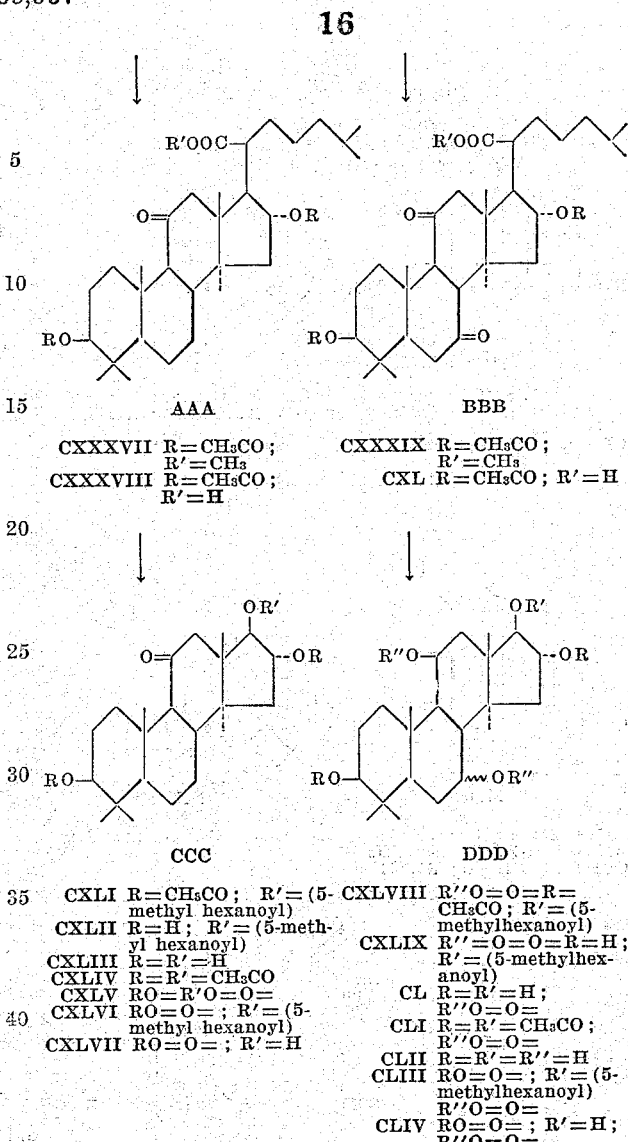

The processing of Compounds JJ according to the procedures set forth above for the processing of Compounds A yields further new products of this invention, those being Compounds VV through Compounds DDD, which correspond to the products obtained in the treatment of the Eburicoic Acid derivatives, Compounds A.

When the Tumulosic Acid derivatives (Compounds KK) are substituted for, and likewise treated in the same manner as the Eburicoic Acid derivatives (Compounds B), the results represented by the following equations are obtained, wherein R and R' are as hereinbefore defined:

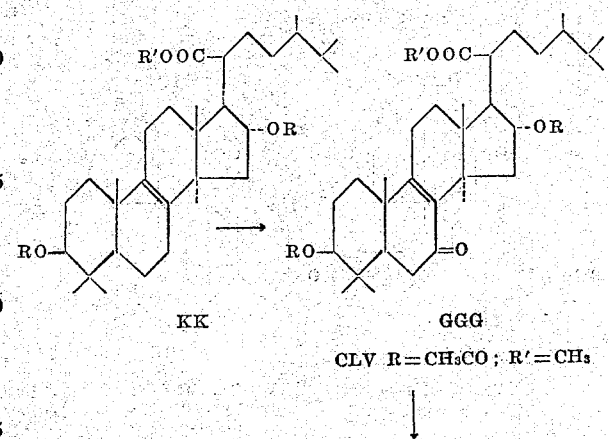

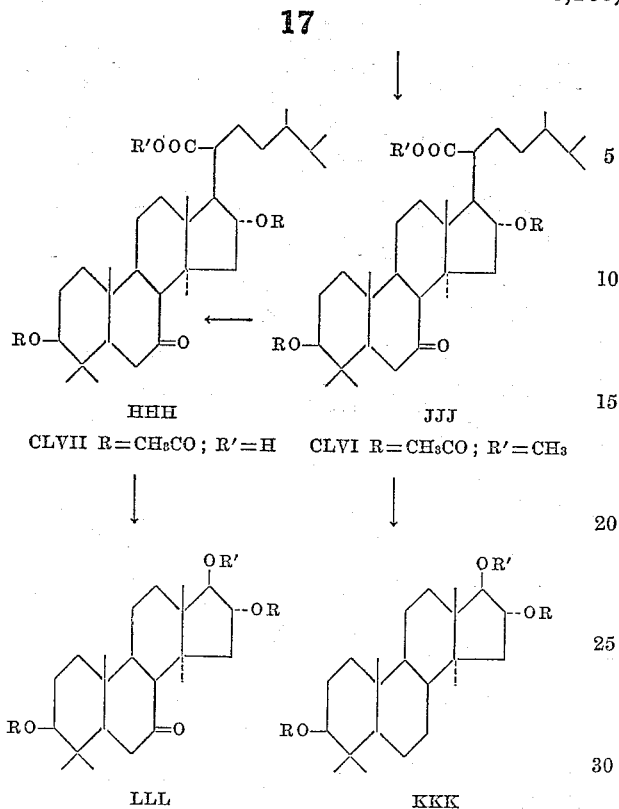

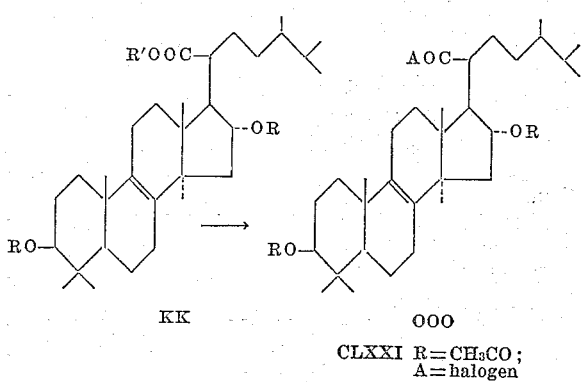

The processing of Compounds KK according to the procedures set forth above for the processing of Compounds B yields further new products of this invention, these being Compounds GGG through Compounds LLL, which correspond to the compounds obtained from the treatment of the Eburicoic Acid derivatives, Compounds B.

The treatment of the Tumulosic Acid derivatives (Compounds KK) according to the procedures set forth above in the processing of the Eburicoic Acid derivatives (Compounds B) to derive Compounds BB and CC, yields further new products of this invention as may be represented by the equations set forth below, wherein R and R' are as hereinbefore defined:

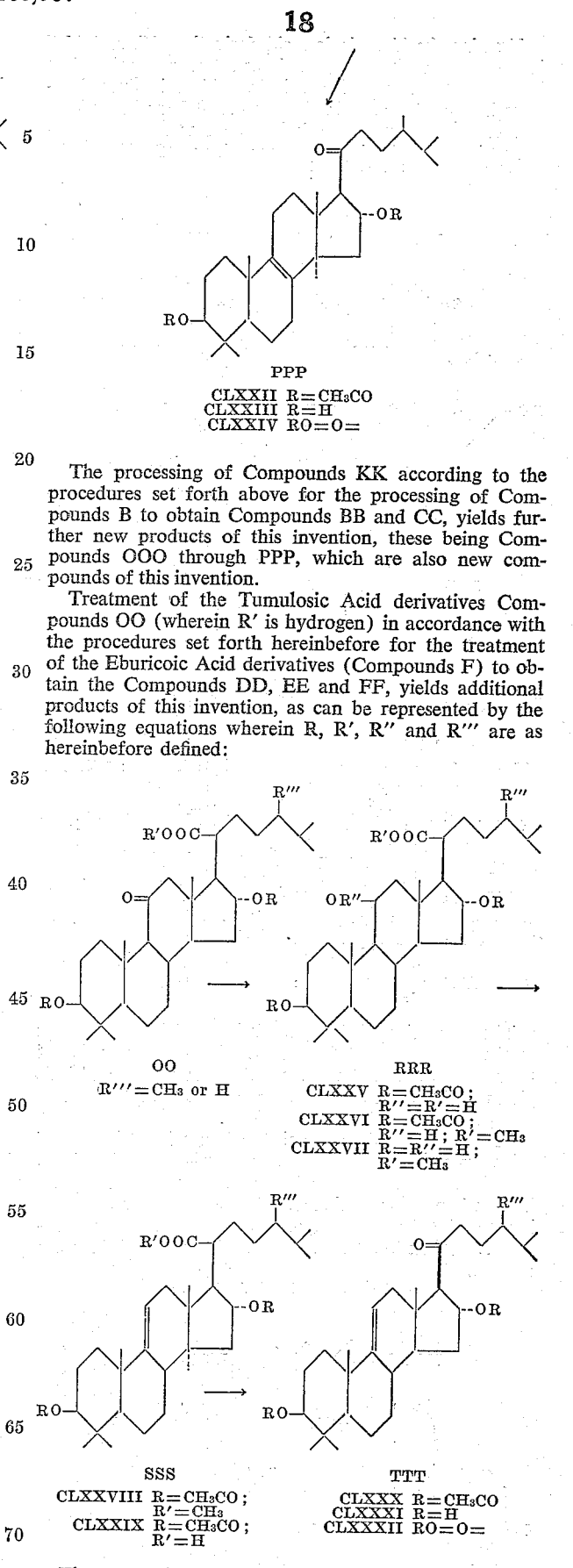

The processing of Compounds KK according to the procedures set forth above for the processing of Compounds B to obtain Compounds BB and CC, yields further new products of this invention, these being Compounds OOO through PPP, which are also new compounds of this invention.

Treatment of the Tumulosic Acid derivatives Compounds OO (wherein R' is hydrogen) in accordance with the procedures set forth hereinbefore for the treatment of the Eburicoic Acid derivatives (Compounds F) to obtain the Compounds DD, EE and FF, yields additional products of this invention, as can be represented by the following equations wherein R, R', R'' and R''' are as hereinbefore defined:

The processing of Compounds OO according to the procedures set forth above for obtaining compounds DD, EE and FF, yield new products of this invention, these being Compounds RRR through Compounds TTT.

Treating the Tumulosic Acid derivatives LL and MM in accordance with the procedures set forth hereinbefore in the treatment of the Eburicoic Acid derivatives Compounds C and D to obtain Compounds GG and HH, yields further new products of this invention as may be represented by the following equations wherein R, R' and R" are as hereinbefore defined:

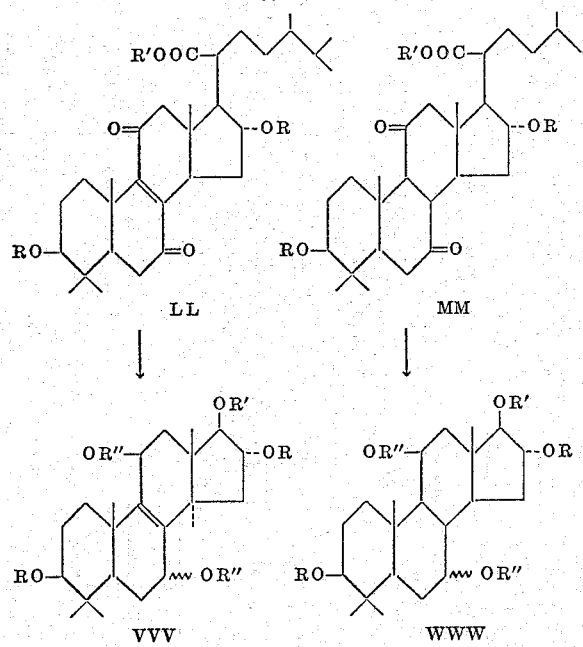

CLXXXIII R=CH₃CO; R'=4,5-dimethylhexanoyl R"O=O=
CLXXXIV R=H; R'=4,5-dimethylhexanoyl, R"O=O=
CLXXXV R=R'=H; R"O=O=
CLXXXVI R"O=O=R=R'=CH₃CO
CLXXXVII R=R'=R"=H
CLXXXVIII R"O=RO=O=; R'=4,5-dimethylhexanoyl
CLXXXIX R"O=RO=O=; R'=H CXC R=CH₃CO; R'=4,5-dimethylhexanoyl R"O=O
CXCI R=H; R'=4,5-dimethylhexanoyl R"O=O
CXCII R=R'=H; R"O=O=
CXCIII R=R'=CH₃CO; R"O=O=
CXCIV R=R'=R"=H
CXCV R"O=RO=O=; R'=4,5-dimethylhexanoyl
CXCVI R"O=RO=O=; R'=H The processing of Compounds LL and MM according to the procedures set forth above for the processing of Compounds C and D to obtain Compound GG and HH, yields additional new products of this invention, these being Compounds VVV and WWW.

In addition to the foregoing, when other triterpenoid acids are employed in the process hereinbefore described, slightly different results and compounds may be obtained. Thus, when Polyporenic Acid C is employed as the starting material, the results represented by the following equation is obtained, wherein R and R' are as hereinbefore defined:

POLYPORENIC ACID C

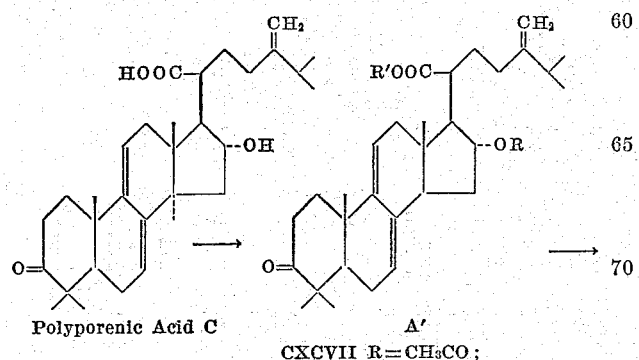

Polyporenic Acid C
CXCVII R=CH₃CO; R'=CH₃
CXCVIII R=CH₃CO; R'=H

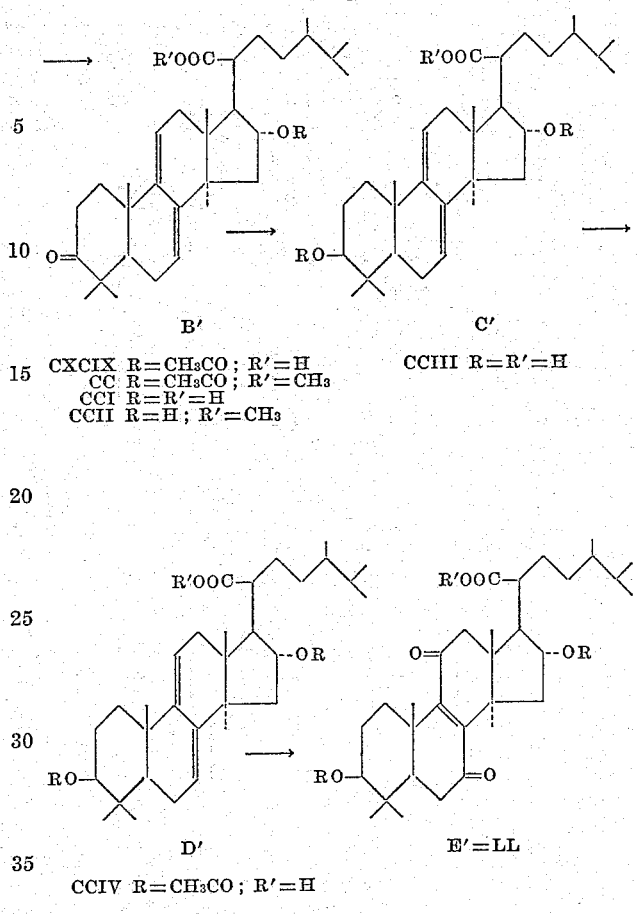

CXCIX R=CH₃CO; R'=H
CC R=CH₃CO; R'=CH₃
CCI R=R'=H
CCII R=H; R'=CH₃

CCIII R=R'=H

CCIV R=CH₃CO; R'=H

Polyporenic Acid C is first converted to a corresponding 16-ester of 16α-hydroxy-3-keto-Δ$^{7,9(11)}$-eburicadiene-21-oic acid (Compounds A') in the same manner as hereinbefore described in the treatment of eburicoic acid.

Compounds A' are then converted to the corresponding 21-ester of 16α-acetoxy-3-keto-Δ$^{7,9(11)}$-eburicadiene-21-oic acid (Compounds B'). Compounds B' are then reduced as by treatment with sodium borohydride and alcohol to yield the 3,16-dihydroxy-Δ$^{7,9(11)}$-eburicadiene-21-oic acids (Compounds C').

Compounds C' are then acetylated as by treatment with acetic anhydride in pyridine at room temperature to produce the 3,16-diacetyl-Δ$^{7,9(11)}$-eburicadienes (Compounds D').

Compounds D' are then oxidized to produce the 3,16-diacetyl-Δ$^8$-eburicene-7,11-diketones (Compounds E') which are the same compounds as those produced in the processing of tumulosic acid, to wit (Compounds LL). Compounds E' are then processed exactly according to the procedures set forth for the subsequent treatment of Compounds LL to obtain the final products of this invention.

Thus, the processing of Polyporenic Acid C corresponds exactly excepting the differences noted above to the processing of tumulosic acid and leads to the same corresponding final products.

Similarly, when triterpenoid acids, such as, elemolic or elemonic acids are employed in the practice of this invention, like results are obtained with the exception of the stereochemical orientation of the 3, 14, 17 and 18 substituents. The results obtained when employing these acids in the practice of this inveniton may be represented by the following equations (wherein R, R' and R'' are as hereinbefore defined).

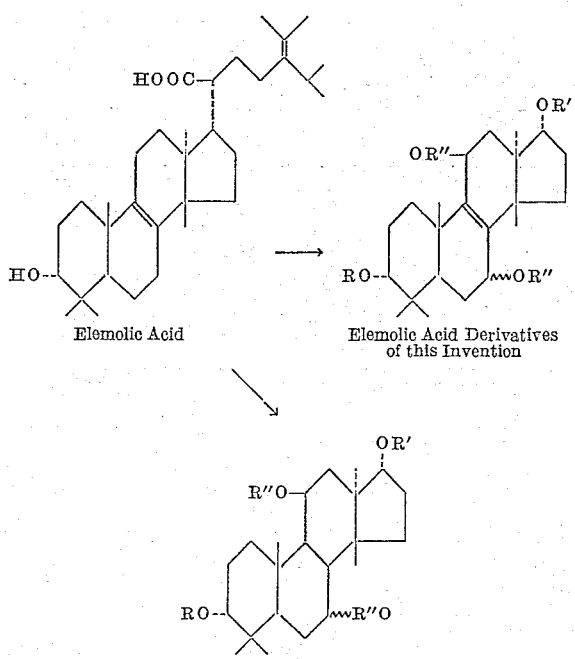

Elemolic Acid

Elemolic Acid Derivatives of this Invention

Thus, when elemolic, elemonic and other like acids are employed as the starting material in the practice of this invention in lieu of eburicoic acid, the final products obtained will possess 3α,14β,17α,18α-substituents rather than the substituents having the stereochemical orientation of the products obtained from the processing of eburicoic, tumulosic, polyporenic and other like acids.

The following examples are illustrative of this invention (all temperatures being in centigrade):

EXAMPLE 1

*Acetyl-eburicoic acid (I)*

To a cooled solution of 500 g. of eburicoic acid in 2.37 liters of pyridine 700 ml. of acetic anhydride is added and the mixture allowed to stand overnight at room temperature. The excess acetic anhydride is decomposed by the addition of ice followed by 4 liters of water. The precipitate of crude acetyl-eburicoic acid is collected and dissolved in 4 liters of chloroform. The chloroform solution is washed with 5% hydrochloric acid, water and 5% potassium bicarbonate solution and the solution is then concentrated to two liters. After the addition of 2 liters of methanol, the solution is reconcentrated to a volume of 2 liters and treated with decolorizing charcoal. The solution is then concentrated and 419 g. of the acetyl-eburicoic acid (I) having a melting point of 240–244°, is collected.

EXAMPLE 2

*3,16-diacetyl-tumulosic acid (XCVIII)*

Following the procedure of Example 1, but substituting tumulosic acid for the eburicoic acid, 3,16-diacetyl tumulosic acid, M.P. 227–228°, (XCVIII) is obtained.

EXAMPLE 3

*Acetyl-polyporenic acid C (CXCVIII)*

Following the procedure of Example 1 but substituting polyporenic acid C for the eburicoic acid, acetyl-polyporenic acid C, M.P., 206–210°, (CXCVIII) is obtained.

EXAMPLE 4

*Methyl-acetyl eburicoate (II)*

To a suspension of 20 g. of acetyl eburicoic acid (I) in 500 ml. of ether is added a solution of diazomethane in ether. The insoluble portion of the acid dissolves as the reaction proceeds and after solution is complete, diazomethane is added until a yellow color persists. The excess diazomethane decomposed with acetic acid, the solvent evaporated and the residue dried under high vacuum. The crude methyl ester on recrystallization from methanol-chloroform gives a first crop of 15.40 g. methyl-acetyl eburicoate (II), M.P. 153–154°, and a second crop of 2.84 g., M.P. 150–151°.

$\lambda_{max.}^{Nujol}$ 5.78, 6.10, 8.01, 11.32$\mu$

EXAMPLE 5

*Methyl-3,16-diacetyl tumulosate (XCIX)*

Following the procedure of Example 4 but substituting 3,16-diacetyl-tumulosic acid (XCVIII) for the acetyl eburicoic acid, methyl-3,16-diacetyl tumulosate (XCIX), M.P. 159–159.5°, is obtained.

EXAMPLE 6

*Methyl-acetyl-polyporenate C (CXCVII)*

Following the procedure of Example 4 but substituting acetyl polyporenic acid C (CXCVIII) for acetyl eburicoic acid yields methyl-acetyl-polyporenate C (CXCVII), M.P. 122–124°.

EXAMPLE 7

*Methyl-3-acetyl-Δ⁸-eburicene-3β-ol-21-oate (VII)*

A solution of 85.0 g. of methyl-3-acetyl eburicoate (II) in 1.7 liters of ethyl acetate, absorbs 1 equivalent of hydrogen when shaken in an atmosphere of hydrogen at room temperature and pressure in the presence of 5.1 g. of Adams catalyst. The catalyst is removed by filtration, the solvent evaporated and the residue is recrystallized from methanol-chloroform to give a first crop of 69.8 g. of methyl-3-acetyl-Δ⁸-eburicene-3β-ol-21-oate (VII), M.P. 156–159°, an a second crop of 8.5 g., M.P. 153–154°.

$\lambda_{max.}^{Nujol}$ 5.78 and 8.02$\mu$

EXAMPLE 8

*Methyl-3,16-diacetyl-Δ⁸-eburicene-3β,16α-diol-21-oate (CIII)*

Following the procedure of Example 7 but substituting methyl-3,16-diacetoxy tumulosate (XCIX) for methyl-3-acetyl eburicoate (II), methyl-3,16-diacetyl-Δ⁸-3β,16α-diol-20-oate, M.P. 183–184°, (CIII) is obtained.

EXAMPLE 9

*Methyl-16-acetyl-Δ⁷,⁹⁽¹¹⁾-eburicadiene-16α-ol-3-one-21-oate (CC)*

Following the procedure of Example 7 but substituting methyl-acetyl polyporenate (CXCVII) for methyl-acetyl eburicoate, yields methyl-16-acetyl-Δ⁷,⁹⁽¹¹⁾-eburicadiene-16α-ol-3-one-21-oate (CC), MP. 139–141°.

EXAMPLE 10

*Methyl-Δ⁸-eburicene-3β-ol-21-oate (VI)*

A solution of 500 mg. of methyl-3-acetyl-Δ⁸-eburicene (3β-ol)-21-oate (VII) in 200 ml. of 1 N ethanolic potassium hydroxide is allowed to stand at room temperature for 16 hours. The solution is then neutralized with 20% sulfuric acid and the solids filtered. The filtrate is diluted with water and the ethanol evaporated. The resulting solids are combined with the previously collected material and partitioned between ether and water. The ether layer is washed with water and evaporated to give 484 mg. of methyl-Δ⁸-eburicene-3β-ol-21-oate (VI), which is then recrystallized from methanol to yield 284 mg. of crystalline material having a melting point of 139–144°;

$\lambda_{max.}^{Nujol}$ 2.95–3.00, 5.78$\mu$

EXAMPLE 11

*Methyl-Δ⁸-eburicene-3β,16α-diol-21-oate (CII)*

Following the procedure of Example 10, but substituting methyl - 3,16-diacetyl-Δ⁸-eburicene-3β,16α-diol-21-oate (CIII) for methyl - 3 - acetyl-Δ⁸-eburicene-3β-ol-21-oate, yields methyl - Δ⁸ - eburicene-3β,16α-diol-21-oate (CII).

EXAMPLE 12

*Methyl-Δ⁷,⁹⁽¹¹⁾-eburicadiene-16α-ol-3-one-21-oate (CCII)*

Following the procedure of Example 10 but substituting methyl -16-acetyl-Δ⁷,⁹⁽¹¹⁾-eburicadiene-16-ol-3-one-21-oate (CC) for methyl - 3-acetyl - Δ⁸-eburicene-3β-ol-21-oate, yields methyl - Δ⁷,⁹⁽¹¹⁾-eburicadiene-16α-ol-3-one-21-oate (CCII), M.P. 195–197°.

EXAMPLE 13

*Δ⁸-eburicene-3β-ol-21-oic acid (IV)*

528 mg. (1 mmole) of methyl-3-acetyl-Δ⁸-eburicene-3β-ol-21-oate (VII) is dissolved in 20 ml. of collidine (distilled from potassium hydroxide) containing 870 mg. of lithium iodide (6.5 mole) and the mixture is heated at reflux under nitrogen for 15 hours. After cooling, the dark brown mixture is poured into 500 ml. of iced 2 N hydrochloric acid and extracted with ether-methylene chloride solvent (2 parts ether : 1 part methylene chloride). The organic layer is washed with 5% hydrochloric acid and water, dried over sodium sulfate and evaporated to give 518 mg. of Δ⁸-eburicene-3β-ol-21-oic acid (IV). Recrystallization from methanol-chloroform yields a first crop of 162 mg. of (IV), M.P., 282–284° and a second crop of 156 mg., M.P. 276–285°.

$\lambda_{max.}^{Nujol}$ 2.92, 5.82, 6.02μ

EXAMPLE 14

*Δ⁸-eburicene-3β,16α-diol-21-oic acid (C)*

Following the procedure of Example 13 but substituting methyl - 3,16 - diacetyl-Δ⁸-eburicene-3β,16α-diol-21-oate (CII) for the methyl-3-acetyl-Δ⁸-eburicene-3β-ol-21-oate yields Δ⁸-eburicene-3β,16α-diol-21-oic acid (C).

EXAMPLE 15

*Δ⁷,⁹⁽¹¹⁾-eburicadiene-16α-ol-3-one-21-oic acid (CCI)*

Following the procedures set forth in Example 13 but substituting methyl - 16 - acetyl-Δ⁷,⁹⁽¹¹⁾-eburicadiene-16α-ol-3-one-21-oate (CC) for the methyl-3-acetyl-Δ⁸-eburicene-3β-ol-21-oate yields Δ⁷,⁹⁽¹¹⁾-eburicadiene-16α-ol-3-one-21-oic acid (CCI).

EXAMPLE 16

*3-acetyl-Δ⁸-eburicene-3β-ol-21-oic acid (V)*

802 mg. of acetyl eburicoic acid (I) in absolute ethanol absorbs 1 equivalent of hydrogen when shaken in an atmosphere of hydrogen in the presence of 68 mg. of Adams catalyst. Filtration of the catalyst, evaporation of the solvent and recrystallization from methanol-chloroform yields 647 mg. of 3-acetyl-Δ⁸-eburicene-3β-ol-21-oic acid (V) having a melting point of 266–268°;

$\lambda_{max.}^{Nujol}$ 5.80, 6.05μ

EXAMPLE 17

*3-acetyl-Δ⁸-eburicene-3β-ol-21-oic acid (V)*

Acetylation of 304 mg. of Δ⁸-eburicene-3β-ol-21-oic acid (IV) by acetic anhydride in pyridine at room temperature, yields after recrystallization from methanol-chloroform, a first crop of 175 mg. of 3-acetyl-Δ⁸-eburicene-3β-ol-21-oic acid (V) melting point about 269–270°; and a second crop of 130 mg. of (V), M.P., 265–268°;

$\lambda_{max.}^{Nujol}$ 5.80, 6.05μ

EXAMPLE 18

*3,16-diacetyl-Δ⁸-eburicene-3β,16α-diol-21-oic acid (CI)*

Following the procedure set forth in Example 16, but substituting 3,16-diacetyl-tumulosic acid (XCVIII) for acetyl-eburicoic acid, yields 3,16-diacetyl-Δ⁸-eburicene-3β,16α-diol-21-oic acid (CI), M.P. 231–231.5°.

EXAMPLE 19

*16-acetyl-Δ⁷,⁹⁽¹¹⁾-eburicadiene-16α-ol-3-one-21-oic acid (CXCIX)*

Following the procedure set forth in Example 16, but substituting 16-acetyl-polyporenic acid (CXCVIII), for acetyl-eburicoic acid, yields 16-acetyl-Δ⁷,⁹⁽¹¹⁾-eburicadiene-16α-ol-3-one-21-oic acid (CXCIX).

EXAMPLE 20

*Methyl-3-acetyl-Δ⁸-eburicene-3β-ol-7,11-dione 21-oate (VIII)*

A solution of 40 g. of chromic acid in 470 ml. of glacial acetic acid and 30 ml. of water is added to 52.8 g. of methyl-3-acetyl-Δ⁸-eburicene-3β-ol-21-oate (VII) in 2.5 liters of glacial acetic acid, over a period of one hour, during which the temperature of the mixture is maintained at 75°. The temperature of the mixture is maintained at 75° for an additional hour, at which time the excess chromic acid is decomposed by the addition of 45 ml. of methanol. The reaction mixture is concentrated on the rotary evaporator to approximately 200 ml. and after dilution with 400 ml. of water is extracted with chloroform. The chloroform solution is washed with saturated aqueous sodium chloride, 5% potassium bicarbonate and saturated aqueous sodium chloride and evaporated to dryness. The resultant crude orange semicrystalline product is dissolved in 100 ml. of hexane and 500 ml. of methanol and the solution is concentrated until discernible crystallization commences. Orange, impure Δ⁸-eburicene-7,11-dione (VIII) is collected and redissolved in 200 ml. of benzene. 54 g. neutral alumina is added to the benzene solution and after swirling for 5 minutes is removed by filtration. The alumina is washed with 500 ml. of benzene and the combined filtrates evaporated to yield 26.50 g. of a yellow crystalline material. Recrystallization from methanol gives 19.961 g. of the Δ⁸-eburicene-7,11-dione (VIII), M.P. 172–173°;

$\lambda_{max.}^{Etoh}$ 270 mμ

(ε=8,600), and a second crop of 3.763 g., M.P. 167–168°;

$\lambda_{max.}^{Nujol}$ 5.76μ, 5.90μ (sh), 5.94μ

EXAMPLE 21

*Methyl 3,16-diacetyl-Δ⁸-eburicene-3β,16α-diol-7,11-dione-21-oate (CIV)*

Following the procedures set forth in Example 20, but substituting methyl 3,16-diacetyl-Δ⁸-eburicene-3β,16α-diol-21-oate (CIII), for methyl-3-acetyl-Δ⁸-eburicene-3β-ol-21-oate, yields methyl 3,16-diacetyl-Δ⁸-eburicene-3β,16α-diol-7,11-dione-21-oate (CIV).

EXAMPLE 22

*Δ⁷,⁹⁽¹¹⁾eburicadiene-3,16α-diol-21-oic acid (CCIII)*

To a solution of 5.4 g. of Δ⁷,⁹⁽¹¹⁾-eburicadiene-16-ol-3-one-21-oic acid (CCI) in 500 ml. of isopropyl alcohol is added 23 g. of sodium, and the mixture is heated under reflux conditions for 1 hour. After dilution with water, and extraction with ether, 3.5 g. of Δ⁷,⁹⁽¹¹⁾-eburicadiene-3,16α-diol-21-oic acid (CCIII) is obtained.

EXAMPLE 23

*3-acetyl-Δ⁸-eburicene-3β-ol-7,11-dione-21-oic aid (IX)*

Following the procedure set forth in Example 20, but substituting 3-acetyl-Δ⁸-eburicene-3β-ol-21-oic acid (V) for methyl-3-acetyl-Δ⁸-eburicene-3β-ol-21-oate, yields 3- acetyl-Δ⁸-eburicene-3β-ol-7,11-dione-21-oic acid (IX), M.P. 286–288°.

EXAMPLE 24

*3,16-diacetyl-Δ⁸-eburicene-3β,16α-diol-7,11-dione-21-oic acid (CV)*

Following the procedure set forth in Example 20 but substituting 3,16-diacetyl-Δ⁸-eburicene-3β,16α-diol-21-oic acid (CI) for methyl 3-acetyl-Δ⁸-eburicene-3β-ol-21-oate, yields 3,16-diacetyl-Δ⁸-eburicene-3β,16α-diol-7,11-dione-21-oic acid (CV).

EXAMPLE 25

*Methyl 3-acetyl-eburicane-3β-ol-7,11-dione-21-oate (XI)*

A solution of methyl-3-acetyl-Δ⁸-eburicene-3β-ol-7,11-dione-21-oate (VIII) in 1.5 liters of glacial acetic acid is heated to reflux and 275 g. of granulated zinc (30 mesh) is added over a period of 15 minutes. After an additional 30 minutes, 75 g. of zinc dust is added. Heating of the mixture is continued until the total reflux time from the start of the first addition equals 60 minutes. The solution is cooled and filtered and the acetic acid is evaporated in vacuo. Recrystallization from methanol-chloroform gives a first crop of 27.13 g. of methyl-3-acetyl-eburicane-3β-ol-7,11-dione-21-oate (XI), M.P. 192–193°; a second crop of 19.22 g. of XI, M.P. 191–192°; and a third crop of 2.16 g. of XI; M.P. 188–189°;

$\lambda_{max.}^{Nujol}$ 5.74, 5.83, 5.88μ

EXAMPLE 26

*Methyl-3,16-diacetyl-eburicane-3β,16α-diol-7,11-dione-21-oate (CVII)*

Following the procedure set forth in Example 25 but substituting methyl-3,16-diacetyl-Δ⁸-eburicene-3β,16α-diol-7,11-dione 21-oate (CIV), for methyl-3-acetyl-Δ⁸-eburicene-3β-7,11-dione 21-oate, yields methyl-3,16-diacetyl-eburicane-3β,16α-diol-7,11-dione-21-oate (CVII).

EXAMPLE 27

*Methyl-Δ⁷,⁹⁽¹¹⁾-eburicadiene-3,16α-diol-21-oate (CV)*

A solution of methyl-Δ⁷,⁹⁽¹¹⁾-eburicadiene-16α-ol-3-one-21-oate (CCII) in dioxane, is treated with sodium borohydride in aqueous dioxane for one hour at room temperature. Acidification of the mixture with 5% hydrochloric acid and extraction with ether yields a crude product which after recrystallization from methanol-chloroform, gives methyl-Δ⁷,⁹⁽¹¹⁾-eburicadiene-3,16α-diol-21-oate (CV).

EXAMPLE 28

*Methyl-3,16-diacetyl-Δ⁷,⁹⁽¹¹⁾-eburicadiene-3,16α-diol-21-oate (CCVI)*

Methyl-Δ⁷,⁹⁽¹¹⁾-eburicadiene-3,16α-diol-21-oate is treated with a solution of acetic anhydride in pyridine containing 2.1 mole equivalents of acetic anhydride at room temperature for eighteen hours. The reagents are evaporated in vacuo and the crystalline residue is recrystallized from methanol. After two crystallizations, methyl-3,16-diacetyl-Δ⁷,⁹⁽¹¹⁾-eburicadiene-3,16α-diol-21-oate (CCVI) is obtained.

Similarly, following the procedure of Example 28, but substituting Δ⁷,⁹⁽¹¹⁾-eburicadiene-3,16α-diol-21-oic acid (CCIII) for methyl-Δ⁷,⁹⁽¹¹⁾-eburicadiene-3,16α-diol-21-oate, yields 3,16-diacetyl-Δ⁷,⁹⁽¹¹⁾-eburicadiene-3,16α-diol-21-oic acid (CCIV).

EXAMPLE 29

*3-acetyl-eburicane-3β-ol-7,11-dione-21-oic acid (XII)*

Following the procedure of Example 25 but substituting 3-acetyl-Δ⁸-eburicene-3β-ol-7,11-dione-21-oic acid (IX) for methyl-3-acetyl-Δ⁸-eburicene-3β-ol-7,11-dione-21-oate, yields 3-acetyl-eburicane-3β-ol-7,11-dione-21-oic acid (XII).

EXAMPLE 30

*3,16-diacetyl-eburicane-3β,16α-diol-7,11-dione-21-oic acid (CVIII)*

Following the procedure set forth in Example 25, but substituting 3,16-diacetyl-Δ⁸-eburicene-3β,16α-diol-7,11-dione-21-oic acid (CV) for 3-acetyl-Δ⁸-eburicene-3β-ol-7,11-dione-21-oic acid, yields 3,16-diacetyl-eburicane-3β,16α-diol-7,11-dione-21-oic acid (CVIII).

EXAMPLE 31

*Methyl-eburicane-3β-ol-7,11-dione-21-oate (X)*

A solution of 20 ml. of 1 N ethanolic potassium hydroxide containing 100 mg. of methyl 3-acetyl-eubricane-3β-ol-7,11-dione-21-oate (XI) is held at room temperature for 14 hours. After neutralization with 20% sulfuric acid, dilution with water and evaporation of the ethanol, the residue is extracted with chloroform and the chloroform solution is washed with water and evaporated. Recrystallization of the crude product from methanol-chloroform yields 20 mg. of methyl-eubricane-3β-ol-7,11-dione-21-oate (X), M.P. 178–179°.

EXAMPLE 32

*Methyl-eburicane-3β,16α-diol-7,11-dione-21-oate (CVI)*

Following the procedure set forth in Example 31, but substituting methyl-3,16-diacetyl-eburicane-3β,16α-diol-7,11-dione-21-oate (CVII), for methyl 3-acetyl-eburicane-3β-ol-7,11-dione-21-oate, yields methyl-eburicane-3β,16α-diol-7,11-dione-21-oate (CVI).

EXAMPLE 33

*Methyl-3,16-diacetyl-Δ⁸-eburicane-3β,16α-diol-7,11-dione-21-oate (CIV)*

Following the procedure set forth in Example 20, but substituting methyl-3,16-diacetyl-Δ⁷,⁹⁽¹¹⁾-eburicadiene-3β,16α-diol-21-oate, obtained in Example 28, for methyl-3-acetyl-Δ⁸-eburicene-3β-ol-21-oate, yields methyl-3,16-diacetyl-Δ⁸-eburicene-3β,16α-diol-7,11-dione-21-oate (CIV).

EXAMPLE 34

*Methyl-3-acetyl-7-ethylenedithio-eburicane-3β-ol-11-one-21-oate (XIII)*

40 ml. of freshly distilled boron trifluoride-etherate is added to a solution of 22.60 g. of methyl-3-acetyl eburicane-3β-ol-7,11-dione-21-oate (XI) and the mixture is held at room temperature for 72 hours. The completely solid mixture is stirred with cold methanol, filtered and washed with cold 50% aqueous methanol. The dithioethylene ketal (XIII) thus obtained is then dissolved in chloroform, washed with 5% sodium hydroxide and water, dried over magnesium sulfate and the chloroform is evaporated. Recrystallization from methanol-chloroform yields two crops weighing 21.63 g., M.P. 224–225°. The analytical sample of methyl-3-acetyl-7-ethylenedithio-eburicane-11-one-21-oate (XIII) (methanol-hexane) has an M.P. 227.5–228°, $[\alpha]_D^{21}$+23.9° (chlf. C. 0.48)

$\lambda_{max.}^{Nujol}$ 5.75, 5.88μ

*Analysis.*—Calcd. for $C_{36}H_{58}O_5S_2$: C, 68.11; H, 9.21; S, 10.08. Found: C, 67.81; H, 9.13; S, 10.39.

EXAMPLE 35

*Methyl-3,16-diacetyl-7-ethylenedithio-eubricane-3β,16α-diol-11-one-21-oate (CIX)*

Following the procedure set forth in Example 34, but substituting methyl-3,16-diacetyl-eburicane-3β,16α-diol-7,11-dione-21-oate (CVII), for methyl-3-acetyl-eburicane-3β-ol-7,11-dione-21-oate, yields methyl-3,16-diacetyl-7-ethylenedithio-eburicane-3β,16α-diol-11-one-21-oate (CIX).

EXAMPLE 36

*Methyl-3-acetyl eburicane-3β-ol-11-one-21-oate (XIV)*

A solution of 150 mg. of methyl-3-acetyl-eburicane-3β-ol-7,11-dione-21-oate (XI) in 25 ml. of diethylene glycol containing 0.5 ml. of 85% hydrazine hydrate is heated at reflux for 2 hours. After cooling, 3 g. of potassium hydroxide in 5 ml. of diethylene glycol is added and the temperature of the solution is raised to 195° by distilling off water and hydrazine. The temperature of the solution is maintained at 195° for 4 hours, after which it is cooled. The cooled reaction mixture is poured into 100 ml. of 3 N hydrochloric acid and extracted with ether and chloroform. The combined organic layer is washed with water, dried over sodium sulfate and evaporated. The crude product is reacetylated with acetic anhydride in pyridine at room temperature, remethylated by treatment with ethereal diazomethane and then chromatographed on 4 g. of neutral alumina. The benzene-chloroform eluates are recrystallized from methanol to give 9 mg. of methyl-3-acetyl-eburicane-3β-ol-11-one-21-oate (XIV), M.P. 155–156°.

$\lambda_{max}^{Nujol}$ 5.80, 5.86μ

*Analysis.*—Calcd. for $C_{34}H_{56}O_5$: C, 74.95; H, 10.36. Found: C, 74.54; H, 10.17.

EXAMPLE 37

*Methyl-3,16-diacetyl-eburicane-3β,16α-diol-11-one-21-oate (CX)*

Following the procedure set forth in Example 36, but substituting methyl-3,16-diacetyl-eburicane-3β,16α-diol-7,11-dione-21-oate (CVII), for methyl-3-acetyl-eburicane-3β-ol-7,11-dione-21-oate, yields methyl-3,16-diacetyl-eburicane-3β,16α-diol-11-one-21-oate (CX).

EXAMPLE 38

*Methyl-3-acetyl-eburicane-3β-ol-11-one-21-oate (XIV)*

360 cc. of sponge nickel catalyst is washed with absolute ethanol and added to a solution of 10.0 g. of methyl-3-acetyl-7-ethylenedithio-3β-ol-11-one-21-oate (XIII) in 1.5 liters of absolute ethanol and the mixture is heated at reflux for 16 hours. The catalyst is filtered and washed with alcohol and acetone. The combined filtrates are evaporated, the residue dissolved in chloroform and the chloroform solution filtered. Concentration of the chloroform and addition of methanol gives a first crop of 6.84 g. of methyl-3-acetyl-eburicane-3β-ol-11-one-21-oate (XIV), M.P. 164–165°. The second crop weights 1.011 g. and melts at 158–159°. The analytical sample from methanol has the following properties: M.P. 166–167°; $[\alpha]_D^{21} +52.2°$ (chlf. C, 0.62);

$\lambda_{max}^{Nujol}$ 5.76, 5.94(sh)μ

*Analysis.*—Calcd. for $C_{34}H_{26}O_5$: C, 74.95; H, 10.36. Found: C, 74.71; H, 10.28.

EXAMPLE 39

*Methyl-3,16-diacetyl-eburicane-3β,16α-diol-11-one-21-oate (CX)*

Following the procedure set forth in Example 38, but substituting methyl-3,16-diacetyl-7-ethylenedithio-eburicane-3β,16α-diol-11-one-21-oate (CIX) for methyl-3-acetyl-7-ethylenedithio-eburicane-3β-ol-11-one-21-oate, yields methyl-3,16-diacetyl-eburicane-3β,16α-diol-11-one-21-oate (CX).

EXAMPLE 40

*Methyl-eburicane-3β-ol-11-one-21-oate (XV)*

A solution of 2.0 g. of methyl-3-acetyl-eburicane-3β-ol-11-one-21-oate (XIV) in 400 ml. of 1 N ethanolic potassium hydroxide is allowed to stand at room temperature for 18 hours. The solution is then neutralized with 20% sulfuric acid, diluted with water and the ethanol evaporated. The aqueous suspension is then extracted with ether and the ether solution washed with water, dried over magnesium sulfate and evaporated. Recrystallization from methanol yields 1.55 g. of methyl-eburicane-3β-ol-11-one-21-oate (XV), M.P. 133–135°. The analytical sample melts at 137–139°;

$\lambda_{max}^{Nujol}$ 2.97, 5.77, 5.89μ

*Analysis.*—Calcd. for $C_{32}H_{54}O_4$: C, 76.44; H, 10.83. Found: C, 76.14; H, 10.63.

EXAMPLE 41

*Methyl-eburicane-3β,16α-diol-11-one-21-oate (CXI)*

Following the procedure set forth in Example 40, but substituting methyl-3,16-diacetyl-eburicane-3β,16α-diol-11-one-21-oate (CX), for methyl-3-acetyl-eburicane-3β-ol-11-one-21-oate, yields methyl-eburicane-3β,16α-diol-11-one-21-oate (CXI).

EXAMPLE 42

*3-acetyl-eburicane-3β-ol-11-one-21-oic-acid (XVI)*

554 mg. (1 mmole) of methyl-3-acetyl-eburicane-3β-ol-11-one-21-oate (XIV) is demethylated by refluxing in 20 ml. of collidine distilled over potassium hydroxide, containing 870 mg. of lithium iodide (6.6 mmole) under nitrogen for 15 hours. The cooled dark brown reaction mixture is poured into 500 ml. of iced 2 N-hydrochloric acid and extracted with ether-methylene chloride. The organic layer is washed with 2 N hydrochloric acid and water, dried over magnesium sulfate and evaporated to dryness. The product is reacetylated by treatment with pyridine-acetic anhydride at room temperature and is allowed to stand overnight. Recrystallization of the reacetylated material from methanol-chloroform yields a first crop of 251 mg. of 3-acetyl-eburicane-3β-ol-11-one-21-oic acid (XVI), M.P. 284–286°; and a second crop of 83 mg., M.P. 283–284°. The analytical sample has the following properties: M.P. 286–287°;

$\lambda_{max}^{Nujol}$ 5.81, 5.89, 6.04, 8.03μ

*Analysis.*—Calcd. for $C_{33}H_{54}O_5$: C, 74.67; H, 10.26. Found: C, 74.37; H, 9.56.

EXAMPLE 43

*3,16-diacetyl-eburicane-3β,16α-diol-11-one-21-oic acid (CXII)*

Following the procedure set forth in Example 42, but substituting methyl-3,16-diacetyl-eburicane-3β,16α-diol-11-one-21-oate (CX), for methyl-3-acetyl-eburicane-3β-ol-11-one-21-oate, yields 3,16-diacetyl-eburicane-3β,16α-diol-11-one-21-oic acid (CXII).

EXAMPLE 44

*Eburicane-3β-ol-11-one-21-oic acid (XVII)*

A solution of 1.017 g. of 3-acetyl-eburicane-3β-ol-11-one-21-oic acid (XVI) in 150 ml. of 1 N ethanolic potassium hydroxide is left overnight at room temperature. The solution is neutralized with 20% sulfuric acid, diluted with water and the ethanol evaporated. The aqueous suspension is extracted with chloroform and the chloroform solution washed with water, dried over magnesium sulfate and evaporated. Recrystallization from methanol-chloroform gives a first crop of 587 mg. of eburicane-3β-ol-11-one-21-oic acid (XVII), M.P. 289–292°; and a second crop of 167 mg., M.P. 288–291°.

$\lambda_{max}^{Nujol}$ 2.81, 5.78, 5.89, 6.00μ

*Analysis.*—Calcd. for $C_{31}H_{52}O_4$: C, 76.18; H, 10.72. Found: C, 76.08; H, 10.68.

EXAMPLE 45

*Eburicane-3β,16α-diol-11-one-21-oic acid (CXIII)*

Following the procedure set forth in Example 44 but substituting 3,16-diacetyl-eburicane-3β,16α-diol-11- one-21-oic acid (CXII) for 3-acetyl-eburicane-3β-ol-11-one-21-oic acid yields eburicane-3β,16α-diol-11-one-21-oic acid (CXIII).

EXAMPLE 46

*3-acetyl-Δ⁸-lanostene-3β-ol-24-one-21-oic acid (XXX)*

Through a solution of 15 g. of acetyl-eburicoic acid (I) in a mixture of 150 ml. of chloroform and 150 ml. of ethyl acetate, cooled in a Dry Ice-acetone bath, is passed 26.2 liters of ozone (1 mole of ozone contained in 0.89 liter of oxygen). The resulting solution is allowed to warm to room temperature and then added to a suspension of 975 mg. of pre-reduced 5% palladium on charcoal catalyst in 50 ml. of ethyl acetate. 550 ml. of hydrogen is taken up rapidly, following which the solution is filtered and the filtrate evaporated to dryness in vacuo to yield 3-acetyl-Δ⁸-lanostene-3β-ol-24-one-21-oic acid (XXIX).

EXAMPLE 47

*3,16α-diacetyl-Δ⁸-lanostene-3β,16α-diol-24-one-21-oic acid*

Following the procedure set forth in Example 46 but substituting 3,16-diacetyl-tumulosic acid (XCVIII), for acetyl-eburicoic acid yields 3,16α-diacetyl-Δ⁸-lanostene-3β,16α-diol-24-one-21-oic acid (CXXVII).

EXAMPLE 48

*Methyl-3-acetyl-Δ⁸-lanostene-3β-ol-24-one-21-oate (XXXI)*

A solution of 310 mg. of 3-acetyl-Δ⁸-lanostene-3β-ol-24-one-21-oic acid (XXX) in either, is methylated by treatment with diazomethane in ether. Two recrystallizations from methanol-chloroform yields pure methyl-3-acetyl-Δ⁸-lanostene-3β-ol-24-one-21-oate (XXXI), M.P. 173–174°; $[\alpha]_D^{22}+51.6°$ (chlf. C, 0.63);

$\lambda_{max.}^{KBr}$ 5.76–5.78, 5.83(sh), 8.05μ

*Analysis.*—Calcd. for $C_{33}H_{52}O_5$: C, 72.82; H, 10.06. Found: C, 72.80; H, 9.85.

EXAMPLE 49

*Methyl-3,16-diacetyl-Δ⁸-lanostene-3β,16α-diol-24-one-21-oate*

Following the procedure set forth in Example 48, but substituting 3,16 - diacetyl - Δ⁸ - lanostene - 3β,16α - diol-24-one-21-oic acid (CXXVII) for 3-acetyl-Δ⁸-lanostene-3β-ol-24-one-21-oic acid yields methyl-3,16-diacetyl-Δ⁸-lanostene-3β,16α-diol-24-one-21-oate (CXXVIII).

EXAMPLE 50

*Methyl-3-acetyl-Δ⁸-lanostene-3β-ol-7,11,24-trione-21-oate (XXXII)*

A solution of 5.5 g. of methyl acetyl eburicoate (II) in 450 ml. of glacial acetic acid is ozonized at room temperature. The reaction mixture is diluted with water and the precipitate solids are collected and dried in vacuo. The ozonolysis product is dissolved in 400 ml. of glacial acetic acid, warmed to 70° and oxidized by the dropwise addition of 6.6 g. of chromic acid in 100 ml. of 90% acetic acid over a period of 40 minutes. The solution is stirred magnetically and the temperature maintained at 70° for an additional hour and is then left to stand overnight at room temperature. Excess chromic acid is destroyed by the addition of methanol, and the resultant green solution is poured into 5 liters of water. Extraction with ether and washing of the ether solution with 5% sodium bicarbonate and water, drying the resultant solution over sodium sulfate and evaporation of the solvent yields 3.25 g. of yellow semi-crystalline material. Chromatography on 150 g. of acid washed alumina gives in benzene-ether eluates, 800 mg. of yellow crystalline methyl-3-acetyl-Δ⁸-lanostene-3β-ol-7,11,24-trione-21-oate (XXXIII). Recrystallization from methanol yields a first crop of 300 mg. of XXXII, M.P. 194–195° (softening at 192°);

$\lambda_{max.}^{EtOH}$ 270mμ

(ε=8,700); and a second crop of 150 mg. of (XXXII), M.P. 186–188°;

$\lambda_{max.}^{EtOH}$ 271mμ (ε=8,600); $\lambda_{max.}^{Nujol}$ 5.77, 5.82, 5.91, 5.98, 8.05μ.

EXAMPLE 51

*Methyl-3,16-diacetyl-Δ⁸-lanostene-3β,16α-diol-7,11,24-trione-21-oate (CXXIX)*

Following the procedure set forth in Example 50, but substituting methyl-diacetyl-tumulosate (XCIX) for methyl-acetyl-eburicoate yields methyl-3,16-diacetyl-Δ⁸-lanostene-3β,16α-diol-7,11,24-trione-21-oate (CXXIX).

EXAMPLE 52

*Methyl-3-acetyl-Δ⁸-lanostene-3β-ol-7,11,24-trione-21-oate (XXXII)*

To a solution of 87 mg. of methyl-3-acetyl-Δ⁸-lanostene-3β-ol-24-one-21-oate (XXXI) in 8 ml. of glacial acetic acid at 70° is added 98 mg. of chromic acid in 2 ml. of 90% acetic acid. The solution is held at 70° for an additional hour and is left to stand overnight at room temperature after which methanol is added to decompose the excess chromic acid. Water is added to the reaction mixture which is concentrated to 10 ml. in the rotary evaporator, diluted to 25 ml. with water and extracted with ethyl acetate. The ethyl acetate solution is washed with 5% potassium bicarbonate and water, dried over sodium sulfate and evaporated to 75 mg. of yellow oily material. Chromatography on 7 g. of neutral alumina gives 29 mg. of yellow crystalline material in the benzene-chloroform fractions. Recrystallizations from methanol yields 14 mg. of methyl-3-acetyl-Δ⁸-lanostene-3β-ol-7,11,24-trione-21-oate (XXXII), M.P. 189–192°.

EXAMPLE 53

*Methyl-3,16-diacetyl-Δ⁸-lanostene-3β,16α-diol-7,11,24-trione 21-oate (CXXIX)*

Following the procedure set forth in Example 52 but substituting methyl - 3,16 - diacetyl-Δ⁸-lanostene-3β,16α-diol-24-one-21-oate (CXXVIII) for methyl-3-acetyl-Δ⁸-lanostene-3β-ol-24-one-21-oate yields methyl-3,16-diacetyl-Δ⁸-lanostene - 3β,16α - diol - 7,11,24 - trione 21-oate (CXXIX).

EXAMPLE 54

*Methyl-3-acetyl-lanostane-3β-ol-7,11,24-trione-21-oate (XXXIV)*

To a refluxing solution of 207 mg. of methyl-3-acetyl-Δ⁸-lanostene-3β-ol-7,11,24-trione-21-oate (XXXII) in 15 ml. of glacial acetic acid is added 1.24 g. of zinc dust over a period of 5 minutes. The yellow color of the solution is discharged after 10 minutes and heating is continued for an additional 30 minutes. The reaction mixture is cooled, filtered from zinc and zinc acetate, evaporated to dryness in vacuo, and the resulting residue dissolved in ethyl acetate. The solution is then washed with water, dried over sodium sulfate and evaporated to yield 198 mg. of white crystalline material. Recrystallization from methanol-methylene chloride yields a first crop of 169 mg. of methyl-3-acetyl-lanostane-3β-ol-7,11,24-trione-21-oate (XXXIV), M.P. 243.5–245° and a second crop of 21 mg. of (XXXIV), M.P. 240–241.5°. The analytical sample from a methanol recrystallization has the following physical properties: M.P. 244–245°; $[\alpha]_D^{25}$ +50.4° (chlf. C, 1.10);

$\lambda_{max.}^{Nujol}$ 5.78, 5.85, 5.89, 8.05μ

*Analysis.*—Calcd. for $C_{33}H_{50}O_7$: C, 70.93; H, 9.02. Found: C, 70.96; H, 9.05.

EXAMPLE 55

*Methyl-3,16-diacetyl-lanostane-3β,16α-diol-7,11,24 trione 21-oate (CXXXI)*

Following the procedure set forth in Example 54 but substituting methyl - 3,16 - diacetyl - Δ⁸-lanostene-3β,16α-diol-7,11,24-trione-21-oate acid (CXXIX) for methyl-3-acetyl-Δ⁸-lanostene-3β-ol-7,11,24-trione - 21 - oate yields methyl-3,16-diacetyl - lanostane - 3β,16α - diol - 7,11,24-trione-21-oate (CXXXI).

EXAMPLE 56

*3-acetyl-Δ⁸-lanostene-3β-ol-7,11,24-trione-21-oic acid (XXXIII)*

Following the procedure set forth in Example 52 but substituting 3-acetyl-Δ⁸-lanostene-3β-ol-24-one-21-oic acid (XXX) for methyl-3-acetyl-Δ⁸-lanostene-3β-ol-24-one-21-oate, 3 - acetyl - Δ⁸ - lanostene-3β-ol-7,11,24-trione-21-oic acid (XXXIII) is obtained.

EXAMPLE 57

*3,16-diacetyl-Δ⁸-lanostene-3β,16α-diol-7,11,24-trione 21-oic acid (CXXX)*

Following the procedure set forth in Example 52 but substituting 3,16-diacetyl-Δ⁸-lanostene-3β,16α-diol-24-one-21-oic acid (CXXVII) for methyl-3-acetyl-Δ⁸-lanostene-3β-ol-24-one-21-oate yields 3,16 - diacetyl - Δ⁸-lanostene-3β,16α-diol-7,11,24-trione-21-oic acid (CXXX).

EXAMPLE 58

*3-acetyl-lanostane-3β-ol-7,11,24-trione-21-oic acid (XXXV)*

Following the procedure of Example 54, but substituting 3-acetyl-Δ⁸-lanostene-3β-ol-7,11,24-trione-21-oic acid (XXXIII) for methyl-3-acetyl-Δ⁸-lanostene-3β-ol-7,11,24-trione-21-oate, 3-acetyl-lanostane-3β-ol-7,11,24-trione-21-oic acid (XXXV) is obtained.

EXAMPLE 59

*3,16-diacetyl-lanostane-3β,16α-diol-7,11,24-trione-21-oic acid (CXXXII)*

Following the procedure set forth in Example 54 but substituting 3,16-diacetyl-Δ⁸-lanistene-3β,16α-diol-7,11,24-trione-21-oic acid (CXXX) for methyl-3-acetyl-Δ⁸-lanostene-3β,16α-diol-7,11,24-trione-21-oate yields 3,16-diacetyl-lanostane-3β,16α - diol - 7,11,24 - trione - 21 - oic acid (CXXXII).

EXAMPLE 60

*Methyl-3-acetyl-24-ethylenedithio-lanostane-3β-ol-7,11-dione-21-oate (XXXVII)*

To a solution of 139 mg. of methyl-3-acetyl-lanostane-3β-ol-7,11,24-trione-21-oate (XXXIV) in 5 ml. of ethanedithiol is added 5 ml. of freshly distilled boron-trifluoride-etherate. After being allowed to stand for 30 minutes at room temperature, the reaction mixture is poured into ice-water. The organic layer is separated and the aqueous layer is extracted with ether. The combined organic layers are evaporated and dried under high vacuum. The solid residue is recrystallized from methanol-methylene chloride to give 60 mg. of sulfur containing material, M.P. 260–270°. Repeated recrystallization of the impure product from methanol-methylene chloride yields 13 mg. of the methyl-3-acetyl-24-ethylenedithio-lanostane-3β-ol-7,11-dione-21-oate (XXXVII) having the following physical properties: M.P. 251–252°;

$$\lambda_{max.}^{Nujol} \; 5.74, \; 5.80, \; 5.87\mu$$

*Analysis.*—Calcd. for $C_{35}H_{54}O_6S_2$: C, 66.22; H, 8.59; S, 10.08. Found: C, 66.37; H, 8.83; S, 11.71.

EXAMPLE 61

*Methyl-3,16-diacetyl-24-ethylenedithio-lanostane-3β,16α-diol-7,11-dione-21-oate (CXXXV)*

Following the procedure set forth in Example 60, but substituting methyl-3,16-diacetyl-lanostane - 3β,16α-diol-7,11,24-trione-21-oate (CXVII) for methyl-3-acetyl-lanostane-3β-ol-7,11,24-trione-21-oate yields methyl-3,16-diacetyl - 24-ethylene-dithio-lanostane-3β,16α-diol-7,11-dione-21-oate (CXX).

EXAMPLE 62

*3-acetyl-24-ethylenedithio-lanostane-3β-ol-7,11-dione-21-oic acid*

Following the procedure of Example 60, but substituting 3-acetyl-lanostane - 3β-ol-7,11-24-trione-21-oic acid (XXXV) for methyl-3-acetyl-lanostane-3β-ol-7,11,24-trione-21-oate, yields 3-acetyl-24-ethylenedithio-lanostane-3β-ol-7,11-dione-21-oic acid.

EXAMPLE 63

*3,16-diacetyl-24-ethylenedithio-lanostane-3β,16α-diol-7,11-dione-21-oic acid (CXXXVI)*

Following the procedure set forth in Example 60 but substituting 3,16 - diacetyl-lanostane-3β,16α-diol-7,11-24-trione-21-oic acid (CXXXII) for methyl-3-acetyl-lanostane-3β-ol-7,11,24-trione-21-oate yields 3,16-diacetyl-24-ethylenedithio-lanostane-3β,16α-diol-7,11-dione - 21 - oic acid (CXXXVI).

EXAMPLE 64

*Methyl-3-acetyl-lanostane-3β-ol-7,11-dione-21-oate (XL)*

39 mg. of impure methyl-3-acetyl-24-ethylenedithio-lanostane-3β-ol-7,11-dione-21-oate (XXXVII) in 25 ml. of acetone with 2 g. of Raney nickel is heated under reflux for 12 hours. The nickel is removed by filtration and the solvent evaporated to yield 27 mg. of crystalline material. Two successive recrystallizations from methanol yields methyl-3-acetyl-lanostane-3β-ol-7,11-dione-21-oate (XL) having the following properties: M.P. 193–194°;

$$\lambda_{max.}^{CHCl_3} \; 5.75 \text{ and } 5.83\mu$$

*Analysis.*—Calcd. for $C_{33}H_{52}O_6$: C, 72.75; H, 9.62. Found: C, 72.72; H, 9.31.

EXAMPLE 65

*Methyl-3,16-diacetyl-lanostane-3β,16α-diol-7,11-dione-21-oate (CXXXIX)*

Following the procedure set forth in Example 64, but substituting methyl-3,16-diacetyl-24-ethylenedithio - lanostane-3β,16α-diol-7,11-dione-21-oate (CXXXV) for methyl-3-acetyl-24-ethylenedithio-lanostane-3β-ol-7,11 - dione-21-oate yields methyl-3,16-diacetyl-lanostane-3β,16α-diol-7,11-dione-21-oate (CXXXIX).

EXAMPLE 66

*3-acetyl-lanostane-3β-ol-7,11-dione-21-oic acid (XLI)*

Following the procedure of Example 64 but substituting 3-acetyl-24-ethylenedithio-lano-stane-3β - ol - 7,11-dione-21-oic acid, obtained in Example 62, for methyl-3-acetyl-24-ethylenethio-lanostane-3β-ol-7,11-dione-21-oate, yields 3-acetyl-lanostane 3β-ol-7,11-dione-21-oic acid (XLI).

EXAMPLE 67

*3,16-diacetyl-lanostane-3β-16α-diol-7,11-dione-21-oic acid (CXL)*

Following the procedure set forth in Example 64 but substituting 3,16-diacetyl-24-ethylenedithio-lanostane-3β-16α-diol-7,11-dione-21-oic acid (CXXXVI) for methyl-3-acetyl-24-ethylenedithio-lanostane-3β-ol-7,11-dione - 21-oate yields 3,16-diacetyl-lanostane-3β,16α-diol-7,11-dione-21-oic acid (CXL).

EXAMPLE 68

*Methyl-3-acetyl-7,24-bis-ethylenedithio-lanostane-3β-ol-11-one-21-oate (XXXVI)*

A solution of 236 mg. of methyl-3-acetyl-lanostane-3β-ol-7,11,24-trione-21-oate (XXXIV) in 0.8 ml. of ethanedithiol and 1.0 ml. of freshly distilled boron trifluoride-etherate is held at room temperature. After 20 hours, solid material appears in the mixture. After 4 days the now solid mass of crystals is triturated with methanol, filtered and the collected solids washed with aqueous methanol and air dried. An ethereal solution of the solid is washed with 5% sodium hydroxide and water, dried over sodium sulfate and evaporated to yield 310 mg. of crude bis-thioethylene ketal (XXXVI). Recrystallization of 80 mg. of this material yields 40 mg. of analytically pure methyl-3-acetyl-7,24-bis-ethylenedithio-lanostane-3β-ol-11-one-21-oate (XXXVI) having the following properties: M.P. 271–272° (sinters at 267°).

*Analysis.*—Calcd. for $C_{37}H_{58}O_5S_4$: C, 62.42; H, 8.28; S, 18.01. Found: C, 61.88; H, 8.27; S, 18.52.

EXAMPLE 69

*Methyl-3,16-diacetyl-7,24-bis-ethylenedithio-lanostane-3β,16α-diol-11-one-21-oate (CXXXIII)*

Following the procedure set forth in Example 68, but substituting methyl-3,16-diacetyl-lanostane - 3β,16α - diol-7,11,24-trione-21-oate (CXXXI) for methyl-3-acetyl-lanostane-3β-ol-7,11,24-trione-21-oate yields methyl-3,16-diacetyl-7,24-bis-ethylenedithio-lanostane - 3β,16α-diol-11-one-21-oate (CXXXIII).

EXAMPLE 70

*3-acetyl-7,24-bis-ethylenedithio-lanostane-3β-ol-11-one-21-oic acid*

Following the procedures of Example 68, but substituting 3-acetyl-lanostane-3β-ol-7,11,24-trione - 21 - oic acid (XXXV) for methyl-3-acetyl-lanostane-3β-ol-7,11,24-trione-21-oate yields 3-acetyl-7,24-bis-ethylenedithio-lanostane-3β-ol-11-one-21-oic acid.

EXAMPLE 71

*3,16-diacetyl-7,24-bis-ethylenedithio-lanostane-3β,16α-diol-11-one-21-oic acid (CXXXIV)*

Following the procedure set forth in Example 68, but substituting 3,16-diacetyl-lanostane-3β,16α-diol - 7,11,24-trione-21-oic acid (CXXXII), for methyl-3-acetyl-lanostane-3β-ol-7,11-24-trione-21-oate yields 3,16 - diacetyl-7,24-bis-ethylenedithio - lanostane-3β,16α-diol-11-one-21-oic acid (CXXXIV).

EXAMPLE 72

*Methyl-3-acetyl-lanostane-3β-ol-11-one-21-oate (XXXVIII)*

A solution of 22 mg. of the bis-thioketal (XXXVI) in 50 ml. of absolute ethanol is refluxed overnight with Raney nickel. The Raney nickel is then removed by filtration and the solvent is evaporated. The residue, on recrystallization from methanol gives 10 mg. of methyl-3-acetyl-lanostane-3β-ol-11-one-21-oate (XXXVIII) having the following properties: M.P. 177–178°;

$[\alpha]_D^{20} + 54.7°$ (chlf. C, 0.53);

$\lambda_{max.}^{Nujol}$ 5.75, 5.89, 8.01μ

EXAMPLE 73

*Methyl-3,16-diacetyl-lanostane-3β,16α-diol-11-one-21-oate (CXXXVII)*

Following the procedure set forth in Example 72, but substituting 3,16 - diacetyl-7,24-bis-ethylenedithio - lanostane-3β,16α-diol-11-one-21-oate (CXXXIII) for methyl-3 - acetyl - 7,24-bis-ethylenedithio-3β-ol-11-one-21-oate yields methyl-3,16-diacetyl-lanostane-3β,16α-diol-11-one-21-oate (CXXXVII).

EXAMPLE 74

*3-acetyl-lanostane-3β-ol-11-one-21-oic acid (XXXIX)*

Following the procedure of Example 72, but substituting 3-acetyl-7,24-bis-ethylenedithio-lanostane-3β-ol-11-one-21-oic acid obtained in Example 70, for the bis-thioketal (XXXVI) yields 3-acetyl-lanostane-3β-ol-11-one-21-oic acid (XXXIX).

EXAMPLE 75

*3,16-diacetyl-lanostane-3β,16α-diol-11-one-21-oic acid (CXXXVIII)*

Following the procedure set forth in Example 72, but substituting 3,16 - diacetyl-7,24-bis-ethylenedithio-lanostane-3β,16α-diol-11-one-21-oic acid (CXXXIV) for the bis-thioketal (XXXVI) yields 3,16-diacetyl-lanostane-3β,16α-diol-11-one-21-oic acid (CXXXVIII).

EXAMPLE 76

*Methyl-3-acetyl-lanostane-3β-ol-11-one-21-oate (XXXVIII)*

A solution of 215 mg. of methyl-3-acetyl-lanostane-3β-ol-7,11,24-trione-21-oate (XXXIV) in 30 ml. of diethylene glycol containing 3 g. of potassium hydroxide and 1 ml. of 85% hydrazine hydrate is heated at reflux for 30 minutes. The temperature of the mixture is then raised to 195° by the distillation of water and hydrazine, and held at 195° for two hours. The solution after cooling, is poured into 100 ml. of 3% hydrochloric acid and is extracted with chloroform. Evaporation of the chloroform leaves a residue of 163 mg. which when reacetylated by treatment with pyridine and acetic anhydride and then remethylated by treatment with ethereal diazomethane, yields 187 mg. of crude methyl-3-acetyl-lanostane-3β-ol-11-one-21-oate (XXXVIII) which is chromatographed on 15 g. of neutral alumina. Evaporation of the benzene-chloroform eluate yields 74 mg. of material, which after two recrystallizations from methanol gives 21 mg. of XXXVIII having an M.P. of about 172–174.5°. The analytical sample melts at 178–179.5° and has the following properties:

$\lambda_{max.}^{Nujol}$ 5.73, 5.86, 8.03μ

EXAMPLE 77

*Methyl-3,16-diacetyl-lanostane-3β,16α-diol-11-one-21-oate (CXXXVII)*

Following the procedure set forth in Example 76, but substituting methyl-3,16-diacetyl-lanostane-3β,16α - diol-7,11,24-trione-21-oate (CXXXI) for methyl-3-acetyl-lanostane-3β-ol-7,11,24-trione-21-oate yields methyl-3,16-diacetyl - lanostane - 3β,16α - diol - 11 - one - 21 - oate (CXXXVII).

EXAMPLE 78

*Methyl-3-acetyl-eburicane-3β,11β-diol-21-oate (LXXVII)*

A solution of 100 mg. of methyl-3-acetyl-eburicane-3β-ol-11-one-21-oate (XIV) in 10 ml. of dry tetrahydrofuran is added to 200 mg. of lithium borohydride in 15 ml. of tetrahydrofuran and is left at room temperature for 2 hours. The excess lithium borohydride is decomposed by the addition of 10 ml. of 10% aqueous acetic acid. The tetrahydrofuran is evaporated, the residue extracted with ether and the ether solution washed with water and evaporated. Three recrystallizations from methanol yields 39 mg. of analytically pure methyl-3-acetyl-eburicane-3β,11β-diol-21-oate (LXXVII) having the following properties: M.P. 203.5–204°; $[\alpha]_D^{20}$ +54.8° (chlf. C, 2.07);

$\lambda_{max.}^{Nujol}$ 2.85, 5.78, 5.80μ

*Analysis.*—Calcd. for $C_{34}H_{58}O_7$: C, 74.68; H, 10.69; $OCH_3$, 5.67. Found: C, 74.64; H, 10.21; $OCH_3$, 5.01.

Similarly, treating methyl-3-acetyl-lanostane-3β-ol-11- one-21-oate (XXXVIII) according to the procedure set forth in Example 78, yields methyl-3-acetyl-lanostane-3β,11β-diol-21-oate.

EXAMPLE 79

*Methyl-3,16-diacetyl-eburicane-3β,11β,16α-triol-21-oate (CLXXVI)*

Following the procedure set forth in Example 78 but substituting methyl-3,16-diacetyl-eburicane-3β,16α - diol-11-one-21-oate (CX) for methyl-3-acetyl-eburicane-3β-ol-11-one-21-oate yields methyl-3,16-diacetyl-eburicane-3β,11β,16α-triol-21-oate (CLXXVI).

EXAMPLE 80

*3-acetyl-eburicane-3β,11β-diol-21-oic acid (LXXVI)*

Following the procedure set forth in Example 78, but substituting 3-acetyl-eburicane-3β-ol-11-one-21-oic acid (XVI) for methyl-3-acetyl-eburicane-3β-ol-11-one-21-oate, yields 3-acetyl-eburicane-3β,11β-diol-21-oic acid (LXXVI).

Similarly, treating 3-acetyl-lanostane-3β-ol-11-one-21-oic acid according to the procedure set forth in Example 78, yields 3-acetyl-lanostane-3β,11β-diol-21-oic acid.

EXAMPLE 81

*3,16-diacetyl-eburicane-3β,11β,16α-triol-21-oic acid (CLXXV)*

Following the procedure set forth in Example 78 but substituting 3,16 - diacetyl-eburicane-3β,16α-diol-11-one-21-oic acid (CXII) for methyl-3-acetyl-eburicane-3β-ol-11-one-21-oate yields 3,16-diacetyl-eburicane-3β,11β,16α-triol-21-oic acid (CLXXV).

EXAMPLE 82

*Methyl-eburicane-3β,11β-diol-21-oate (LXXVIII)*

A solution of 109 mg. of methyl-eburicane-3β-ol-11-one-21-oate (XV) in 10 ml. of tetrahydrofuran is added dropwise to 113 mg. of lithium borohydride in 10 ml. of tetrahydrofuran and held at room temperature for two hours. The excess lithium borohydride is decomposed by the addition of 10% aqueous acetic acid. The tetrahydrofuran is evaporated, the residue extracted with chloroform and the chloroform solution washed with water and evaporated. The crude product is then recrystallized from methanol three times to yield 30 mg. of crude product having a melting point of 180.5–183°. One further recrystallization from methanol yields 19 mg. of methyl - eburicane - 3β,11β - diol - 21 - oate (LXXVIII) having the following properties: M.P. 186–188°;

$\lambda_{max}^{KBr}$ 2.80, 3.00, 5.83μ

*Analysis.*—Calcd. for $C_{32}H_{56}O_4$: C, 76.14; H, 11.18; $OCH_3$, 6.12. Found: C, 76.12; H, 11.35; $OCH_3$, 6.26.

EXAMPLE 83

*Methyl-eburicane-3β,11β,16α-triol-21-oate (CLXXVII)*

Following the procedure set forth in Example 82, but substituting methyl-eburicane - 3β,16α - diol-11-one-21-oate (CXI) for methyl eburicane-3β-ol-11-one-21-oate yields methyl-eburicane - 3β,11β,16α - triol - 21 - oate (CLXXVII).

EXAMPLE 84

*Methyl-3-acetyl-Δ⁹⁽¹¹⁾-eburicane-3β-ol-21-oate (LXXIX)*

To a solution of 15 mg. of methyl-3-acetyl-eburicane-3β,11β-diol-21-oate (LXXVII), in 1 ml. of dimethylformamide is added 0.1 ml. of pyridine and 0.05 ml. of methanesulfonyl chloride and the mixture is held at room temperature for 18 hours. Water is added and the reaction mixture is extracted with chloroform. The chloroform layer is washed with water, dried over magnesium sulfate and evaporated. Recrystallization of the crude product from methanol yields 8 mg. of analytically pure methyl-3-acetyl-Δ⁹⁽¹¹⁾-eburicene-3β-ol-21-oate (LXXIX) having the following properties: M.P. 154–155° $[α]_D^{21}$ +62.0° (chlf. C, 0.66); and a second crop of 4 mg. of (LXXIX) having a M.P. 150–152°.

$\lambda_{max}^{Nujol}$ 5.81, 8.05μ

*Analysis.*—Calcd. for $C_{34}H_{56}O_7$: C, 77.22; H, 10.67. Found: C, 77.52; H, 10.93.

Similarly, treating methyl-3-acetyl-lanostane-3β,11β-diol-21-oate according to the procedure of Example 84, yields methyl-3-acetyl-Δ⁹⁽¹¹⁾-lanostene-3β-ol-21-oate.

EXAMPLE 85

*Methyl-3,16-diacetyl-Δ⁹⁽¹¹⁾-eburicene-3β,16α-diol-21-oate (CLXXVIII)*

Following the procedure set forth in Example 84, but substituting methyl - 3,16 - diacetyl-eburicane - 3β,11β,16α-triol-21-oate (CLXXVI) for methyl-3-acetyl-eburicane - 3β,11β - diol - 21 - oate yields methyl - 3,16 - diacetyl-Δ⁹⁽¹¹⁾-eburicene-3β,16α-diol-21-oate (CLXXVIII).

EXAMPLE 86

*3-acetyl-Δ⁹⁽¹¹⁾-eburicene-3β-ol-21-oic acid (LXXX)*

Following the procedure set forth in Example 84 but substituting 3 - acetyl - eburicane - 3β,11β - diol - 21 - oic acid (LXXVI) for methyl-3-acetyl-eburicane-3β,11β-diol-21-oate, yields 3-acetyl-Δ⁹⁽¹¹⁾-eburicene-3β-ol-21-oic acid (LXXX).

Similarly, treating 3-acetyl-lanostane-3β,11β-diol-21-oic acid, according to the procedure set forth in Example 84, yields 3-acetyl-Δ⁹⁽¹¹⁾-lanostene-3β-ol-21-oic acid.

EXAMPLE 87

*3,16-diacetyl-Δ⁹⁽¹¹⁾-eburicene-3β,16α-ol-21-oic acid (CLXXIX)*

Following the procedure set forth in Example 84 but substituting 3,16 - diacetyl-eburicane - 3β,11β,16α - triol-21-oic acid (CLXXV) for methyl-3-acetyl-eburicane-3β,11β-diol-21-oate yields 3,16-diacetyl-Δ⁹⁽¹¹⁾-eburicene-3β,16α-ol-21-oic acid (CLXXIX).

EXAMPLE 88

*Methyl-3-acetyl-Δ⁸-eburicene-3β-ol-7-one-21-oate (LV)*

A solution of 175 mg. of chromic acid in 3.5 ml. of glacial acetic acid is added to 337 mg. of methyl-3-acetyl-Δ⁸-eburicene-3β-ol-21-oate (VII) in 15 ml. of glacial acetic acid and held for five days at room temperature. The excess chromic acid is decomposed with methanol and the solution evaporated on the rotary evaporator. The residue is partitioned between ethyl acetate and water. The organic layer is washed with 5% potassium carbonate and water, dried over sodium sulfate and evaporated. The residue is chromatographed on 15 g. of neutral alumina and eluted with benzene and benzene-chloroform to yield a white crystalline material which on recrystallization from methanol gives 14 mg. of methyl-3 - acetyl - Δ⁸ - eburicene - 3β - ol - 7 - one - 21 - oate, M.P. 161–162.5°.

Additional quantities of methyl-3-acetyl-Δ⁸-eburicene-3β-ol-7-one-21-oate (LV) are obtained from the chromatography of the mother liquors of the zinc dust reduction of methyl - 3 - acetyl- Δ⁸ - eburicene - 3β - ol - 7,11-dione-21-oate (VIII) obtained in Example 20. Recrystallization of the benzene and benzene-chloroform eluates yields material melting at 163–164°. Further purification by thin layer chromatography on alumina-Activity V-morin-impregnated with hexane-chloroform yields analytically pure methyl-3-acetyl-Δ⁸-eburicene-3β-ol-7-one-21-oate (LV) having the following properties: M.P. 168–168.5°; $[α]_D^{20}$ +16.7° (chlf. C, 1.90);

$\lambda_{max}^{EtOH}$ 252 mμ. (ε=8,400); $\lambda_{max}^{KBr}$ 5.81, 5.99μ

*Analysis.*—Calcd. for $C_{34}H_{54}O_5$: C, 75.23; H, 10.03. Found: C, 75.11; H, 10.33.

EXAMPLE 89

*Methyl-3,16-diacetyl-Δ⁸-eburicene-3β,16α-diol-7-one-21-oate (CLV)*

Following the procedure set forth in Example 88 but substituting methyl - 3,16 - diacetyl - Δ⁸ - eburicene - 3β, 16α-diol-21-oate (CIII) for methyl-3-acetyl-Δ⁸-eburicene-3β-ol-21-oate yields methyl-3,16-diacetyl-Δ⁸-eburicene-3β, 16α-diol-7-one-21-oate (CLV).

EXAMPLE 90

*3-acetyl-Δ⁸-eburicene-3β-ol-7-one-21-oic-acid*

Following the procedure of Example 88 but substituting 3 - acetyl - Δ⁸ - eburicene - 3β - ol - 21 - oic acid (V) for methyl - 3 - acetyl - Δ⁸ - eburicene - 3β - ol - 21 - oate, yields 3-acetyl-Δ⁸-eburicene-3β-ol-7-one-21-oic acid.

EXAMPLE 91

*3,16-diacetyl-Δ⁸-eburicene-3β,16α-diol-7-one-21-oic acid*

Following the procedure set forth in Example 88 but substituting 3,16 - diacetyl - Δ⁸ - eburicene - 3β,16α - diol-21-oic acid (XCI) for methyl-3-acetyl-Δ⁸-eburicene-3β-ol-21-oate yields 3,16-diacetyl-Δ⁸-eburicene-3β,16α-diol-7-one-21-oic acid.

EXAMPLE 92

*Methyl-3-acetyl-eburicane-3β-ol-7-one-21-oate (LVI)*

A solution of 100 mg. of 3-acetyl-Δ⁸-eburicene-3β-ol-7-one-21-oate (LV) in 20 ml. of absolute ether is added to 25 ml. of liquid ammonia over a 5-minute period. At the same time, 75 mg. of lithium wire, cut into small pieces, is added so as to maintain the blue color of the solution. After 15 minutes, 10 ml. of ether-tert.-butyl alcohol is added and the ammonia is permitted to evaporate. The solution is then diluted with an additional 10 ml. of ether and washed with water. Evaporation of the ether yields 98 mg. of the crude product. Chromatography on 4 g. of neutral alumina and elution with benzene-chloroform yields 25 mg. of methyl-3-acetyl-eburicane-3β-ol-7-one-21-oate (LVI) after recrystallization from methanol.

EXAMPLE 93

*Methyl-3,16-diacetyl-eburicane-3β,16α-diol-7-one-21-oate (CLVI)*

Following the procedure set forth in Example 92 but substituting 3,16 - diacetyl - Δ⁸ - eburicene - 3β,16α - diol-7-one-21-oate (CLV), for 3-acetyl-Δ⁸-eburicene-3β-ol-7-one - 21 - oate, yields 3,16 - diacetyl-eburicane - 3β,16α-diol-7-one-21-oate (CLVI).

EXAMPLE 94

*3-acetyl-eburicane-3-ol-7-one-21-oic acid (LVII)*

Following the procedure set forth in Example 92 but substituting 3 - acetyl - Δ⁸ - eburicene - 3β - ol - 7 - one-21-oic acid obtained in Example 90, for 3-acetyl-Δ⁸-eburicene-3β-ol-7-one-21-oate, yields 3-acetyl-eburicane-3β-ol-7-one-21-oic acid (LVII).

EXAMPLE 95

*3,16-diacetyl-eburicane-3β,16α-diol-7-one-21-oic acid (CLVII)*

Following the procedure set forth in Example 92, but substituting 3,16-diacetyl-Δ⁸-eburicene-3β,16α-diol-7-one-21-oic acid obtained in Example 91, for 3-acetyl-Δ⁸-eburicene - 3β - ol - 7 - one - 21 - oate, yields 3,16 - diacetyl-eburicane-3β,16α-diol-7-one-21-oic acid (CLVII)

EXAMPLE 96

*Methyl-3-acetyl-7-ethylenedithio-eburicane-3β-ol-21-oate*

Following the procedure set forth in Example 35, but substituting methyl - 3 - acetyl - eburicane-3β-ol-7-one-21-oate (LVI) for methyl-3-acetyl-eburicane-3β-ol-7,11-dione-21-oate, yields methyl-3-acetyl-7-ethylenedithio-eburicane-3β-ol-21-oate.

EXAMPLE 97

*Methyl-3,16-diacetyl-7-ethylenedithio-eburicane-3β,16α-diol-21-oate*

Following the procedure set forth in Example 34 but substituting methyl-3,16-diacetyl-eburicane-3β,16α-diol-7-one-21-oate (CLVI), for methyl-3-acetyl-eburicane-3β-ol-7,11-dione-21-oate, yields methyl-3,16-diacetyl-7-ethylenedithio-eburicane-3β,16α-diol-21-oate.

EXAMPLE 98

*Methyl-3-acetyl-eburicane-3β-ol-21-oate*

Following the procedure set forth in Example 38, but substituting methyl - 3 - acetyl-7-ethylenedithio-eburicane-3β-ol-21-oate, obtained in Example 96, for methyl-3-acetyl - 7 - ethylenedithio - eburicane - 3β - ol-11-one-21-oate, yields methyl-3-acetyl-eburicane-3β-ol-21-oate.

EXAMPLE 99

*Methyl-3,16-diacetyl-eburicane-3β,16α-diol-21-oate*

Following the procedures set forth in Example 38, but substituting methyl - 3,16-diacetyl-7-ethylenedithio-eburicane-3β,16α-diol-21-oate, obtained in Example 97, for methyl - 3-acetyl-7-ethylenedithio-eburicane-3β-ol-11-one-21-oate, yields methyl-3,16-diacetyl-eburicane-3β,16α-diol-21-oate.

EXAMPLE 100

*3-acetyl-eburicane-3β-ol-11-one-21-oyl chloride (XVIII)*

A solution of 240 mg. of 3-acetyl-eburicane-3β-ol-11-one-21-oic acid (XVI)) and 1 ml. of thionyl chloride in 15 ml. of benzene is heated at reflux for 4 hours. After evaporation of the solvent and thionyl chloride under reduced pressure, the residue is dried over potassium hydroxide under high vacuum. Recrystallization from acetone yields a first crop of 80 mg. of 3-acetyl-eburicane-3β-ol-11-one-21-oyl chloride (XVIII), M.P. 208–211°; and a second crop of 51 mg. of XVIII, M.P. 206–208°. The analytical sample of the material has the following properties: M.P. 208–210.5;

$$\lambda_{max.}^{Nujol}\ 5.57,\ 5.76,\ 5.80,\ 5.90,\ 8.05\mu$$

*Analysis.*—Calcd. for $C_{33}H_{53}O_4Cl$: C, 72.20; H, 9.66; Cl, 6.46. Found: C, 72.46; H, 9.74; Cl, 6.5.

Similarly, substituting thionyl bromide in the treatment of 3-acetyl-eburicane-3β-ol-11-one-21-oic acid for the thionyl chloride employed in the procedure of Example 100, yields 3 - acetyl - eburicane-3β-ol-11-one-21-oyl bromide (XVIII).

EXAMPLE 101

*3,16-diacetyl-eburicane-3β,16α-diol-11-one-21-oyl-chloride (CXIV)*

Following the procedure set forth in Example 100, but substituting 3,16 - diacetyl-eburicane-3β,16α-diol-11-one-21-oic acid (CXII) for 3-acetyl-eburicane-3β-ol-11-one-21-oic acid yields 3,16-diacetyl-eburicane-3β,16α-diol-11-one-21-oyl chloride (CXIV).

EXAMPLE 102

*3-acetyl-Δ⁸-eburicene-3β-ol-21-oyl chloride (LXXI)*

A solution of 6.56 g. of 3-acetyl-Δ⁸-eburicene-3β-ol-21-oic acid (V) and 20.4 ml. of thionyl chloride in 200 ml. of benzene is heated at reflux for 4½ hours. The solvent and excess thionyl chloride is removed by distillation under reduced pressure, and the residue is dried under high vacuum over potassium hydroxide for 18 hours. Recrystallization from acetone yields a first crop of 1.57 g. of 3-acetyl-Δ⁸-eburicene-3β-ol-21-oyl chloride (LXII), M.P. 174–175°; and a second crop of 3.36 g. of LXII, M.P. 172–174;

$$\lambda_{max.}^{Nujol}\ 5.63,\ 5.78\mu$$

Similarly, substituting thionyl bromide for thionyl chloride in the procedure set forth in Example 102 for the treatment of 3-acetyl-Δ⁸-eburicene-3β-ol-21-oic acid (V), yields 3-acetyl-Δ⁸-eburicene-3β-ol-21-oyl-bromide.

EXAMPLE 103

*3,16-diacetyl-Δ⁸-eburicene-3β,16α-diol-21-oyl-chloride (CLXXI)*

Following the procedure set forth in Example 102, but substituting 3,16-diacetyl-Δ⁸-eburicene-3β,16α-diol-21-oic acid (CI) for 3-acetyl-Δ⁸-eburicene-3β-ol-21-oic acid, yields 3,16 - diacetoxy - Δ⁸ - eburicene-3β,16α-diol-21-oyl chloride (CLXXI).

EXAMPLE 104

*3-acetyl-eburicane-3β-ol-11-one-21-oyl-chloride (XVIII)*

A solution of 4.4 g. of 3-acetyl-eburicane-3β-ol-11-one-21-oic acid (XVI) in 30 ml. of thionyl chloride is held at 5° for 16½ hours. After evaporation of the thionyl chloride under reduced pressure at room temperature and drying the residue under high vacuum, crude 3-acetyl-eburicane-3β-ol-11-one-21-oyl-chloride (XVIII) is obtained. Recrystallization from acetone-hexane yields a first crop of 3.79 g. of XVIII, M.P. 215–217°; and a second crop of 334 mg. of XVIII, M.P. 210–212°.

EXAMPLE 105

*3,16-diacetyl-eburicane-3β,16α-diol-11-one-21-oyl-chloride (CXIV)*

Following the procedure set forth in Example 104, but substituting 3,16 - diacetyl-eburicane-3β,16α-diol-11-one-21-oic acid (CXII) for 3-acetyl-eburicane-3β-ol-11-one-21-oic acid, yields 3,16-diacetyl-eburicane-3β,16α-diol-11-one-21-oyl chloride (CXIV).

EXAMPLE 106

*3-acetyl-lanostane-3β-ol-11-one-21-oyl chloride*

Following the procedures set forth in Example 100, but substituting 3-acetyl-lanostane-3β-ol-11-one-21-oic acid (XXXIX) for 3-acetyl-eburicane-3β-ol-11-one-21-oic acid yields 3-acetyl-lanostane-3β-ol-11-one-21-oyl chloride.

EXAMPLE 107

*3,16-diacetyl-lanostane-3β,16α-diol-11-one-21-oyl chloride*

Following the procedures set forth in Example 100, but substituting 3,16-diacetyl-lanostane-3β,16α-diol-11-one-21-oic acid (CXXXVIII), for 3-acetyl-eburicane-3β-ol-11-one-21-oic acid yields 3,16-diacetyl-lanostane-3β,16α-diol-11-one-21-oyl chloride.

EXAMPLE 108

*3-acetyl-lanostane-3β-ol-7,11-dione-21-oyl chloride*

Following the procedure set forth in Example 100, but substituting 3 - acetyl - lanostane-3β-ol-7,11-dione-21-oic acid (XLI) for 3-acetyl-eburicane-3β-ol-11-one-21-oic acid, yields 3 - acetyl - lanostane-3β-ol-7,11-dione-21-oyl chloride.

EXAMPLE 109

*3,16-diacetyl-lanostane-3β,16α-diol-7,11-dione-21-oyl chloride*

Following the procedure set forth in Example 100, but substituting 3,16 - diacetyl - lanostane-3β,16α-diol-7,11-dione-21-oic acid (CXL), for 3-acetyl-eburicane-3β-ol-11-one-21-oic acid, yields 3,16-diacetyl-lanostane-3β,16α-diol-7,11-dione-21-oyl chloride.

EXAMPLE 110

*3-acetyl-Δ⁹⁽¹¹⁾-eburicene-3β-ol-21-oyl chloride*

Following the procedure set forth in Example 100, but substituting 3-acetyl-Δ⁹⁽¹¹⁾-eburicene-3β - ol - 21 - oic acid (LXXX) for 3-acetyl-eburicane-3β-ol-11-one-21-oic acid, yields 3-acetyl-Δ⁹⁽¹¹⁾-eburicene-3β-ol-21-oyl chloride.

Similarly, treating 3-acetyl-Δ⁹⁽¹¹⁾-lanostene-3β-ol-21-oic acid according to the procedure set forth in Example 100, yields 3-acetyl-Δ⁹⁽¹¹⁾-lanostene-3β-ol-21-oyl chloride.

EXAMPLE 111

*3,16-diacetyl-Δ⁹⁽¹¹⁾-eburicene-3β,16α-diol-21-oyl chloride*

Following the procedure of Example 100, but substituting 3,16-diacetyl-Δ⁹⁽¹¹⁾-eburicene-3β,16α - diol - 21 - oic acid (CLXXIX) for 3-acetyl-eburicane-3β-ol-11-one-21-oic acid yields 3,16-diacetyl-Δ⁹⁽¹¹⁾-eburicene-3β,16α-diol-21-oyl chloride.

EXAMPLE 112

*3-acetyl-Δ⁸-eburicene-3β-ol-7,11-dione-21-oyl chloride*

Following the procedure set forth in Example 100, but substituting 3-acetyl-Δ⁸-eburicene-3β-ol-7,11-dione-21-oic acid (IX) for 3-acetyl-eburicane-3β-ol-11-one-21-oic acid yields 3-acetyl-Δ⁸-eburicene-3β-ol-7,11-dione-21-oyl chloride.

EXAMPLE 113

*3,16-diacetyl-Δ⁸-eburicene-3β,16α-diol-7,11-dione-21-oyl chloride*

Following the procedure set forth in Example 100, but substituting 3,16-diacetyl-Δ⁸-eburicene-3β,16α-diol-7,11-dione-21-oic acid (CV) for 3-acetyl-eburicane-3β-ol-11-one-21-oic acid yields 3,16-diacetyl-Δ⁸-eburicene-3β,16α-diol-7,11-dione-21-oyl chloride.

EXAMPLE 114

*3-acetyl-eburicane-3β-ol-7,11-dione-21-oyl chloride*

Following the procedures set forth in Example 100, but substituting 3-acetyl-eburicane-3β-ol-7,11-dione-21-oic acid (XII) for 3-acetyl-eburicane-3β-ol-11-one-21-oic acid, yields 3 - acetyl-eburicane-3β-ol-7,11-dione-21-oyl chloride.

EXAMPLE 115

*3,16-diacetyl-eburicane-3β,16α-diol-7,11-dione-21-oyl chloride*

Following the procedure set forth in Example 100, but substituting 3,16 - diacetyl - eburicane-3β,16α-diol-7,11-dione-21-oic acid (CVIII) for 3-acetyl-eburicane-3β-ol-11-one-21-oic acid yields 3,16-diacetyl-eburicane-3β,16α-diol-7,11-dione-21-oyl chloride.

EXAMPLE 116

*3-acetyl-eburicane-3β-ol-21-oic acid*

Following the procedure set forth in Example 42 but substituting methyl-3-acetyl-eburicane-3β-ol-21-oate, obtained in Example 98, for methyl-3-acetyl-eburicane-3β-ol-11-one-21-oate yields 3-acetyl-eburicane-3β-ol-21-oic acid.

EXAMPLE 117

*3-acetyl-eburicane-3β-ol-21-oyl chloride*

Following the procedures set forth in Example 100, but substituting 3-acetyl-eburicane-3β-ol-21-oic acid obtained in Example 116, for 3-acetyl-eburicane-3β-ol-11-one-21-oic acid, yields 3-acetyl-eburicane-3β-ol-21-oyl chloride.

EXAMPLE 118

*3,16-diacetyl-eburicane-3β,16α-diol-21-oic acid*

Following the procedure set forth in Example 42, but substituting methyl - 3,16-diacetyl-eburicane-3β,16α-diol-21-oate, obtained in Example 99, for methyl-3-acetyl-eburicane-3β-ol-11-one-21-oate, yields 3,16-diacetyl-eburicane-3β,16α-diol-21-oic acid.

EXAMPLE 119

*3,16-diacetyl-eburicane-3β,16α-diol-21-oyl chloride*

Following the procedure set forth in Example 100, but substituting 3,16-diacetyl-eburicane-3β,16α-diol-21-oic acid, obtained in Example 118, for 3-acetyl-eburicane-3β-ol-11-one-21-oic acid, yields 3,16-diacetyl-eburicane-3β,16α-diol-21-oyl chloride.

EXAMPLE 120

*3-acetyl-eburicane-3β-ol-7-one-21-oyl chloride*

Following the procedure set forth in Example 100, but substituting 3-acetyl-eburicane-3β-ol-7-one-21-oic acid (LVII) for 3-acetyl-eburicane-3β-ol-7-one-21-oic acid, yields 3-acetyl-eburicane-3β-ol-7-one-21-oyl chloride.

EXAMPLE 121

*3,16-diacetyl-eburicane-3β,16α-diol-7-one-21-oyl chloride*

Following the procedure set forth in Example 100, but substituting 3,16-diacetyl-eburicane-3β,16α-diol-7-one-21-oic acid (CLVII) for 3-acetyl-eburicane-3β-ol-7-one-21-oic acid yields 3,16-diacetyl-eburicane-3β,16α-diol-7-one-21-oyl chloride.

EXAMPLE 122

*3-acetyl-eburicane-3β-ol-21-al-11-one (XIX)*

A solution of 250 mg. of 3-acetyl-eburicane-3β-ol-11-one-21-oyl chloride (XVIII) in 95 ml. of toluene (dried over sodium) containing 375 mg. of 10% palladium-on-charcoal is heated while a rapid stream of hydrogen is bubbled through the solution. The exiting gas is passed through water kept alkaline by the addition of sodium hydroxide. Hydrogen chloride evolves when reflux temperature is reached, and heating is continued for 1 hour at which time the evolution of hydrogen chloride slows considerably. The reaction mixture is then cooled under nitrogen, filtered through sand and evaporated to yield 221 mg. of the crude product. Recrystallization from methanol yields a first crop of 166 mg. of 3-acetyl-eburicane-3β-ol-21-al-11-one (XIX); M.P. 173–175°; $[\alpha]_D^{20}$ +52.7° (chlf. C, 1.21); and a second crop of 33 mg. of XIX, M.P., 168–171°. The analytical sample has the following properties: M.P. 171–172°;

$\lambda_{max.}^{Nujol}$ 3.72, 5.75, 5.80, 5.89, 8.05μ

*Analysis.*—Calcd. for $C_{33}H_{54}O_4$: C, 76.99; H, 10.57. Found: C, 76.86; H, 10.37.

EXAMPLE 123

*3,16-diacetyl-eburicane-3β,16α-diol-21-al-11-one (CXV)*

Following the procedure set forth in Example 122, but substituting 3,16-diacetyl-eburicane-3β,16α-diol-11-one-21-oyl chloride (CXIV) for 3-acetyl-eburicane-3β-ol-11-one-21-oyl chloride yields 3,16-diacetyl-eburicane-3β,16α-diol-21-al-11-one (CXV).

EXAMPLE 124

*3-acetyl-Δ⁸-eubricene-3β-ol-21-al*

Following the procedure set forth in Example 122, but substituting 3-acetyl-$\Delta^8$-eburicene-3β-ol-21-oyl chloride, obtained in Example 102, for 3-acetyl-eburicane-3β-ol-11-one-21-oyl chloride yields 3-acetyl-$\Delta^8$-eburicane-3β-ol-21-al.

EXAMPLE 125

*3,16-diacetyl-Δ⁸-eburicene-3β,16α-diol-21-al*

Following the procedure set forth in Example 122, but substituting 3,16-diacetyl-$\Delta^8$-eburicene-3β,16α-diol-21-oyl chloride obtained in Example 103 for 3-acetyl-eburicane-3β-ol-11-one-21-oyl chloride yields 3,16-diacetyl-$\Delta^8$-eburicene-3β,16α-diol-21-al.

EXAMPLE 126

*3-acetyl-lanostane-3β-ol-21-al-11-one*

Following the procedure set forth in Example 122, but substituting 3-acetyl-lanostane-3β-ol-11-one-21-oyl chloride, obtained in Example 106, for 3-acetyl-eburicane-3β-ol-11-one-21-oyl chloride, yields 3-acetyl-lanostane-3β-ol-21-al-11-one.

EXAMPLE 127

*3,16-diacetyl-lanostane-3β,16α-diol-21-al-11-one*

Following the procedure set forth in Example 122, but substituting 3,16-diacetyl-lanostane-3β,16α-diol-11-one-21-oyl chloride obtained in Example 107 for 3-acetyl-eburicane-3β-ol-11-one-21-oyl chloride yields 3,16-diacetyl-lanostane-3β,16α-diol-21-al-11-one.

EXAMPLE 128

*3-acetyl-lanostane-3β-ol-21-al-7,11-dione*

Following the procedure set forth in Example 122, but substituting 3-acetyl-lanostane-3β-ol-7,11-dione-21-oyl chloride obtained in Example 108, for 3-acetyl-eburicane-3β-ol-11-one-21-oyl chloride, yields 3-acetyl-lanostane-3β-ol-21-al-7,11-dione.

EXAMPLE 129

*3,16-diacetyl-lanostane-3β,16α-diol-21-al-7,11-dione*

Following the procedure set forth in Example 122, but substituting 3,16-diacetyl-lanostane-3β,16α-diol-7,11-dione-21-oyl chloride obtained in Example 109, for 3-acetyl-eburicane-3β-ol-11-one-21-oyl chloride yields, 3,16-diacetyl-lanostane-3β,16α-diol-21-al-7,11-dione.

Similarly, treating 3-acetyl-$\Delta^{9(11)}$-lanostene-3β-ol-21-oyl chloride according to the procedure set forth in Example 122, yields 3-acetyl-$\Delta^{9(11)}$-lanostene-3β-ol-21-al.

EXAMPLE 130

*3-acetyl-Δ⁹⁽¹¹⁾-eburicene-3β-ol-21-al*

Following the procedure set forth in Example 122, but substituting 3-acetyl-$\Delta^{9(11)}$-eburicene-3β-ol-21-oyl chloride obtained in Example 110 for 3-acetyl-eburicane-3β-ol-11-one-21-oyl chloride, yields 3-acetyl-$\Delta^{9(11)}$-eburicene-3β-ol-21-al.

EXAMPLE 131

*3,16-diacetyl-Δ⁹⁽¹¹⁾-eburicene-3β,16α-diol-21-al*

Following the procedure set forth in Example 122, but substituting 3,16-diacetyl-$^{9(11)}$-eburicene-3β,16α-diol-21-oyl chloride, obtained in Example 111, for 3-acetyl-eburicane-3β-ol-11-one-21-oyl chloride, yields 3,16-diacetyl-$\Delta^{9(11)}$-eburicene-3β,16α-diol-21-al.

EXAMPLE 132

*3-acetyl-Δ⁸eburicene-3β-ol-21-al-7,11-dione*

Following the procedure set forth in Example 122, but substituting 3-acetyl-$\Delta^8$-eburicene-3β-ol-7,11-dione-21-oyl chloride, obtained in Example 112 for 3-acetyl-eburicane-3β-ol-11-one-21-oyl chloride, yields 3-acetyl-$\Delta^8$-eburicene-3β-ol-21-al-7,11-dione.

EXAMPLE 133

*3,16-diacetyl-Δ⁸-eburicene-3β,16α-diol-21-al-7,11-dione*

Following the procedure set forth in Example 122, but substituting 3,16-diacetyl-$\Delta^8$-eburicene-3β,16α-7,11-dione-21-oyl chloride, obtained in Example 113, for 3-acetyl-eburicane-3β-ol-11-one-21-oyl chloride yields 3,16-diacetyl-$\Delta^8$-eburicene-3β,16α-diol-21-al-7,11-dione.

EXAMPLE 134

*3acetyl-eburicane-3β-ol-21-al-7,11-dione*

Following the procedure set forth in Example 122, but substituting 3-acetyl-eburicane-3β-ol-7,11-dione-21-oyl chloride, obtained in Example 114, for 3-acetyl-eburicane-3β-ol-11-one 21-oyl chloride, yields 3-acetyl-eburicane-3β-ol-21-al-7,11-dione.

EXAMPLE 135

*3,16-diacetyl-eburicane-3β,16α-diol-21-al-7,11-dione*

Following the procedure set forth in Example 122, but substituting 3,16-diacetyl-eburicane-3β,16α-diol-7,11- dione-21-oyl chloride obtained in Example 115 for 3-acetyl-eburicane-3β-ol-11-one-21-oyl chloride yields 3,16-diacetyl-eburicane-3β,16α-diol-21-al-7,11-dione.

EXAMPLE 136

*3-acetyl-eburicane-3β-ol-21-al*

Following the procedure set forth in Example 122, but substituting 3-acetyl-eburicane-3β-ol-21-oyl chloride obtained in Example 117 for 3-acetyl-eburicane-3β-ol-7-one-21-oyl chloride, yields 3-acetyl-eburicane-3β-ol-21-al.

EXAMPLE 137

*3,16-diacetyl-eburicane-3β,16α-diol-21-al*

Following the procedure set forth in Example 122, but substituting 3,16-diacetyl-eburicane-3β,16α-diol-21-oyl chloride, obtained in Example 119, for 3-acetyl-eburicane-3β-ol-7-one-21-oyl chloride yields 3,16-diacetyl-eburicane-3β,16α-diol-21-al.

EXAMPLE 138

*3-acetyl-eburicane-3β-ol-21-al-7-one*

Following the procedure of Example 122, but substituting 3-acetyl-eburicane-3β-ol-7-one-21-oyl chloride obtained in Example 120 for 3-acetyl-eburicane-3β-ol-11-one-21-oyl chloride, yields 3-acetyl-eburicane-3β-ol-21-al-7-one.

EXAMPLE 139

*3,16-diacetyl-eburicane-3β,16α-diol-21-al-7-one*

Following the procedure set forth in Example 122, but substituting 3,16-diacetyl-eburicane-3β,16α-diol-21-oyl chloride, obtained in Example 121, for 3-acetyl-eburicane-3β-ol-11-one-2-oyl chloride yields 3-acetyl-eburicane-3β,16α-diol-21-al-7-one.

EXAMPLE 140

*3-acetyl-21-(N-pyrrolidyl)-Δ$^{20}$-eburicene-3β-ol-11-one (XX)*

A solution of 1.00 g. of 3-acetyl-eburicane-3β-ol-21-al-11-one (XIX) and 5 mg. of p-toluenesulfonic acid in 50 ml. of benzene in a round bottom flask connected to a Dean-Stark water separator arranged so that all condensate drips through a thimble containing calcium carbide, is heated to boiling in order to azeotropically remove any water in the apparatus. Upon cooling, 5 ml. of pyrrolidine is added and the mixture is heated at reflux in a nitrogen atmosphere for 46 hours. Evaporation of the solvent yields 1.080 g. of amorphous 3-acetyl-21-(N-pyrrolidyl)-Δ$^{20}$-eburicene-3β-ol-11-one (XX) having the following properties:

$$\lambda_{max.}^{MeOH} \ 237 \ m\mu \ (\epsilon = 5,670)$$

Similarly, following the procedure set forth in Example 140, but substituting morpholine, or piperidine for the pyrrolidine yields 3-acetyl-21-(N-morpholyl)-Δ$^{20}$-eburicene 3β-ol-11-one, and 3-acetyl-21-(N-piperidyl)-Δ$^{20}$-eburicene-3β-ol-11-one, respectively.

EXAMPLE 141

*3,16-diacetyl-21-(N-pyrrolidyl)-Δ$^{20}$-eburicene-3β,16α-diol-11-one (CXVI)*

Following the procedure set forth in Example 140, but substituting 3,16-diacetyl-eburicane-3β,16α-diol-21-al-11-one (CXV) for 3-acetyl-eburicane-3β-ol-21-al-11-one, yields 3,16-diacetyl-21-(N-pyrrolidyl)-Δ$^{20}$-eburicene-3β,16α-diol-11-one (CXVI).

EXAMPLE 142

*3-acetyl-21-(N-pyrrolidyl)-Δ$^{8,20}$-eburicadiene-3β-ol*

Following the procedure set forth in Example 140 but substituting 3-acetyl-Δ$^8$-eburicene-3β-ol-21-al obtained in Example 124 for 3-acetyl-eburicane-3β-ol-21-al-11-one, yields 3-acetyl-21-(N-pyrrolidyl)-Δ$^{8,20}$-eburicadiene-3β-ol.

EXAMPLE 143

*3,16-diacetyl-21-(N-pyrrolidyl)-Δ$^{8,20}$-eburicadiene-3β,16α-diol*

Following the procedure set forth in Example 140, but substituting 3,16-diacetyl-Δ$^8$-eburicene-3β,16α-diol-21-al obtained in Example 125 for 3-acetyl-eburicane-3β-ol-21-al-11-one yields 3,16-diacetyl-21-(N-pyrrolidyl)-Δ$^{8,20}$-eburicadiene-3β,16α-diol.

EXAMPLE 144

*3-acetyl-21-(N-pyrrolidyl)-Δ$^{20}$-lanostene-3β-ol-11-one*

Following the procedure set forth in Example 140, but substituting 3-acetyl-lanostane-3β-ol-21-al-11-one, obtained in Example 126 for 3-acetyl-eburicane-3β-ol-21-al-11-one, yields 3-acetyl-21-(N-pyrrolidyl)-Δ$^{20}$-lanostene-3β-ol-11-one.

EXAMPLE 145

*3,16-diacetyl-21-(N-pyrrolidyl)-Δ$^{20}$-lanostene-3β,16α-diol-11-one*

Following the procedure set forth in Example 140 but substituting 3,16-diacetyl-lanostane-3β,16α-diol-21-al-11-one obtained in Example 127 for 3-acetyl-eburicane-3β-ol-21-al-11-one, yields 3,16-diacetyl-21-(N-pyrrolidyl)-Δ$^{20}$-lanostene-3β,16α-diol-11-one.

EXAMPLE 146

*3-acetyl-21-(N-pyrrolidyl)-Δ$^{20}$-lanostene-3β-ol-7,11-dione*

Following the procedure set forth in Example 140, but substituting 3-acetyl-lanostane-3β-ol-21-al-7,11-dione obtained in Example 128 for 3-acetyl-eburicane-3β-ol-21-al-11-one, yields 3-acetyl-21-(N-pyrrolidyl)-Δ$^{20}$-lanostene-3β-ol-7,11-dione.

EXAMPLE 147

*3,16-diacetyl-21-(N-pyrrolidyl)-Δ$^{20}$-lanostene-3β,16α-diol-7,11-dione*

Following the procedure set forth in Example 140, but substituting 3,16-diacetyl-lanostane-3β,16α-diol-21-al-7,11-dione, obtained in Example 129 for 3-acetyl-eburicane-3β-ol-21-al-11-one, yields 3,16-diacetyl-21-(N-pyrrolidyl)-Δ$^{20}$-lanostene-3β,16α-diol-7,11-dione.

EXAMPLE 148

*3-acetyl-21-(N-pyrrolidyl)-Δ$^{9(11),20}$-eburicadiene-3β-ol*

Following the procedures set forth in Example 140, but substituting 3-acetyl-Δ$^{9(11)}$-eburicene-3β-ol-21-al obtained in Example 130 for 3-acetyl-eburicane-3β-ol-21-al-11-one, yields 3-acetyl-21-(N-pyrrolidyl)-Δ$^{9(11),20}$-eburicadiene-3β-ol.

Similarly, treating 3-acetyl-Δ$^{9(11)}$-lanostene-3β-ol-21-al, according to the procedure set forth in Example 140, yields 3-acetyl-21-(N-pyrrolidyl)-Δ$^{9(11),20}$-lanostadiene-3β-ol.

EXAMPLE 149

*3,16-diacetyl-21-(N-pyrrolidyl)-Δ$^{9(11),20}$-eburicadiene-3β,16α-diol*

Following the procedure set forth in Example 140, but substituting 3,16-diacetyl-Δ$^{9(11)}$-eburicene-3β,16α-diol-21-al obtained in Example 131 for 3-acetyl-eburicane-3β-ol-21-al-11-one yields 3,16-diacetyl-21-(N-pyrrolidyl)-Δ$^{9(11),20}$-eburicadiene-3β,16α-diol.

EXAMPLE 150

*3-acetyl-21-(N-pyrrolidyl)-Δ$^{8,20}$-eburicadiene-3β-ol-7,11-dione*

Following the procedure set forth in Example 140, but substituting 3-acetyl-Δ$^8$-eburicene-3β-ol-21-al-7,11-dione obtained in Example 132 for 3-acetyl-eburicane-3β-ol-21- al-11-one, yields 3-acetyl-21-(N-pyrrolidyl)-Δ$^{8,20}$-eburicadiene-3β-ol-7,11-dione.

EXAMPLE 151

*3,16-diacetyl-21-(N-pyrrolidyl)-Δ$^{8,20}$-eburicadiene-3β,16α-diol-7,11-dione*

Following the procedure set forth in Example 140, but substituting 3,16-diacetyl-Δ$^8$-eburicene-3β,16α-diol-21-al-7,11-dione obtained in Example 133 for 3-acetyl-eburicane-3β-ol-21-al-11-one yields 3,16-diacetyl-21-(N-pyrrolidyl)-Δ$^{8,20}$-eburicadiene-3β,16α-diol-7,11-dione.

EXAMPLE 152

*3-acetyl-21-(N-pyrrolidyl)-Δ$^{20}$-eburicene-3β-ol-7,11-dione*

Following the procedure set forth in Example 140, but substituting 3-acetyl-eburicane-3β-ol-21-al-7,11-dione, obtained in Example 134 for 3-acetyl-eburicane-3β-ol-21-al-11-one, yields 3-acetyl-21-(N-pyrrolidyl)-Δ$^{20}$-eburicene-3β-ol-7,11-dione.

EXAMPLE 153

*3,16-diacetyl-21-(N-pyrrolidyl)-Δ$^{20}$-eburicene-3β,16α-diol-7,11-dione*

Following the procedure set forth in Example 140, but substituting 3,16-diacetyl-eburicane-3β,16α-diol-21-al-7,11-dione obtained in Example 135 for 3-acetyl-eburicane-3β-ol-21-al-11-one yields 3,16-diacetyl-21-(N-pyrrolidyl)-Δ$^{20}$-eburicene-3β,16α-diol-7,11-dione.

EXAMPLE 154

*3-acetyl-21-(N-pyrrolidyl)-Δ$^{20}$-eburicene-3β-ol*

Following the procedure set forth in Example 140, but substituting 3-acetyl-eburicane-3β-ol-21-al obtained in Example 136 for 3-acetyl-eburicane-3β-ol-21-al-11-one, yields 3-acetyl-21-(N-pyrrolidyl)-Δ$^{20}$-eburicene-3β-ol.

EXAMPLE 155

*3,16-diacetyl-21-(N-pyrrolidyl)-Δ$^{20}$-eburicene-3β,16α-diol*

Following the procedure set forth in Example 140 but substituting 3,16-diacetyl-eburicane-3β,16α-diol-21-al obtained in Example 137 for 3-acetyl-eburicane-3β-ol-21-al-11-one yields 3,16-diacetyl-21-(N-pyrrolidyl)-Δ$^{20}$-eburicene-3β,16α-diol.

EXAMPLE 156

*3-acetyl-21-(N-pyrrolidyl)-Δ$^{20}$-eburicene-3β-ol-7-one*

Following the procedure set forth in Example 140, but substituting 3-acetyl-eburicane-3β-ol-21-al-7-one, obtained in Example 138 for 3-acetyl-eburicane-3β-ol-21-al-11-one, yields 3-acetyl-21-(N-pyrrolidyl)-Δ$^{20}$-eburicene-3β-ol-7-one.

EXAMPLE 157

*3,16-diacetyl-21-(N-pyrrolidyl)-Δ$^{20}$-eburicene-3β,16α-diol-7-one*

Following the procedure set forth in Example 140, but substituting 3,16 - diacetyl-eburicane-3β,16α-diol-21-al-7-one, obtained in Example 139 for 3-acetyl-eburicane-3β-ol-21-al-11-one yields 3,16-diacetyl-21-(N-pyrrolidyl)-Δ$^{20}$-eburicene-3β,16α-diol-7-one.

EXAMPLE 158

*3-acetyl-21-nor-eburicane-3β-ol-11,20-dione (XXI)*

A solution of 1.080 g. of the 3-acetyl-21-(N-pyrrolidyl)-Δ$^{20}$-eburicene-3β-ol-11-one (XX) in 100 ml. of ether is cooled to −35° and ozonized with an excess of ozone. After 15 minutes, the reaction mixture is treated with zinc dust and acetic acid and allowed to remain at room temperature for one hour. The mixture is then filtered, washed with water, dried and evaporated to give 1.087 g. of residue. Chromatography on 30 g. of neutral alumina and elution with hexane-benzene, benzene and benzene-chloroform yields 588 mg. of crude product which on recrystallization from methanol yields a first crop of 320 g. of 3-acetyl-21-nor-eburicane-3β-ol-11,20-dione; M.P. 186–188°; and a second crop of 61 mg. of XXI, M.P. 181–184°. The analytical sample has the following properties: M.P. 194–195°.

$\lambda_{max.}^{KBr}$ 5.76, 5.87, 8.00μ

[α]$_D^{20}$+89.6° (chlf. C, 0.95).

*Analysis.*—Calcd. for $C_{32}H_{52}O_4$: C, 76.75; H, 10.47. Found: C, 76.87; H, 10.42.

EXAMPLE 159

*3,16-diacetyl-21-nor-eburicane-3β,16α-diol-11,20-dione (CXVII)*

Following the procedure set forth in Example 158, but substituting 3,16 - diacetyl - 21 - (N-pyrrolidyl)-Δ$^{20}$-eburicene-3β,16α-diol-11-one (CXXV) for 3-acetyl-21-(N-pyrrolidyl)-Δ$^{20}$-eburicene-3β-ol-11-one, yields 3,16-diacetyl-21-nor-eburicane-3β,16α-diol-11,20-dione (CXVII).

EXAMPLE 160

*3-acetyl-21-nor-Δ$^8$-eburicene-3β-ol-20-one*

Following the procedure set forth in Example 158, but substituting 3-acetyl-21-(N-pyrrolidyl)-Δ$^{8,20}$-eburicadiene-3β-ol obtained in Example 142 for the 3-acetyl-21-(N-pyrrolidyl)-Δ$^{20}$-eburicene-3β-ol-11-one, yields 3-acetyl-21-nor-Δ$^8$-eburicene-3β-ol-20-one.

EXAMPLE 161

*3,16-diacetyl-21-nor-Δ$^8$-eburicene-3β,16α-diol-20-one*

Following the procedure set forth in Example 158 but substituting 3,16 - diacetyl-21-(N-pyrrolidyl)-Δ$^{8,20}$-eburicadiene-3β,16α-diol obtained in Example 143 for 3-acetyl-21-(N-pyrrolidyl)-Δ$^{20}$-eburicene-3β-ol-11-one, yields 3,16-diacetyl-21-nor-Δ$^8$-eburicene-3β,16α-diol-20-one.

EXAMPLE 162

*3-acetyl-21-nor-lanostane-3β-ol-11,20-dione*

Following the procedure set forth in Example 158 but substituting 3 - acetyl-21-(N-pyrrolidyl)-Δ$^{20}$-lanostene-3β-ol-11-one, obtained in Example 144 for 3-acetyl-21-(N-pyrrolidyl)-Δ$^{20}$-eburicene-3β-ol-11-one, yields 3-acetyl-21-nor-lanostane-3β-ol-11,20-dione.

EXAMPLE 163

*3,16-diacetyl-21-nor-lanostane-3β,16α-diol-11,20-dione*

Following the procedure set forth in Example 158, but substituting 3,16-diacetyl-21-(N-pyrrolidyl)-Δ$^{20}$-lanostene-3β,16α-diol-11-one obtained in Example 145 for 3-acetyl-21-(N-pyrrolidyl)-Δ$^{20}$-eburicene-3β-ol-11-one, yields 3,16-diacetyl-21-nor-lanostane-3β,16α-diol-11,20-dione.

EXAMPLE 164

*3-acetyl-21-nor-lanostane-3β-ol-7,11,20-trione*

Following the procedure of Example 158 but substituting 3-acetyl-21-(N-pyrrolidyl)-Δ$^{20}$-lanostene-3β-ol-7,11-dione obtained in Example 146 for 3-acetyl-21-(N-pyrrolidyl)-Δ$^{20}$-eburicene-3β-ol-11-one, yields 3-acetyl-21-nor-lanostane-3β-ol-7,11,20-trione.

EXAMPLE 165

*3,16-diacetyl-21-nor-lanostane-3β,16α-diol-7,11,20-trione*

Following the procedure set forth in Example 158 but substituting 3,16-diacetyl-21-(N-pyrrolidyl)-Δ$^{20}$-lanostene-3β,16α-diol-7,11-dione obtained in Example 147 for 3-acetyl - 21 - (N-pyrrolidyl)-Δ$^{20}$-eburicene-3β-ol-11-one, yields 3,16-diacetyl-21-nor-lanostane-3β,16α-diol-7,11,20-trione.

EXAMPLE 166

*3-acetyl-21-nor-Δ$^{9(11)}$-eburicene-3β-ol-20-one*

Following the procedure set forth in Example 158, but substituting 3 -acetyl - 21 - (N-pyrrolidyl)-Δ$^{9(11),20}$-eburicadiene-3β-ol obtained in Example 148 for 3-acetyl-21-(N-pyrrolidyl)-Δ²⁰-eburicene-3β-ol-11-one, yields 3-acetyl-21-nor-Δ⁹⁽¹¹⁾-eburicene-3β-ol-20-one.

Similarly, treating 3-acetyl-21-(N-pyrrolidyl)-Δ⁹⁽¹¹⁾,²⁰-lanostadiene-3β-ol according to the procedure set forth in Example 158, yields 3-acetyl-21-nor-Δ⁹⁽¹¹⁾-lanostene-3β-ol-20-one.

EXAMPLE 167

*3,16-diacetyl-21-nor-Δ⁹⁽¹¹⁾-eburicene-3β,16α-diol-20-one*

Following the procedure set forth in Example 158 but substituting 3,16 - diacetyl - 21 - (N-pyrrolidyl)-Δ⁹⁽¹¹⁾,²⁰-eburicadiene-3β,16α-diol obtained in Example 149 for 3-acetyl - 21 - (N - pyrrolidyl) - Δ²⁰ - eburicene - 3β - ol - 11 - one, yields 3,16-diacetyl-21-nor-Δ⁹⁽¹¹⁾-eburicene-3β,16α-diol,20-one.

EXAMPLE 168

*3-acetyl-21-nor-Δ⁸-eubricene-3β-ol-7,11,20-trione*

Following the procedure set forth in Example 158 but substituting 3 - acetyl - 21 - (N - pyrrolidyl) - Δ⁸,²⁰-eubricadiene-3β-ol-7,11-dione obtained in Example 150 for 3 - acetyl - 21 - (N - pyrrolidyl) - Δ²⁰ - eburicene-3β-ol-11-one, yields 3-acetyl-21-nor-Δ⁸-eburicene-3β-ol-7,11,20-trione.

EXAMPLE 169

*3,16-diacetyl-21-nor-Δ⁸-eburicene-3β,16α-diol-7,11,20-trione*

Following the procedure set forth in Example 158, but substituting 3,16 - diacetyl - 21 - (N - pyrrolidyl) - Δ⁸,²⁰-eburicadiene-3β,16α-diol-7,11-dione obtained in Example 151 for 3 - acetyl - 21 - (N - pyrrolidyl) - Δ²⁰ - eburicene-3β-ol-11-one, yields 3,16-diacetyl-21-nor-Δ⁸-eburicene-3β,16α-diol-7,11,20-trione.

EXAMPLE 170

*3-acetyl-21-nor-eburicane-3β-ol-7,11,20,trione*

Following the procedure set forth in Example 158, but substituting 3 - acetyl - 21-(N-pyrrolidyl)-Δ²⁰-eburicene-3β-ol-7,11-dione obtained in Example 152 for 3-acetyl-21-(N-pyrrolidyl)-Δ²⁰-eburicene-3β-ol-11-one, yields 3-acetyl-21-nor-eburicane-3β-ol-7,11,20-trione.

EXAMPLE 171

*3,16-diacetyl-21-nor-eburicane-3β,16α-diol-7,11,20-trione*

Following the procedure set forth in Example 158, but substituting 3,16 - diacetyl - 21 - (N - pyrrolidyl) - Δ²⁰-eburicene-3β,16α-diol-7,11-dione obtained in Example 153 for 3 - acetyl - 21 - (N - pyrrolidyl) - Δ²⁰ - eburicene-3β-ol-11-one, yields 3,16 - diacetyl - 21- nor - eburicane-3β,16α-diol-7,11,20-trione.

EXAMPLE 172

*3-acetyl-21-nor-eburicane-3β-ol-20-one*

Following the procedure set forth in Example 158, but substituting 3-acetyl-21-(N-pyrrolidyl)-Δ²⁰-eburicene-3β-ol obtained in Example 154 for 3 - acetyl - 21 - (N-pyrrolidyl) - Δ²⁰ - eburicene - 3β - ol - 11 - one, yields 3-acetyl-21-nor-eburicane-3β-ol-20-one.

EXAMPLE 173

*3,16-diacetyl-21-nor-eburicane-3β,16α-diol-20-one*

Following the procedure set forth in Example 158 but substituting 3,16 - diacetyl - 21 - (N - pyrrolidyl) - Δ²⁰-eburicene-3β,16α-diol obtained in Example 155 for 3-acetyl - 21 - (N - pyrrolidyl) - Δ²⁰ - eburicene - 3β -ol-11-one, yields 3,16-diacetyl-21-nor-eburicane-3β,16α-diol-20-one.

EXAMPLE 174

*3-acetyl-21-nor-eburicane-3β-ol-7,20-dione*

Following the procedure set forth in Example 158, but substituting 3 - acetyl - 21-(N-pyrrolidyl)-Δ²⁰-eburicene-3β-ol-7-one obtained in Example 156 for 3-acetyl-21-(N-pyrrolidyl)-Δ²⁰-eburicene-3β-ol-11-one, yields 3-acetyl-21-nor-eburicane-3β-ol-7,20-dione.

EXAMPLE 175

*3,16-diacetyl-21-nor-eburicane-3β,16α-diol-7,20-dione*

Following the procedure set forth in Example 158 but substituting 3,16 - diacetyl - 21 - (N - pyrrolidyl) - Δ²⁰-eburicene-3β,16α-diol-7-one obtained in Example 157 for 3 - acetyl - 21 - (N - pyrrolidyl) - Δ²⁰ - eburicene - 3β-ol-11-one, yields 3,16-diacetyl-21-nor-eburicane-3β,16α-diol-7,20-dione.

EXAMPLE 176

*4,4,14-trimethyl-5α-androstane-3β,17β-diol-11-one-3-acetate-17-(4,5-dimethylhexanoate) (XXIII)*

A solution of 50 mg. of 3-acetyl-21-nor-eburicane-3β-ol-11,20-dione, (XXI) (0.1 mmole) in 10 ml. of methylene chloride containing 710 mg. of dibasic sodium phosphate (5.0 mmole) is treated with 5 ml. of freshly prepared trifluoroperacetic acid in methylene chloride (1 mmole/ml.) and held at room temperature for 40 hours. The solution is then diluted with 10 ml. of chloroform and washed with 5% sodium carbonate and water, dried and evaporated to yield 49 mg. of 4,4,14-trimethyl-5α-androstane - 3β,17β - diol - 11 - one - 3 - acetate - 17-(4,5-dimethylhexanoate) (XXIII).

EXAMPLE 177

*4,4,14-trimethyl-5α-androstane-3β,16α,17β-triol-3,16-diacetate-17-(4,5-dimethylhexanoate) (CXIX)*

Following the procedure set forth in Example 176 but substituting 3,16 - diacetyl - 21 - nor -eburicane - 3β,16α-diol-11-one (CXVII) for 3-acetyl-21-nor-eburicane-3β-ol-11,20-dione, yields 4,4,14-trimethyl-5α-androstane-3β,16α,17β - triol - 3,16 - diacetate - 17 - (4,5 - dimethylhexanoate) (CXIX).

EXAMPLE 178

*4,4,14-trimethyl-Δ⁸-5α-androstene-3β,17β-diol-3-acetate-17-(4,5-dimethylhexanoate) (LXXIII)*

Following the procedure set forth in Example 176, but substituting 3 - acetyl - 21 - nor - Δ⁸ - eburicene - 3β-ol-20-one, obtained in Example 160, for 3-acetyl-21-nor-eburicane - 3β - ol - 11,20 - dione, yields 4,4,14-trimethyl - Δ⁸ - 5α - androstene - 3β,17β - diol - 3 - acetate-17-(4,5-dimethylhexanoate) (LXXIII).

EXAMPLE 179

*4,4,14 - trimethyl - Δ⁸ - 5α - androstene - 3β,16α,17β-triol - 3,16 - diacetate - 17 - (4,5 - dimethylhexanoate) (CLXXII)*

Following the procedure set forth in Example 176, but substituting 3,16 - diacetyl - 21 - nor - Δ⁸ - eburicene-3β,16α-diol-20-one, obtained in Example 161, for 3-acetyl-21 - nor - eburicane- 3β - ol - 11,20 - dione, yields 4,4,14-trimethyl - Δ⁸ - 5α - androstene - 3β,16α,17β - triol - 3,16-diacetate-17-(4,5-dimethylhexanoate) (CLXXII).

EXAMPLE 180

*4,4,14 - trimethyl - 5α - androstane - 3β,17β - diol - 7, 11 - dione - 3 - acetate - 17 - (5 - methylhexanoate) (XLVIII)*

Following the procedure set forth in Example 176, but substituting 3 - acetyl - 21 - nor - lanostane - 3β - ol - 7, 11,20-trione obtained in Example 162 for 3-acetyl-21-nor-eburicane-3β-ol-11,20-dione, yields 4,4,14-trimethyl-5α- androstane - 3β,17β - diol - 7,11 - dione - 3 - acetate - 17-(5-methylhexanoate) (XLVIII).

EXAMPLE 181

*4,4,14 - trimethyl-5α-androstane-3β,16α,17β - triol - 7,11-dione-3,16-diacetate-17-(5-methylhexanoate) (CXLVIII)*

Following the procedure set forth in Example 176, but substituting 3,16 - diacetyl-21-nor-lanostane-β,16α - diol-7,11,20-trione obtained in Example 165 for 3-acetyl-21-nor-eburicane-3β-ol-11,20-dione yields 4,4,14-trimethyl-5α - androstane-3β,16α,17α-triol-7,11-dione-3,16-diacetate-17-(5-methylhexanoate) (CXLVIII).

EXAMPLE 182

*4,4,14-trimethyl-5α-androstane-3β,17β-diol-11-one-3-acetate-17-(5-methylhexanoate) (XLII)*

Following the procedure set forth in Example 176, but substituting 3-acetyl-21-nor - lanostane-3β-ol-11,20-dione, obtained in Example 162, for 3-acetyl-21-nor-eburicane-3β-ol-11,20-dione, yields 4,4,14-trimethyl-5α-androstane-3β,17β - diol - 11 - one-3-acetate-17-(5-methylhexanoate) (XLII).

EXAMPLE 183

*4,4,14-trimethyl-5α-androstane-3β,16α,17β-triol-11-one-3,16-diacetate-17-(5-methylhexanoate) (CXLI)*

Following the procedure set forth in Example 176, but substituting 3,16-diacetyl-21-nor-lanostane-3β,16α-diol-11,20-dione, obtained in Example 163 for 3-acetyl-21-nor-eburicane-3β-ol-11,20-dione, yields 4,4,14-trimethyl-5α-androstane - 3β,16α,17β-triol-11-one-3,16-diacetate-17-(5-methylhexanoate) (CXLI).

EXAMPLE 184

*4,4,14-trimethyl-Δ⁸-5α-androstene-3β,17β-diol-7,11-dione-3-acetate-17-(4,5-dimethylhexanoate)*

Following the procedures set forth in Example 176 but substituting 3-acetyl - 21 - nor-Δ⁸-eburicene-3β-ol-7,11,20-trione, obtained in Example 168 for 3-acetyl-21-nor-eburicane-3β-ol-11,20-dione, yields 4,4,14-trimethyl-Δ⁸-5α-androstene-3β,17β-diol-7,11-dione-3-acetate-17-(4,5-dimethylhexanoate).

EXAMPLE 185

*4,4,14-trimethyl-Δ⁸-5α-androstene-3β,16α,17β-triol-7,11-dione-3,16-diacetate-17-(4,5-dimethylhexanoate)*

Following the procedure set forth in Example 176, but substituting 3,16-diacetyl-21-nor-Δ⁸-eburicene-3β,16α-diol-7,11,20-trione obtained in Example 169 for 3-acetyl-21-nor-eburicane-3β-ol-11,20-dione, yields 4,4,14-trimethyl-Δ⁸-5α-androstene-3β,16α,17β-triol-7,11-dione-3,16 - diacetate-17-(4,5-dimethylhexanoate).

EXAMPLE 186

*4,4,14-trimethyl-5α-androstane-3β,17β-diol-7,11-dione-3-acetate-17-(4,5-dimethylhexanoate)*

Following the procedures set forth in Example 176, but substituting 3-acetyl-21-nor-eburicane-3β-ol-7,11,20-trione, obtained in Example 170 for 3-acetyl-21-nor-eburicane-3β-ol-11,20-dione, yields 4,4,14-trimethyl-5α-androstane - 3β,17β-diol-7,11-dione-3-acetate-17-(4,5-dimethylhexanoate).

EXAMPLE 187

*4,4,14-trimethyl-5α-androstane-3β,16α,17β-triol-7,11-dione-3,16-diacetate-17-(4,5-dimethylhexanoate)*

Following the procedure set forth in Example 176, but substituting 3,16 - diacetyl-21-nor-eburicane-3β,16α-diol-7,11,20-trione obtained in Example 171 for 3-acetyl-21-nor-eburicane-3β-ol-11,20-dione, yields 4,4,14-trimethyl-5α - androstane-3β,16α,17β-triol-7,11-dione-3,16-diacetate-17-(4,5-dimethylhexanoate).

EXAMPLE 188

*4,4,14-trimethyl-androstane-3β,17β-diol-3-acetate-17-(4,5dimethylhexanoate) (LXV)*

Following the procedures set forth in Example 176, but substituting 3-acetyl-21-nor-eburicane-3β-ol-20-one, obtained in Example 172 for 3-acetyl-21-nor-eburicane-3β-ol-11,20-dione, yields 4,4,14-trimethyl-Δ⁸-androstane-3β,17β - diol - 7 - one-3-acetate-17-(4,5-dimethylhexanoate) (LXV).

EXAMPLE 189

*4,4,14-trimethyl-androstane-3β,16α,17β-triol-3,16-diacetate-17-(4,5-dimethylhexanoate)*

Following the procedure set forth in Example 176, but substituting 3,16-diacetyl-21-nor-eburicane-3β,16α-diol-20-one obtained in Example 173 for 3-acetyl-21-nor-eburicane-3β-ol-11,20-dione, yields 4,4,14-trimethyl-Δ⁸-androstene-3β,16α,17β-triol-7-one-3,16-diacetate - 17 - (4,5 - dimethylhexanoate).

EXAMPLE 190

*4,4,14-trimethyl-5α-androstane-3β,17β-diol-7-one-3-acetate-17-(4,5-dimethylhexanoate)*

Following the procedures set forth in Example 176, but substituting 3-acetyl-21-nor-eburicane-3β-ol-7,20-dione obtained in Example 174 for 3-acetyl-21-nor-eburicane-3β-ol-11,20-dione, yields 4,4,14-trimethyl-5α-androstane-3β,17β-diol-7-one-3-acetate-17-(4,5-dimethylhexanoate).

EXAMPLE 191

*4,4,14-trimethyl-5α-androstane-3β,16α,17β-triol-7-one-3,16-diacetate-17-(4,5-dimethylhexanoate)*

Following the procedure set forth in Example 176, but substituting 3,16-diacetyl-21-nor-eburicane - 3β,16α - diol-7,20-dione obtained in Example 175 for 3-acetyl-21-nor-eburicane-3β-ol-11,20-dione, yields 4,4,14-trimethyl-5α-androstane - 3β,16α,17β-triol-7-one-3,16-diacetate-17-(4,5-dimethylhexanoate).

EXAMPLE 192

*4,4,14-trimethyl-5α-androstane-3β,17β-diol-11-one (XXVIII)*

A solution of 50 mg. of 3-acetyl-21-nor-eburicane-3β-ol-11,20-dione (XXI) (0.1 mmole) in 10 ml. of methylene chloride containing 710 mg. of dibasic sodium phosphate (5.0 mmoles) is treated with 5 ml. of freshly prepared trifluoroperacetic acid in methylene chloride (1 mmole/ml.) and held at room temperature for 40 hours. The solution is then diluted with 10 ml. of chloroform and is washed with 5% sodium carbonate, water, dried and evaporated to give a crude mixture. The mixture is then dissolved in 25 ml. of 1 N ethanolic potassium hydroxide and left at room temperature for 20 hours. Neutralization with 20% sulfuric acid is followed by isolation in the usual manner, to yield 38 mg. of a mixture of crude compounds. Thin layer chromatography on morin-impregnated alumina (Activity V), using chloroform gives 2 spots. The slower moving spot ($R_f$=0.13–0.18) on elution yields 15 mg. of material, which on recrystallization from methanol gives 4.2 mg. of 4,4,14-trimethyl-5α-androstane-3β,17β-diol-11-one (XXVIII), having the following properties: M.P. 267–270°;

$\lambda_{max.}^{KBr}$ 2.92, 5.88μ.

*Analysis.*—Calcd. for $C_{22}H_{36}O_3$: C, 75.81; H, 10.41. Found: C, 75.97; H, 10.66.

EXAMPLE 193

*4,4,14-trimethyl-5α-androstane-3β,16α,17β-triol-11-one (CXXIV)*

Following the procedure of Example 192, but substituting 3,16-diacetyl-21-nor-eburicane - 3β,16α - diol-11,20-dione (CXVII) for 3-acetyl-21-nor-eburicane-3β-ol-11, 20-dione, yields 4,4,14-trimethyl-5α-androstane-3β,16α,17β-triol-11-one (CXXIV).

EXAMPLE 194

*4,4,14-trimethyl-5α-androstane-3β,17β-diol-7,11-dione*

Following the procedure set forth in Example 192, but substituting 3-acetyl-21-norlanostane - 3β-ol-7,11,20-trione obtained in Example 164 for 3-acetyl-21-nor-eburicane - 3β-ol-11,20 - dione, yields 4,4,14-trimethyl-5α-androstane-3β,17β-diol-7,11-dione.

EXAMPLE 195

*4,4,14-trimethyl-5α-androstane-3β,16α,17β-triol-7,11-dione*

Following the procedure of Example 192, but substituting 3,16-diacetyl-21-nor-lanostane-3β,16α-diol-7,11,20-trione obtained in Example 165 for 3-acetyl-21-nor-eburicane - 3β-ol-11,20-dione, yields 4,4,14-trimethyl-5α-androstane-3β,16α,17β-triol-7,11-dione.

EXAMPLE 196

*4,4,14-trimethyl-5α-androstane-3β,17β-diol-11-one*

Following the procedures set forth in Example 192, but substituting 3-acetyl-21-nor-lanostane-3β-ol-11,20-dione, obtained in Example 162 for 3-acetyl-21-nor-eburicane-3β-ol-11,20-dione, yields 4,4,14-trimethyl-5α-androstane-3β,17β-diol-11-one.

EXAMPLE 197

*4,4,14-trimethyl-5α-androstane-3β,16α,17β-triol-11-one (CXIII)*

Following the procedure set forth in Example 192, but substituting 3,16-diacetyl-21-nor-lanostane-3β,16α-diol-11,20-dione obtained in Example 163 for 3-acetyl-21-nor-eburicane-3β-ol-11,20-dione, yields 4,4,14-trimethyl-5α-androstane-3β,16α,17β-triol-11-one.

EXAMPLE 198

*4,4,14-trimethyl-Δ⁸-5α-androstene-3β,17α-diol-7,11-dione*

Following the procedure set forth in Example 192, but substituting 3-acetyl - 21-nor-Δ⁸-eburicene-3β-ol-7,11,20-trione, obtained in Example 168, for 3-acetyl-21-nor-eburicane-3β-ol-11,20-dione yields 4,4,14-trimethyl-Δ⁸-5α-androstene-3β,17β-diol-7,11-dione.

EXAMPLE 199

*4,4,14-trimethyl-Δ⁸-5α-androstene-3β,16α,17β-triol-7,11-dione*

Following the procedure set forth in Example 192, but substituting 3,16-diacetyl-21-nor-Δ⁸ - eburicene-3β,16α-diol-7,11,20-trione, obtained in Example 169, for 3-acetyl-21-nor eburicane-3β-ol-11,20-dione, yields 4,4,14-trimethyl-Δ⁸-5α-androstene-3β,16α,17β-triol-7,11-dione.

EXAMPLE 200

*4,4,14-trimethyl-5α-androstane-3β,17β-diol-7,11-dione (XCVIII)*

Following the procedure set forth in Example 192, but substituting 3-acetyl-21-nor-eburicane-3β-ol-7,11,20-trione, obtained in Example 170, for 3-acetyl-21-nor-eburicane-3β-ol-11,20-dione yields 4,4,14-trimethyl-5α-androstane-3β,17β-diol-7,11-dione (XCVIII).

EXAMPLE 201

*4,4,14-trimethyl-5α-androstane-3β,16α,17β-triol-7,11-dione (CXXX)*

Following the procedure set forth in Example 192, but substituting 3,16-diacetyl-21-nor-eburicane-3β,16α - diol-7,11,20-trione obtained in Example 171 for 3-acetyl-21-nor-eburicane-3β-ol-11,20-dione, yields 4,4,14-trimethyl-5α-androstane-3β,16α,17β-triol-7,11-dione.

EXAMPLE 202

*4,4,14-trimethyl-5α-androstane-3β,17β-diol (LXIX)*

Following the procedure set forth in Example 192, but substituting 3-acetyl-21-noreburicane - 3β-ol-20-one obtained in Example 172 for 3-acetyl-21-nor-eburicane-3β-ol-11,20-dione, yields 4,4,14-trimethyl-5α-androstane-3β,17β-diol (LXIX).

EXAMPLE 203

*4,4,14-trimethyl-5α-androstane-3β,16α,17β-triol*

Following the procedure set forth in Example 192, but substituting 3,16-diacetyl-21-nor-eburicane-3β,16α - diol-20-one, obtained in Example 173, for 3-acetyl-21-nor-eburicane-3β-ol-11,20-dione yields 4,4,14-trimethyl-5α-androstane-3β,16α,17β-triol.

EXAMPLE 204

*4,4,14-trimethyl-5α-androstane-3β,17β-diol-7-one*

Following the procedure set forth in Example 192, but substituting 3-acetyl-21-nor-eburicane-3β-ol-7,20-dione, obtained in Example 174 for 3-acetyl-21-nor-eburicane-3β-ol-11,20-dione, yields 4,4,14-trimethyl-5α-androstane-3β,17α-diol-7-one.

EXAMPLE 205

*4,4,14-trimethyl-5α-androstane-3β,16α,17β-triol-7-one*

Following the procedure set forth in Example 192, but substituting 3,16-diacetyl-21-nor-eburicane-3β,16α - diol-7,20-dione, obtained in Example 175 for 3-acetyl-21-nor-eburicane-3β-ol-11,20-dione, yields 4,4,14-trimethyl-5α-androstane-3β,16α,17β-triol-7-one.

EXAMPLE 206

*4,4,14-trimethyl-5α-androstane-3β,17β-diol-11-one-3,17-diacetate (XXVII)*

A solution of 50 mg. of 3-acetyl-21-noreburicane-3β-ol-11,20-dione (XXI) (0.1 mmole) in 10 ml. of methylene chloride containing 710 mg. of dibasic sodium phosphate (5.0 mmole) is treated with 5 ml. of freshly prepared trifluoroperacetic acid in methylene chloride (1 mmole/ml.) and held at room temperature for 40 hours. The solution is then diluted with 10 ml. of chloroform and is washed with 5% sodium carbonate, water, dried and evaporated to give a crude mixture. The mixture is then dissolved in 25 ml. of 1 N ethanolic potassium hydroxide and held at room temperature for 20 hours. Neutralization with 20% sulfuric acid is followed by isolation in the usual manner. 7 mg. of the isolated crude product is then acetylated by treatment with acetic anhydride in pyridine at room temperature to yield 5 mg. of non-crystalline material. Thin layer chromatography of this material on morin-impregnated alumina (Activity V) in hexane-chloroform, gives two spots, $R_f = 0.31$ and 0.69 respectively. The more polar spot on elution gives 2 mg. of crude material, which on recrystallization from methanol yields 0.5 mg. of 4,4,14-trimethyl-5α-androstane-3β,17β - diol - 11-one-3,17-diacetate (XXXVII), having the following properties: M.P. 234–235° (softening at 227°);

$\lambda_{max}^{KBr}$ 5.76, 5.86, 8.00μ

EXAMPLE 207

*4,4,14-trimethyl-5α-androstane-3β,16α,17β-triol-11-one-3,16,17-triacetate (CXXIII)*

Following the procedure set forth in Example 206 but substituting 3,16 - diacetyl-21-nor-eburicane-3β,16α-diol-11,20-dione for 3-acetyl-21-nor-eburicane-3β-ol-11,20-dione yields 4,4,14-trimethyl-5α-androstane-3β,16α,17β-triol-11-one-3,16,17-triacetate (CXXIII).

EXAMPLE 208

*4,4,14-trimethyl-5α-androstane-3β,17β-diol-7,11-dione-3,17-diacetate*

Following the procedure set forth in Example 206, but substituting 3 - acetyl-21-nor-lanostane-3β-ol-7,11,20-trione obtained in Example 164 for 3-acetyl-21-nor-eburicane-3β-ol-11,20-dione, yields 4,4,14-trimethyl-5α-androstane-3β,17β-diol-7,11-dione-3,7-diacetate.

EXAMPLE 209

*4,4,14-trimethyl-5α-androstane-3β,16α,17β-triol-7,11-dione-3,16,17-triacetate*

Following the procedure set forth in Example 206, but substituting 3,16 - diacetyl-21-nor-lanostane-3β,16α-diol-7,11,20-trione obtained in Example 165 for 3-acetyl-21-nor-eburicane-3β-ol-11-20-dione, yields 4,4,14-trimethyl-5α - androstane - 3β,16α,17α-triol-7,11-dione-3,16,17-triacetate.

EXAMPLE 210

*4,4,14-trimethyl-5α-androstane-3β,17β-diol-11-one-3,17-diacetate (XXVII)*

Following the procedure set forth in Example 206, but substituting 3-acetyl-21-nor-lanostane-3β-ol-11,20-dione obtained in Example 162 for 3-acetyl-21-nor-eburicane-3β-ol-11,20-dione, yields 4,4,14-trimethyl-5αandrostane-3β,17β-diol-11-one-3,17-diacetate (XXVII).

EXAMPLE 211

*4,4,14-trimethyl-5α-androstane-3β,16α,17β-triol-11-one-3,16,17-triacetate (CXXIII)*

Following the procedure set forth in Example 206, but substituting 3,16 - diacetyl-21-nor-lanostane-3β,16α-diol-11,20-dione, obtained in Example 163 for 3-acetyl-21-nor-eburicane-3β-ol-11,20-dione, yields 4,4,14-trimethyl-5α-androstane - 3β,16α,17β - triol-11-one-3,16,17-triacetate (CXXIII).

EXAMPLE 212

*4,4,14-trimethyl-Δ⁸-5α-androstene-3β,17β-diol-7,11-dione-3,17-diacetate*

Following the procedure set forth in Example 206, but substituting 3 - acetyl-21-nor-Δ⁸-eburicene-3β-ol-7,11,20-trione, obtained in Example 168 for 3-acetyl-21-nor-eburicane-3β-ol-11,20-dione, yields 4,4,14-trimethyl-Δ⁸-5α-androstene-3β,17β-diol-7,11-dione-3,17-diacetate.

EXAMPLE 213

*4,4,14-trimethyl-Δ⁸-5α-androstene-3β,16α,17β-triol-7,11-dione-3,16,17-triacetate*

Following the procedure set forth in Example 206 but substituting 3,16-diacetyl-21-nor-Δ⁸-eburicene-3β,16α-diol-7,11,20-trione, obtained in Example 169, for 3-acetyl-21-nor-eburicane-3β-ol-11,20-dione, yields 4,4,14-trimethyl-Δ⁸ - 5α - androstene-3β,16α,17β-triol-7,11-dione-3,16,17-triacetate.

EXAMPLE 214

*4,4,14-trimethyl-5α-androstane-3β,17β-diol-7,11-dione-3,17-diacetate*

Following the procedure set forth in Example 206, but substituting 3-acetyl-21-noreburicane-3β-ol-7,11,20-trione, obtained in Example 170, for 3-acetyl-21-nor-eburicane-3β-ol-11,20-dione, yields 4,4,14-trimethyl-5α-androstane-3β,17β-diol-7,11-dione-3,17-diacetate.

EXAMPLE 215

*4,4,14-trimethyl-5α-androstane-3β,16α,17β-triol-7,11-dione-3,16,17-triacetate*

Following the procedure set forth in Example 206 but substituting 3,16 - diacetyl-21-nor-eburicane-3β,16α-diol-7,11,20-trione, obtained in Example 171, for 3-acetyl-21-nor-eburicane-3β-ol-11,20-dione, yields 4,4,14-trimethyl-5α - androstane - 3β,16α,17β-triol-7,11-dione-3,16,17-triacetate.

EXAMPLE 216

*4,4,14-trimethyl-5α-androstane-3β,17β-diol-3,17-diacetate*

Following the procedure set forth in Example 206, but substituting 3-acetyl-21-nor-eburicane-3β-ol-20-one, obtained in Example 172, for 3-acetyl-21-nor-eburicane-3β-ol-11,20 - dione, yields 4,4,14 - trimethyl-5α-androstane-3β,17β-diol-3,17-diacetate.

EXAMPLE 217

*4,4,14-trimethyl-5α-androstane-3β,16α,17β-triol-3,16,17-triacetate*

Following the procedure set forth in Example 206, but substituting 3,16 - diacetyl-21-nor-eburicane-3β,16α-diol-20-one, obtained in Example 173, for 3-acetyl-21-noreburicane-3β-ol-11,20-dione, yields 4,4,14-trimethyl-5α-androstane-3β,16α,17β-triol-3,16,17-triacetate.

EXAMPLE 218

*4,4,14-trimethyl-5α-androstane-3β,17β-diol-7-one-3,17-diacetate*

Following the procedure set forth in Example 206, but substituting 3 - acetyl - 21 - nor-eburicane-3β-ol-7,20-dione, obtained in Example 174, for 3-acetyl-21-nor-eburicane - 3β - ol - 11,20 - dione, yields 4,4,14-trimethyl-5α-androstane-3β,17β-diol-7-one-3,17-diacetate.

EXAMPLE 219

*4,4,14-trimethyl-5α-androstane-3β,16α,17β-triol-7-one-3,16,17-triacetate*

Following the procedure set forth in Example 206, but substituting 3,16 - diacetyl-21-nor-eburicane-3β,16α-diol-7,20-dione, obtained in Example 175, for 3-acetyl-21-nor-eburicane-3β-ol-11,20-dione, yields 4,4,14 - trimethyl-5α-androstane-3β,16α,17β-triol-7-one-3,16,17-triacetate.

EXAMPLE 220

*21-nor-eburicane-3β-ol-11,20-dione (XXII)*

A solution of 150 mg. of 3-acetyl-21-nor-eburicane-3β-ol-11,20-dione (XXI) in 20 ml. of 1 N ethanolic potassium hydroxide is held at room temperature for 16 hours. The solution is neutralized with 20% sulfuric acid and is diluted with water, after which the ethanol is evaporated and the residue extracted with ether. The ether solution is washed with water and dried over magnesium sulfate. Evaporation of the ether yields 140 mg. of crude product which upon recrystallization from methanol yields 102 mg. of 21-nor-eburicane-3β-ol-11,20-dione (XXII).

EXAMPLE 221

*21-nor-eburicane-3β,16α-diol-11,20-dione (CXVIII)*

Following the procedure set forth in Example 222, but substituting 3,16 - diacetyl-21-nor-eburicane-3β,16α-diol-11,20 - dione (CXVII) for 3-acetyl-21-nor-eburicene-3β-ol - 11,20 - dione yields 21 - nor-eburicane - 3β,16α-diol-11,20-dione (CXVIII).

EXAMPLE 222

*21-nor-Δ⁸-eburicene-3β-ol-20-one*

Following the procedure set forth in Example 220, but substituting 3 - acetyl - 21 - nor - Δ⁸ - eburicene-3β-ol-20-one, obtained in Example 160, for 3-acetyl-21-nor-eburicane-3β-ol-11,20-dione, yields 21 - norΔ⁸-eburicene-3β-ol-20-one.

EXAMPLE 223

*21-nor-Δ⁸-eburicene-3β,16α-diol-20-one*

Following the procedure set forth in Example 220, but substituting 3,16-diacetyl-21-nor-Δ⁸-eburicene-3β,16α-diol-20-one obtained in Example 161 for 3-acetyl-21-nor- eburicene-3β-ol-11,20-dione, yields 21 - nor-Δ⁸-eburicene-3β,-16α-diol-20-one.

EXAMPLE 224

*21-nor-lanostane-3β-ol-7,11,20-trione*

Following the procedure set forth in Example 220, but substituting 3-acetyl-21-nor-lanostane-3β-ol-7,11,20-trione, obtained in Example 164, for 3-acetyl-21-nor-eburicane-3β-ol-11,20-dione, yields 21-nor-lanostane-3β-ol-7,11,20-trione.

EXAMPLE 225

*21-nor-lanostane-3β,16α-diol-7,11,20-trione*

Following the procedure set forth in Example 220, but substituting 3,16-diacetyl-21-nor-lanostane-3β,16α-diol-7,-11,20-trione obtained in Example 165 for 3-acetyl-21-nor-eburicene-3β-ol-11,20-dione, yields 21-nor-lanostane-3β,-16α-diol-7,11,20, trione.

EXAMPLE 226

*21-nor-lanostane-3β-ol-11,20-dione*

Following the procedure set forth in Example 220, but substituting 3 - acetyl-21-nor-lanostane-3β-ol-11,20-dione, obtained in Example 162, for 3-acetyl-21-nor-eburicane-3β - ol - 11,20-dione, yields 21-nor-lanostane-3β-ol-11,20-dione.

EXAMPLE 227

*21-nor-lanostane-3β,16α-diol-11,20-dione*

Following the procedure set forth in Example 220, but substituing 3,16-diacetyl-21-nor-lanostane-3β,16α-diol-11,20-dione, obtained in Example 163, for 3-acetyl-21-nor-eburicene-3β-ol-11,20-dione, yields 21-nor-lanostane-3β,-16α-diol-11,20-dione.

EXAMPLE 228

*21-nor-Δ⁹⁽¹¹⁾-eburicene-3β-ol-20-one*

Following the procedures set forth in Example 220, but substituting 3-acetyl-21-nor-Δ⁹⁽¹¹⁾-eburicene-3β-ol-20-one, obtained in Example 166, for 3-acetyl-21-nor-eburicene-3β-ol-11,20-dione, yields 21-nor-Δ⁹⁽¹¹⁾-eburicene-3β-ol-20-one.

EXAMPLE 229

*21-nor-Δ⁹⁽¹¹⁾-eburicene-3β,16α-diol-20-one*

Following the procedure set forth in Example 220, but substituting 3,16-diacetyl-21-nor-Δ⁹⁽¹¹⁾-eburicene-3β,16α-diol-20-one, obtained in Example 167, for 3-acetyl-21-nor-eburicene-3β-ol-11,20-dione, yields 21-nor-Δ⁹⁽¹¹⁾-eburicene-3β,16α-diol-20-one.

EXAMPLE 230

*21-nor-Δ⁸-eburicene-3β-ol-7,11,20-trione*

Following the procedure set forth in Example 220, but substituting 3-acetyl-21-nor-Δ⁸-eburicene-3β-ol-7,11,20-trione, obtained in Example 168, for 3-acetyl-21-nor-eburicene-3β-ol-11,20-dione, yields 21-nor-Δ⁸-eburicene-3β-ol-7,11,20-trione.

EXAMPLE 231

*21-nor-Δ⁸-eburicene-3β,16α-diol-7,11,20-trione*

Following the procedure set forth in Example 220, but substituting 3,16-diacetyl-21-nor-Δ⁸-eburicene-3β,16α-diol-7,11,20-trione, obtained in Example 169, for 3-acetyl-21-nor-eburicene-3β-ol-11,20-dione, yields 21-nor-Δ⁸-eburicene-3β,16α-diol-7,11,20-trione.

EXAMPLE 232

*21-nor-eburicane-3β-ol-7,11,20-trione*

Following the procedure set forth in Example 220, but substituting 3 - acetyl-21-nor-eburicane-3β-ol-7,11,20-trione, obtained in Example 170, for 3-acetyl-21-nor-eburicane-3β-ol-11,20-dione, yields 21-nor-eburicane-3β-ol-7,11,20-trione.

EXAMPLE 233

*21-nor-eburicane-3β,16α-diol-7,11,20-trione*

Following the procedure set forth in Example 220, but substituting 3,16-diacetyl-21-nor-eburicane-3β,16α-diol-7,11,20-trione, obtained in Example 171, for 3-acetyl-21-nor-eburicene-3β-ol-11,20-dione, yields 21-nor-eburicane-3β,16α-diol-7,11,20-trione.

EXAMPLE 234

*21-nor-eburicane-3β-ol-20-one*

Following the procedure set forth in Example 220, but substituting 3-acetyl-21-nor-eburicane-3β-ol-20-one, obtained in Example 172, for 3-acetyl-21-nor-eburicane-3β-ol-11,20-dione, yields 21-nor-eburicane-3β-ol-20-one.

EXAMPLE 235

*21-nor-eburicane-3β,16α-diol-20-one*

Following the procedure set forth in Example 220, but substituting 3,16-diacetyl-21-nor-eburicane-3β,16α-diol-20-one, obtained in Example 173, for 3-acetyl-21-nor-eburicane-3β-ol-11,20-dione, yields 21-nor-eburicane-3β,16α-diol-20-one.

EXAMPLE 236

*21-nor-eburicane-3β-ol-7,20-dione*

Following the procedure set forth in Example 220, but substituting 3,16-diacetyl-21-nor-eburicane-3β,16α-diol-7, obtained in Example 174, for 3-acetyl-21-nor-eburicane-3β-ol-11,20-dione, yields 21-nor-eburicane-3β - ol - 7,20-dione.

EXAMPLE 237

*21-nor-eburicane-3β,16α-diol-7,20-dione*

Following the procedure set forth in Example 220, but substituting 3,16-diacetyl-21-nor-eburicane-3β,16α-diol-7,20-dione, obtained in Example 175, for 3-acetyl-21-nor-eburicene-3β-ol-11,20-dione, yields 21-nor-eburicane - 3β,16α-diol-7,20-dione.

EXAMPLE 238

*4,4,14-trimethyl-5α-androstane-3β,17β-diol-11-one-17-(4,5-dimethylhexanoate) (XXIV)*

A solution of 50 mg. of 21-nor-eburicane-3β-ol-11,20-dione (XXII) in 10 ml. of methylene chloride containing 710 mg. of disodium phosphate is treated with 5 ml. of freshly prepared trifluoroperacetic acid (1 mmole/ml.) and held at room temperature for 48 hours. The solution is diluted with 10 ml. of chloroform and washed with 5% sodium carbonate and water, and is then dried over magnesium sulfate and evaporated to yield 48 mg. of crude product. The crude product is purified by thin layer chromatography on morin-impregnated alumina (Activity V) with chloroform as the solvent. The more polar spot is eluted and recrystallized from methanol to yield 10 mg. of 4,4,14-trimethyl-5α-androstane-3β,17β-diol-11-one - 17-(4,5-dimethylhexanoate) (XXIX).

EXAMPLE 239

*4,4,14-trimethyl-5α-androstane-3β,16α,17β-triol-11-one-17-(4,5-dimethylhexanoate) (CXX)*

Following the procedure set forth in Example 238, but substituting 21-nor-eburicane-3β,16α-diol - 11,20 - dione (CXVIII) for 21-nor-eburicane-3β-ol-11,20-dione, yields 4,4,14-trimethyl-5α-androstane-3β,16α,17β-triol-11 - one-17-(4,5-dimethylhexanoate) (CXX).

EXAMPLE 240

*4,4,14-trimethyl-5α-androstane-3β,17β-diol-7,11-dione-17-(5-methylhexanoate)*

Following the procedure set forth in Example 238, but substituting 21-nor-lanostane-3β-ol-17,11,20 - trione, obtained in Example 224, for 21-nor-eburicane-3β-ol-11,20- dione, yields 4,4,14-trimethyl-5α-androstane-3β,17β-diol-7,11-dione-17-(5-methylhexanoate).

EXAMPLE 241

*4,4,14-trimethyl-5α-androstane-3β,16α,17β-triol-7,11-dione-17-(5-methylhexanoate)*

Following the procedure set forth in Example 238, but substituting 21-nor-lanostane-3β,16α-diol-7,11,20 - trione, obtained in Example 225, for 21-nor-eburicane-3β-ol-11,20-dione, yields 4,4,14-trimethyl-5α-androstane - 3β,16α,17β-triol-7,11-dione-17-(5-methylhexanoate).

EXAMPLE 242

*4,4,14-trimethyl-5α-androstane-3β,17β-diol-11-one-17-(5-methylhexanoate)*

Following the procedure set forth in Example 238, but substituting 21-nor-lanostane-3β-ol-11,20-dione, obtained in Example 226, for 21-nor-eburicane-3β-ol-11,20-dione, yields 4,4,14-trimethyl-5α-androstane-3β,17β-diol-11-one-17-(5-methylhexanoate).

EXAMPLE 243

*4,4,14-trimethyl-5α-androstane-3β,16α,17β-triol-11-one-17-(5-methylhexanoate)*

Following the procedure set forth in Example 238, but substituting 21-nor-lanostane-3β,16α-diol-11,20-dione obtained in Example 227, for 21-nor-eburicane-3β-ol-11,20-dione, yields 4,4,14-trimethyl-5α-androstane-3β,16α,17β-triol-11-one-17-(5-methylhexanoate).

EXAMPLE 244

*4,4,14-trimethyl-Δ⁶-5α-androstene-3β,17β-diol-7,11-dione-17-(4,5-methylhexanoate)*

Following the procedure set forth in Example 238, but substituting 21-nor-Δ⁸-eburicene-3β-ol-7,11,20-trione, obtained in Example 230, for 21-nor-eburicane-3β-ol-11,20-dione, yields 4,4,14-trimethyl-Δ⁸-5α-androstene - 3β,17β-diol-7,11-dione-17-(4,5-dimethylhexanoate).

EXAMPLE 245

*4,4,14-trimethyl-Δ⁸-5α-androstene-3β,16α,17β-triol-7,11-dione-17-(4,5-dimethylhexanoate)*

Following the procedure set forth in Example 238, but substituting 21-nor-Δ⁸-eburicene-3β,16α-diol-7,11,20 - trione, obtained in Example 231, for 21-nor-eburicane-3β-ol-11,20-dione, yields 4,4,14-trimethyl-Δ⁸-5α-androstene-3β,16α,17β-triol-7,11-dione-17-(4,5-dimethylhexanoate).

EXAMPLE 246

*4,4,14-trimethyl-5α-androstane-3β,17β-diol-7,11-dione-17-(4,5-dimethylhexanoate)*

Following the procedure set forth in Example 238, but substituting 21-nor-eburicane-3β-ol-7,11,20 - trione, obtained in Example 232, for 21-nor-eburicane-3β-ol-11,20-dione, yields 4,4,14-trimethyl-5α-androstane-3β,17β-diol-7,11-dione-17-(4,5-dimethylhexanoate).

EXAMPLE 247

*4,4,14-trimethyl-5α-androstane-3β,16α,17β-triol-7,11-dione-17-(4,5-dimethylhexanoate)*

Following the procedure set forth in Example 238, but substituting 21-nor-eburicane-3β,16α-diol-7,11,20 - trione, obtained in Example 233, for 21-nor-eburicane-3β-ol-11,20-dione, yields 4,4,14-trimethyl-5α-androstane - 3β,16α,17-β-triol-7,11-dione-17-(4,5-dimethylhexanoate).

EXAMPLE 248

*4,4,14-trimethyl-5α-androstane-3β,17β-diol-17-(4,5-dimethylhexanoate)*

Following the procedure set forth in Example 238, but substituting 21-nor-eburicane-3β-ol-20-one, obtained in Example 234, for 21-noreburicane-3β-ol-11,20-dione, yields 4,4,14-trimethyl-5α-androstane-3β,17β-diol-17 - (4,5 - dimethylhexanoate).

EXAMPLE 249

*4,4,14 - trimethyl - 5α - androstane - 3β,16α,17β - triol - 17 - (4,5 - dimethyl - hexanoate)*

Following the procedure set forth in Example 238, but substituting 21 - nor - eburicane - 3β,16α - diol - 20 - one obtained in Example 235, for 21-nor-eburicane-3β-ol-11,20 - dione, yields 4,4,14 - trimethyl - 5α - androstane - 3β,16α,17β - triol - 17 - (4,5 - dimethylhexanoate).

EXAMPLE 250

*4,4,14 - trimethyl - 5α - androstane - 3β,17β - diol - 7 - one - 17 - (4,5 - dimethylhexanoate)*

Following the procedure set forth in Example 238, but substituting 21 - noreburicane - 3β - ol - 7,20 - dione, obtained in Example 236, for 21-nor-eburicane-3β-ol-11,20-dione, yields 4,4,14-trimtehyl - 5α - androstane - 3β,17β - diol - 7 - one - 17 - (4,5 - dimethylhexanoate).

EXAMPLE 251

*4,4,14 - trimethyl - 5α - androstane - 3β,16α,17β - triol - 7 - one - 17 - (4,5 - dimethylhexanoate)*

Following the procedure set forth in Example 238, but substituting 21 - nore-buricane - 3β,16α - diol - 7,20 - dione, obtained in Example 237, for 21-nor-eburicane-3β-ol-11,20-dione, yields 4,4,14-trimethyl-5α-androstane- 3β,16α,17β - triol - 7 - one - 17 - (4,5 - dimethylhexanoate).

EXAMPLE 252

*4,4,14 - trimethyl - 5α - androstane - 17β - ol - 3,11 - dione - 17 - (4,5 - dimethylhexanoate) (XXV)*

A solution of 20 mg. of 4,4,14-trimethyl-5α-androstane - 3β,17β - diol - 11 - one - 17 - (4,5 - dimethylhexanoate) (XXIV) in 5 ml. of acetone is oxidized by dropwise addition of chromic acid-sulfuric acid-acetone, until an orange color persists. A few drops of methanol are added, the mixture diluted with 10 ml. of water and extracted with ether. The ether solution is washed with water, dried over magnesium sulfate and evaporated to give 16 mg. of 4,4,14-trimethyl-5α-androstane-17β-ol 3,11 - dione - 17 - (4,5 - dimethylhexanoate) (XXV) upon recrystallization from methanol.

EXAMPLE 253

*4,4,14 -trimethyl - 5α - androstane - 17β - ol - 3,11,16 - trione - 17 - (4,5 - dimethylhexanoate) (CXXI)*

Following the procedure set forth in Example 252, but substituting 4,4,14 - trimethyl - 5α - androstane - 3β,16α,17β - triol - 11 - one - 17 - (4,5 - dimethylhexanoate) (CXX) for 4,4,14-trimethyl-5α-androstane- 3β,17β - diol - 11 -one-17-(4,5-dimethylhexanoate), yields 4,4,14 - trimethyl - 5α - androstane - 17β - ol - 3,11,16 - trione - 17 - (4,5 - dimethylhexanoate) (CXXI).

EXAMPLE 254

*4,4,14 - trimethyl - Δ⁸ - 5α - androstene - 17β - ol - 3 - one - 17 - (4,5 - dimethylhexanoate)*

Following the procedure set forth in Example 252, but substituting 4,4,14 - trimethyl - Δ⁸ - androstene - 3β,17β - diol - 17 - (4,5 - dimethylhexanoate) for 4,4,14 - trimethyl - 5α - androstane - 3β,17β - diol - 11 - one - 17 - (4,5 - dimethylhexanoate), yields 4,4,14 - trimethyl - Δ⁸ - 5α - androstene - 17β - ol - 3 - one - 17 - (4,5 - dimethylhexanoate).

EXAMPLE 255

*4,4,14 - trimethyl - Δ⁸ - 5α - androstene - 17β - ol - 3,16 - dione - 17 - (4,5 - dimethylhexanoate)*

Following the procedure set forth in Example 252, but substituting 4,4,14 - trimethyl - Δ⁸-5α - androstene-

EXAMPLE 256

*4,4,14 - trimethyl - 5α - androstane - 17β - ol - 3,7,11 - trione - 17 - (5 - methylhexanoate)*

Following the procedure set forth in Example 252, but substituting 4,4,14 - trimethyl - 5α - androstane - 3β,17β - diol - 7,11 - dione - 17 - (5 - methylhexanoate), for 4,4,14 - trimethyl - 5α - androstane - 3β,17β - diol - 11 - one - 17 - (4,5 - dimethylhexanoate), yields 4,4,14 - trimethyl-5α - androstane - 17β - ol - 3,7,11 - trione - 17 - (5 - methylhexanoate).

EXAMPLE 257

*4,4,14 - trimethyl - 5α - androstane - 17β - ol - 3,7,11,16 - tetraone - 17 - (5 - methylhexanoate)*

Following the procedure set forth in Example 252, but substituting 4,4,14 - trimethyl - 5α - androstane - 3β,16α,17β - triol - 7,11 - dione - 17 - (5 - methylhexanoate) for 4,4,14 - trimethyl - 5α - androstane - 3β,17β - diol - 11 - one - 17 - (4,5 - dimethylhexanoate) yields 4,4,14 - trimethyl - 5α - androstane - 17β - ol - 3,7,11,16 - tetraone - 17 - (5 - methylhexanoate).

EXAMPLE 258

*4,4,14 - trimethyl - 5α - androstane - 17β - ol - 3,11 - dione - 17 - (5 - methylhexanoate)*

Following the procedure set forth in Example 252, but substituting 4,4,14 - trimethyl - 5α - androstane - 3β,17β - diol - 11 - one - 17 - (5 - methylhexanoate), for 4,4,14 - trimethyl - 5α - androstane - 3β,17β - diol - 11 - one - 17 - (4,5 - dimethylhexanoate) yields 4,4,14 - trimethyl - 5α - androstane - 17β - ol - 3,11 - dione - 17 - (5-methylhexanoate).

EXAMPLE 259

*4,4,14 - trimethyl - 5α - androstane - 17β - ol - 3,11,16 - trione - 17 - (5 - methylhexanoate)*

Following the procedure set forth in Example 252, but substituting 4,4,14 - trimethyl - 5α - androstane - 3β,16α,17β - triol - 11 - one - 17 - (5 - methylhexanoate) for 4,4,14 - trimethyl - 5α - androstane - 3β,17β - diol - 11 - one - 17 - (4,5 - dimethylhexanoate) yields 4,4,14 - trimethyl - 5α - androstane - 17β - ol - 3,11,16 - trione - 17 - (5 - methylhexanoate).

EXAMPLE 260

*4,4,14 - trimethyl - Δ⁸ - 5α - androstene - 17β - ol - 3,7,11 - trione - 17 - (4,5 - dimethylhexanoate)*

Following the procedure set forth in Example 252, but substituting 4,4,14 - trimethyl - Δ⁸ - 5α - androstene - 3β,17β - diol - 7,11 - dione - 17 - (4,5 - dimethylhexanoate), for 4,4,14 - trimethyl - 5α - androstane - 3β,17β - diol - 11 - one - 17 - (4,5 - dimethylhexanoate) yields 4,4,14 - trimethyl - Δ⁸ - 5α - androstene - 17β - ol - 3,7,11 - trione - 17 - (4,5 - dimethylhexanoate).

EXAMPLE 261

*4,4,14 - trimethyl - Δ⁸ - 5α - androstene - 17β - ol - 3,7,11,16 - tetraone - 17 - (4,5 - dimethylhexanoate)*

Following the procedure set forth in Example 252, but substituting 4,4,14 - trimethyl - Δ⁸ - 5α - androstene - 3β,16α,17β - triol - 7,11 - dione - 17 - (4,5 - dimethylhexanoate), for 4,4,14 - trimethyl - 5α - androstane - 3β,17β - diol - 11 - one - 17 - (4,5 - dimethylhexanoate), yields 4,4,14 - trimethyl - Δ⁸ - 5α - androstene - 17β - ol - 3,7,11,16 - tetraone - 17 - (4,5 - dimethylhexanoate).

EXAMPLE 262

*4,4,14-trimethyl-5α-androstane-17β-ol-3,7,11-trione-17-(4,5-dimethylhexanoate)*

Following the procedure set forth in Example 252, but substituting 4,4,14 - trimethyl-5α-androstane-3β,17β-diol-7,11-dione-17-(4,5-dimethylhexanoate), for 4,4,14 - trimethyl - 5α - androstane - 3β,17β-diol-11-one-17-(4,5-dimethylhexanoate), yields 4,4,14-trimethyl-5α-androstane-17β-ol-3,7,11-trione-17-(4,5-dimethylhexanoate).

EXAMPLE 263

*4,4,14-trimethyl-5α-androstane-17β-ol-3,7,11,16-tetraone-17-(4,5-dimethylhexanoate)*

Following the procedure set forth in Example 252, but substituting 4,4,14 - trimethyl-5α-androstane-3β,16α,17β-triol-7,11-dione-17-(4,5-dimethylhexanoate), for 4,4,14-trimethyl-5α-androstane - 3β,17β - diol-11-one-17-(4,5-dimethylhexanoate), yields 4,4,14-trimethyl-5α-androstane-17β-ol-3,7,11,16-tetraone-17-(4,5-dimethylhexanoate).

EXAMPLE 264

*4,4,14-trimethyl-5α-androstane-17β-ol-3-one-17-(4,5-dimethylhexanoate)*

Following the procedures set forth in Example 252, but substituting 4,4,14 - trimethyl-5α-androstane-3β,17β-diol-17-(4,5-dimethylhexanoate), for 4,4,14-trimethyl-5α-androstane - 3β,17β-diol-11-one-17-(4,5-dimethylhexanoate, yields 4,4,14 - trimethyl-5α-androstane-17β-ol-3-one-17-(4,5-dimethylhexanoate).

EXAMPLE 265

*4,4,14-trimethyl-5α-androstane-17β-ol-3,16-dione-17-(4,5-dimethylhexanoate)*

Following the procedure set forth in Example 252, but substituting 4,4,14 - trimethyl-5α-androstane-3β,16α,17β-triol-17-(4,5-dimethylhexanoate), for 4,4,14-trimethyl-5α-androstane - 3β,17β - diol-11-one-17-(4,5-dimethylhexanoate) yields 4,4,14-trimethyl-5α-androstane-17β-ol-3,16-dione-17-(4,5-dimethylhexanoate).

EXAMPLE 266

*4,4,14-trimethyl-5α-androstane-17β-ol-3,7-dione-17-(4,5-dimethylhexanoate)*

Following the procedure set forth in Example 252, but substituting 4,4,14 - trimethyl-5α-androstane-3β,17β-diol-7-one-17-(4,5-dimethylhexanoate), for 4,4,14-trimethyl-5α - androstane - 3β,17β - diol - 11 - one-17-(4,5-dimethylhexanoate), yields 4,4,14-trimethyl-5α-androstane-17β-ol-3,7-dione-17-(4,5-dimethylhexanoate).

EXAMPLE 267

*4,4,14-trimethyl-5α-androstane-17β-ol-3,7,16-trione-17-(4,5-dimethylhexanoate)*

Following the procedure set forth in Example 252, but substituting 4,4,14 - trimethyl-5α-androstane 3β,16α,17β-triol-7-one-17-(4,5-dimethylhexanoate), for 4,4,14-trimethyl - 5α - androstane - 3β,17β-diol-11-one-17-(4,5-dimethylhexanoate), yields 4,4,14-trimethyl-5α-androstane-17β-ol-3,7,16-trione-17-(4,5-dimethylhexanoate).

EXAMPLE 268

*4,4,14-trimethyl-5α-androstane-17β-ol-3,11-dione (XXIX)*

A solution of 10 mg. of 4,4,14-trimethyl-5α-androstane-17β-ol-3,11-dione-17-(4,5-dimethylhexanoate) (XXV), in 10 ml. of 1 N ethanolic potassium hydroxide is held at room temperature for 15 hours. After neutralization with 20% sulfuric acid and evaporation of the solvent, the residue is taken up in ether, washed with water, dried over magnesium sulfate and the ether evaporated. Recrystallization from methanol yields 7 mg. of 4,4,14-trimethyl-5α-androstane-17β-ol-3,11-dione (XXIX).

EXAMPLE 269

*4,4,14-trimethyl-5α-androstane-17β-ol-3,11,16-trione (CXXV)*

Following the procedure set forth in Example 268, but substituting 4,4,14 - trimethyl - 5α - androstane-17β-ol-3,11,16-trione-17-(4,5-dimethylhexanoate) (CXXI) for 4,4,14 - trimethyl - 5α - androstane - 17β - ol - 3,11 - dione-17-(4,5-dimethylhexanoate) yields 4,4,14-trimethyl-5α-androstane-17β-ol-3,11,16-trione (CXXV).

EXAMPLE 270

*4,4,14-trimethyl-Δ⁸-5α-androstene-17β-ol-3-one*

Following the procedure set forth in Example 268, but substituting 4,4,14-trimethyl-Δ⁸-5α-androstene-17β-ol-3-one-17-(4,5-dimethylhexanoate), for 4,4,14-trimethyl-5α-androstane - 17β - ol-3,11-dione-17-(4,5-dimethylhexanoate), yields 4,4,14-trimethyl-Δ⁸-5α-androstene-17β-ol-3-one.

EXAMPLE 271

*4,4,14-trimethyl-Δ⁸-5α-androstene-17β-ol-3,16-dione*

Following the procedure set forth in Example 266, but substituting 4,4,14 - trimethyl-Δ⁸-5α-androstene-17β-ol-3,16-dione-17-(4,5-dimethylhexanoate), for 4,4,14-trimethyl - 5α - androstane - 17β-ol-3,11-dione-17 - (4,5 - dimethylhexanoate) yields 4,4,14-trimethyl-Δ⁸-5α-androstene-17β-ol-3,16-dione.

EXAMPLE 272

*4,4,14-trimethyl-5α-androstane-17β-ol-3,7,11-trione*

Following the procedure set forth in Example 268, but substituting 4,4,14-trimethyl-5α-androstane-17β-ol-3,7,11-trione-17-(5-methylhexanoate), for 4,4,14-trimethyl-5α-androstane-17β-ol-3,11-dione - 17 - (4,5-dimethylhexanoate) yields 4,4,14-trimethyl-5α-androstane-17β-ol-3,7,11-trione.

EXAMPLE 273

*4,4,14-trimethyl-5α-androstane-17β-ol-3,7,11,16-tetraone*

Following the procedure set forth in Example 268, but substituting 4,4,14 - trimethyl - 5α - androstane-17β-ol-3,7,11,16-tetraone-17-(5-methylhexanoate) for 4,4,14-trimethyl - 5α - androstane-17β-ol-3,11-dione-17-(4,5-dimethylhexanoate), yields 4,4,14-trimethyl-5α-androstane-17β-ol-3,7,11,16-tetraone.

EXAMPLE 274

*4,4,14α-trimethyl-5α-androstane-17β-ol-3,11-dione (XXIX)*

Following the procedure set forth in Example 268, but substituting 4,4,14-trimethyl-5α-androstane-17β-ol-3,11-dione-17-(5-methylhexanoate) for 4,4,14-trimethyl-5α-androstane - 17β - ol-3,11-dione-17-(4,5-dimethylhexanoate, yields 4,4,14-trimethyl-5α-androstane-17β-ol-3,11-dione (XXIX).

EXAMPLE 275

*4,4,14α-trimethyl-5α-androstane-17β-ol-3,11,16-trione (CXXV)*

Following the procedure set forth in Example 268, but substituting 4,4,14 - trimethyl - 5α - androstane-17β-ol-3,11,16-trione-17-(5-methylhexanoate), for 4,4,14-trimethyl - 5α - androstane-17β-ol-3,11-dione-17-(4,5-dimethylhexanoate), yields 4,4,14α-trimethyl-5α-androstane-17β-ol-3,11,16-trione (CXXV).

EXAMPLE 276

*4,4,14-trimethyl-Δ⁸-5α-androstene-17β-ol-3,7,11-trione*

Following the procedure set forth in Example 268, but substituting 4,4,14-trimethyl-Δ⁸-5α-androstene-17β-ol-3,7,11-trione-17-(4,5-dimethylhexanoate), for 4,4,14-trimethyl-Δ⁸-5α-androstane-17β-ol-3,11 - dione - 17 - (4,5-dimethylhexanoate), yields 4,4,14-trimethyl-Δ⁸-5α-androstene-17β-ol-3,7,11-trione.

EXAMPLE 277

*4,4,14-trimethyl-Δ⁸-5α-androstene-17β-ol-3,7,11,16-tetraone*

Following the procedure set forth in Example 268, but substituting 4,4,14-trimethyl-Δ⁸-5α-androstene-17β-ol-3,7,11,16 - tetraone - 17 - (4,5 - dimethylhexanoate), for 4,4,14 - trimethyl - 5α - androstane - 17β - ol - 3,11 - dione-17 - (4,5 - dimethylhexanoate), yields 4,4,14 - trimethyl-Δ⁸ - 5α - androstene - 17β - ol - 3,7,11,16 - tetraone.

EXAMPLE 278

*4,4,14-trimethyl-5α-androstane-17β-ol-3,7,11-trione*

Following the procedure set forth in Example 268, but substituting 4,4,14-trimethyl-5α-androstane-17β-ol-3,7,11-trione-17-(4,5-dimethylhexanoate), for 4,4,14-trimethyl-5α - androstane - 17β - ol - 3,11 - dione - 17 - (4,5 - dimethylhexanoate), yields 4,4,14-trimethyl-5α-androstane-17β-ol-3,7,11-trione.

EXAMPLE 279

*4,4,14-trimethyl-5α-androstane-17β-ol-3,7,11,16-tetraone*

Following the procedure set forth in Example 268, but substituting 4,4,14-trimethyl-5α-androstane-17β-ol-3,7,11,16-tetraone - 17 - (4,5-dimethylhexanoate), for 4,4,14-trimethyl-5α-androstane-17β - ol - 3,11 - dione - 17 - (4,5-dimethylhexanoate), yields 4,4,14-trimethyl-5α-androstane-17β-ol-3,7,11,16-tetraone.

EXAMPLE 280

*4,4,14-trimethyl-5α-androstane-17β-ol-3-one*

Following the procedure set forth in Example 268, but substituting 4,4,14-trimethyl-5α-androstane-17β-ol-3-one-17-(4,5-dimethylhexanoate), for 4,4,14-trimethyl-5α-androstane-17β-ol-3,11-dione-17 - (4,5 - dimethylhexanoate), yields 4,4,14-trimethyl-5α-androstane-17β-ol-3-one.

EXAMPLE 281

*4,4,14-trimethyl-5α-androstane-17β-ol-3-16-dione*

Following the procedure set forth in Example 268, but substituting 4,4,14 - trimethyl-5α-androstane-17β-ol-3,16-dione-17-(4,5-dimethylhexanoate), for 4,4,14 - trimethyl-5α - androstane - 17β - ol - 3,11 - dione - 17 - (4,5 - dimethylhexanoate), yields 4,4,14-trimethyl-5α-androstane-17β-ol-3,16-dione.

EXAMPLE 282

*4,4,14-trimethyl-5α-androstane-17β-ol-3,7-dione*

Following the procedure set forth in Example 268, but substituting 4,4,14 - trimethyl - 5α- androstane-17β-ol-3,7-dione-17-(4,5-dimethylhexanoate), for 4,4,14-trimethyl-5α - androstane - 17β - ol - 3,11 - dione - 17 - (4,5-dimethylhexanoate) yields 4,4,14-trimethyl-5α-androstane-17β-ol-3,7-dione.

EXAMPLE 283

*4,4,14-trimethyl-5α-androstane-17β-ol-3,7,16-trione*

Following the procedure set forth in Example 268, but substituting 4,4,14-trimethyl-5α-androstane-17β-ol-3,7,16-trione-17-(4,5-dimethylhexanoate), for 4,4,14-trimethyl-5α - androstane - 17β - ol - 3,11 - dione - 17 - (4,5-dimethylhexanoate) yields 4,4,14-trimethyl-5α-androstane-17β-ol-3,7,16-trione.

EXAMPLE 284

*4,4,14-trimethyl-5α-androstane-3β,11β,17β-triol-3,17-diacetate*

A solution of 100 mg. of 4,4,14-trimethyl-5α-androstane-3β,17β-diol-11-one-3,17-diacetate (XXVIII) in 10 ml. of tetrahydrofuran is added to a suspension of 300 mg. of lithium borohydride in 20 ml. of tetrahydrofuran and is held at room temperature for 3 hours. The excess lithium borohydride is decomposed by the addition of 10 ml. of 10% aqueous acetic acid, the tetrahydrofuran evaporates and the residue extracted with ether. The ether extract is washed with water, dried over magnesium sulfate and evaporated. The crude product obtained upon recrystallization from methanol yields 45 mg. of 4,4,14-trimethyl-5α-androstane-3β,11β,17β-triol-3,17-diacetate.

EXAMPLE 285

*4,4,14-trimethyl-5α-androstane-3β,11β,16α,17β-tetraol-3,16,17-triacetate*

Following the procedure set for in Example 284, but substituting 4,4,14-trimethyl - 5α - androstane-3β,16α,17β-triol-11-one-3,16,17-triacetate, for 4,4,14 - trimethyl - 5α-androstane-3β,17β-diol-11-one-3,17-diacetate, yields 4,4,14 - trimethyl - 5α - androstane - 3β,11β,16α,17β - tetraol-3,16,17-triacetate.

EXAMPLE 286

*4,4,14-trimethyl-Δ$^8$-5α-androstene-3β,7,11β,17β-tetraol-3,17-diacetate*

Following the procedure set forth in Example 284, but substituting 4,4,14-trimethyl-Δ$^8$-5α-androstene-3β,17β-diol-7,11-dione-3,17-diacetate, for 4,4,14-trimethyl-5α-androstane-3β,17β-diol-11-one-3,17-diacetate, yields 4,4,14-trimethyl - Δ$^8$ - 5α - androstene - 3β,7,11β,17β - tetraol - 3,17-diacetate.

EXAMPLE 287

*4,4,14-trimethyl-Δ$^8$-5α-androstene-3β,7,11β,16α,17β-pentol-3,16,17-triacetate*

Following the procedure set forth in Example 284, but substituting 4,4,14-trimethyl-Δ$^8$-5α-androstene-3β,16α,17β-triol-7,11-dione-3,16,17-triacetate, for 4,4,14-trimethyl-5α-androstane-3β,17β-diol-11-one-3,17 - diacetate, yields 4,4,14 - trimethyl - Δ$^8$ - 5α - androstene - 3 β,7,11β,16α,17β-pentol-3,16,17-triacetate.

EXAMPLE 288

*4,4,14-trimethyl-5α-androstane-3β,7,11β,17β-tetraol-3,17-diacetate*

Following the procedure set forth in Example 284, but substituting 4,4,14-trimethyl-5α-androstane-3β,17β-diol-7,11-dione-3,17-diacetate, for 4,4,14 - trimethyl - 5α - androstene-3β,17β-diol-11-one-3,17-diacetate, yields 4,4,14-trimethyl - 5α - androstane - 3β,7,11β,17β - tetraol - 3,17-diacetate.

EXAMPLE 289

*4,4,14-trimethyl-5α-androstane-3β,7,11β,16α,17β-pentol-3,16,17-triacetate*

Following the procedure set forth in Example 284, but substituting 4,4,14-trimethyl - 5α - androstane-3β,16α,17β-triol-7,11-dione-3,16,17-triacetate, yields 4,4,14-trimethyl-5α-androstane-3β,17β-diol-11-one-3,17-diacetate, yields 4,4,14 - trimethyl - 5α - androstane - 3β,7,11β,16α, 17β-pentol - 3,16,17 - triacetate.

EXAMPLE 290

*4,4,14-trimethyl-Δ$^8$-5α-androstene-3β,7,17β-triol-3,17-diacetate*

Following the procedure set forth in Example 284, but substituting 4,4,14-trimethyl - Δ$^8$-5α - androstene-3β,17β-diol-7-one-3,17-diacetate, for 4,4,14-trimethyl-5α-androstane-3β,17β-diol-11-one - 3,17 - diacetate, yields 4,4,14-trimethyl-Δ$^8$-5α-androstene-3β,7,17β-triol-3,17-diacetate.

EXAMPLE 291

*4,4,14-trimethyl-Δ$^8$-5α-androstene-3β,7,16α,17β-tetraol-3,16-triacetate*

Following the procedure set forth in Example 284, but substituting 4,4,14 - trimethyl - Δ$^8$ - 5α-androstene-3β,16α,17β-triol-7-one - 3,16,17 - triacetate for 4,4,14-trimethyl-5α-androstane - 3β,17β - diol - 11 - one - 3,17-diacetate, yields 4,4,14-trimethyl - Δ$^8$-5α - androstene-3β,7,16α,17β-tetraol-3,16-triacetate.

EXAMPLE 292

*4,4,14-trimethyl-5α-androstane-3β,7,17β-triol-3,17-diacetate*

Following the procedure set forth in Example 284, but substituting 4,4,14-trimethyl-5α-androstane - 3β,17β-diol-7-one-3,17-diacetate, for 4,4,14-trimethyl-5α-androstane-3β,17β-diol-11-one-3,17-diacetate, yields 4,4,14-trimethyl-5α-androstane-3β,7,17β-triol-3,17-diacetate.

EXAMPLE 293

*4,4,14-trimethyl-5α-androstane-3β,7,16α,17β-tetraol-3,16,17-triacetate*

Following the procedure set forth in Example 284, but substituting 4,4,14 - trimethyl-5α-androstane-3β,16α,17β-triol-7-one - 3,16,17 - triacetate, for 4,4,14-trimethyl-5α-androstane-3β,17β-diol-11-one - 3,17 - diacetate, yields 4,4,14-trimethyl - 5α - androstane - 3β,7,16α,17β-tetraol-3,16,17-triacetate.

EXAMPLE 294

*Propionyl eburicoic acid*

Following the procedure set forth in Example 1, but substituting propionic anhydride for acetic anhydride, yields propionyl eburicoic acid.

Similarly, by substituting other acid anhydrides or acyl halides for the propionic anhydride in the procedure of Example 1, the corresponding 3-esters are formed. Thus, butyric anhydride and benzoyl chloride yield butyryl eburicoic acid and benzoyl eburicoic acid.

This invention may be variously otherwise embodied within the scope of the appended claims.

What is claimed is:
1. Methyl-3-acetyl-7-ethylenedithio-eburicane-3β-ol-11-one-21-oate.
2. Eburicane-3β-ol-11-one-21-oic acid.
3. Methyl eburicane-3β-ol-11-one-21-oate.
4. 3-acetyl-eburicane-3β-ol-11-one-21-oic acid.
5. Methyl-3-acetyl-eburicane-3β-ol-11-one-21-oate.
6. 3-acetyl-eburicane-3β-ol-7-one-21-oic acid.
7. Methyl-eburicane-3β,11β-diol-21-oate.
8. Methyl-3-acetyl-eburicane-3β,11β-diol-21-oate.
9. Methyl-3-acetyl-Δ$^{9(11)}$-eburicene-3β-ol-21-oate.
10. 3-acetyl-eburicane-3β-ol-11-one-21-oyl chloride.
11. 3-acetyl-eburicane-3β-ol-21-al-11-one.
12. A steroid selected from the group consisting of 3-acetyl - 21 - (N-pyrrolidyl)-Δ$^{20}$-eburicene-3β-ol-11-one; 3-acetyl - 21 - (N-piperidyl)-Δ$^{20}$-eburicene-3β-ol-11-one; and 3-acetyl - 21-(N-morpholyl) - Δ$^{20}$ - eburicene-3β-ol-11-one.
13. 3-acetyl-21-noreburicane-3β-ol-11,20-dione.
14. 21-noreburicane-3β-ol-11,20-dione.
15. 4,4,14-trimethyl - 5α - androstane - 3β,17β-diol-11-one-17-(4,5-dimethylhexanoate).
16. 4,4,14 - trimethyl - 5α - androstane - 3β,17β-diol-11-one-3-acetate-17-(4,5-dimethylhexanoate).
17. 4,4,14 - trimethyl - 5α - androstane - 3β,11β,17β-triol-3,17-diacetate.
18. 4,4,14 - trimethyl - 5α - androstane - 17β-ol-3,11-dione.
19. 4,4,14 - trimethyl - 5α - androstane - 17β-ol-3,11-dione-17-(4,5-dimethylhexanoate).

20. A compound selected from the group consisting of steroids of the formulae:

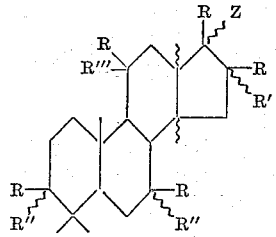

and

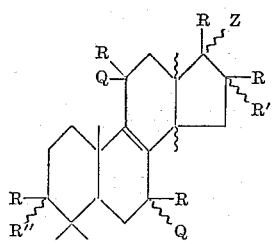

wherein R is hydrogen; Z is selected from the group consisting of hydroxy, acyloxy wherein the acyl radical is of a hydrocarbon carboxylic acid of less than twelve carbon atoms, and alkanoyloxy; and together Z and R is oxo; each R" is selected from the group consisting of hydroxy and acyloxy wherein the acyl radical is of a hydrocarbon carboxylic acid of less than twelve carbon atoms, and together R and R" is oxo; R' is selected from the group consisting of hydrogen, hydroxy and acyloxy wherein the acyl radical is of a hydrocarbon carboxylic acid of less than twelve carbon atoms, and together R and R' is oxo; each Q is hydroxy; and together Q and R is oxo; and R''' is selected from the group consisting of hydrogen and hydroxy; and together R and R''' is oxo.

21. A compound selected from the group consisting of steroids of the formulae:

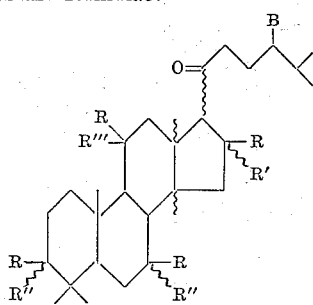

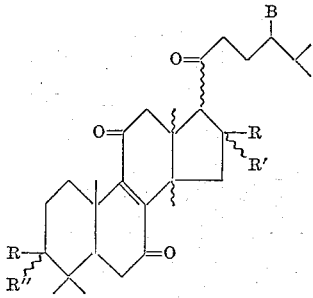

and

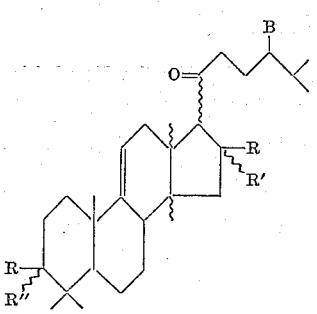

wherein B is selected from the group consisting of hydrogen and lower alkyl; and R, R', R" and R''' are as defined in claim 20.

22. A compound selected from the group consisting of steroids of the formulae:

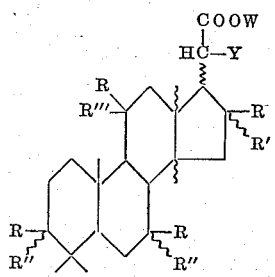

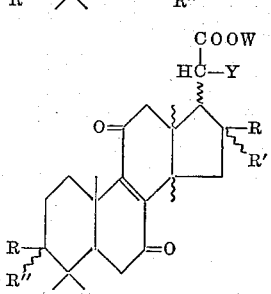

and

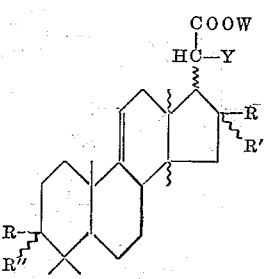

wherein Y is selected from the group consisting of alkyl and keto alkyl, wherein the alkyl is of about four carbon atoms to about eight carbon atoms; W is selected from the group consisting of hydrogen and lower alkyl; and R, R', R" and R''' are as defined in claim 20.

23. A compound selected from the group consisting of steroids of the formulae:

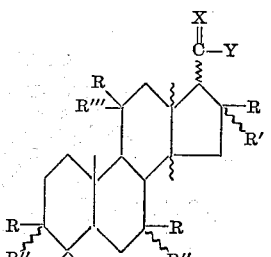

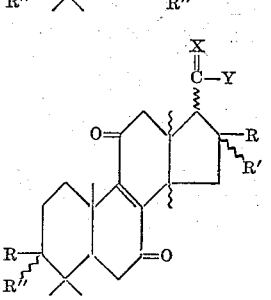

and

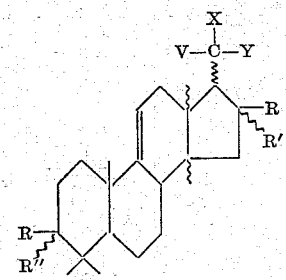

wherein R is hydrogen; V is hydrogen, X is the monovalent radical of a secondary amine selected from the group consisting of morpholyl, piperidyl and pyrrolidyl, and together X and V is oxo; Y is selected from the group consisting of alkyl and ketoalkyl, wherein the alkyl is of about four carbon atoms to about eight carbon atoms; and R', R" and R'" are as defined in claim 20.

24. A compound selected from the group consisting of steroids of the formulae:

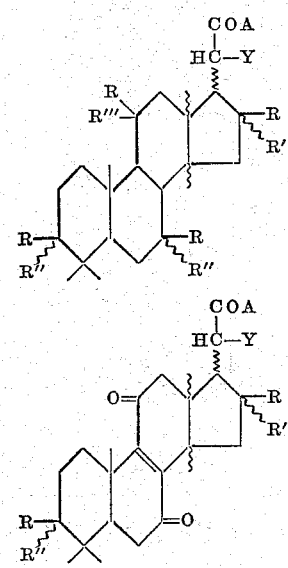

and

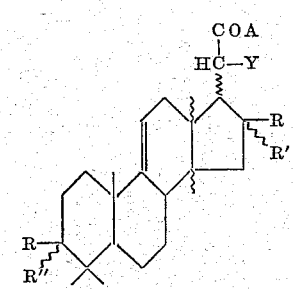

wherein A is selected from the group consisting of hydrogen and halogen; Y is selected from the group consisting of alkyl and ketoalkyl, wherein the alkyl is of about four carbon atoms to about eight carbon atoms; and R, R', R" and R'" are as defined in claim 20.

25. A compound selected from the group consisting of steroids of the formulae:

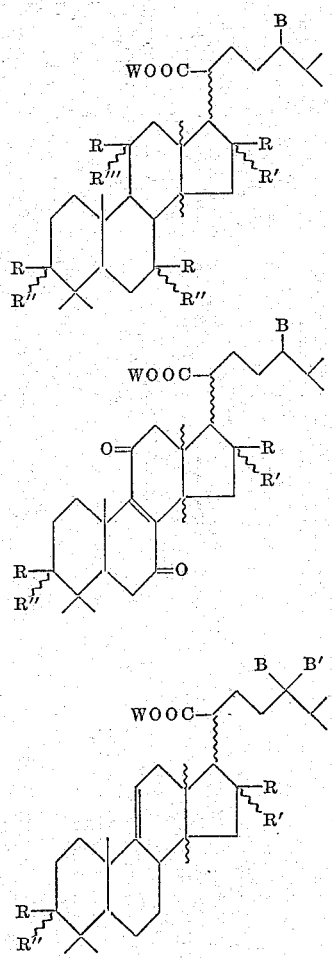

wherein B is selected from the group consisting of hydrogen and hydroxy; B' is hydrogen; and together B and B' is oxo; and W, R, R', R" and R'" are as defined in claim 22.

26. A compound selected from the group consisting of steroids of the formula:

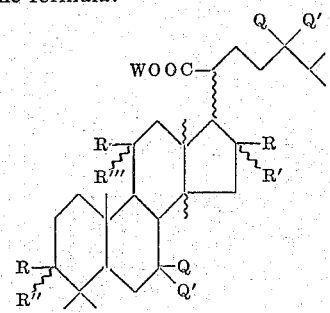

wherein Q' is hydrogen; each Q is selected from the group consisting of hydrogen and lower alkyl; and together Q and Q' is selected from the group consisting of oxo and ethylenedithio; and W, R, R', R" and R'" are as defined in claim 22.

References Cited in the file of this patent

Biellman et al.: "Bull. Soc. Chim. France," No. 2, February 1962, pages 341–344.

Brewis et al.: "Journal Chem. Soc.," July 1962, pages 2763–66.

LEWIS GOTTS, *Primary Examiner.*

UNITED STATES PATENT OFFICE
CERTIFICATE OF CORRECTION

Patent No. 3,169,957                       February 16, 1965

Josef Fried et al.

It is hereby certified that error appears in the above numbered patent requiring correction and that the said Letters Patent should read as corrected below.

Column 1, line 11, for "physiological" read -- physiologically --; line 62, for "acryloxy" read -- acyloxy --; column 2, line 8, for "-17-nortestosterone" read -- -19-nortestosterone --; same column 2, lines 35 to 44, the formula should appear as shown below instead of as in the patent:

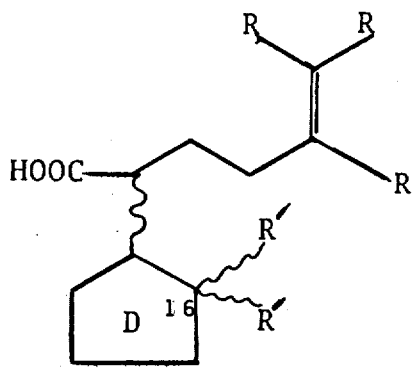

column 12, line 56, for "obtain" read -- obtained --; column 22, line 38, for "an" read -- and --; column 25, line 37, for "-3β-7,11-dione" read -- -3β-ol-7,11-dione --; column 27, line 41, for "-7-ethylenedithio-3β-" read -- -7-ethylenedithio-eburicane-3β- --; line 54, for "5.94" read -- 5.84 --; column 28, line 67, for "5,78" read -- 5.78 --; column 29, line 21, after "acid", in italics, insert -- (CXXVII) --, in italics; line 32, for "either" read -- ether --; line 44, after "21-oate", in italics, insert -- (CXXVIII) --, in italics; same column 29, line 75, for "(XXXIII)" read -- (XXXII) --; column 32, line 61, for "-lanostane-" read -- -lanostane- --; column 54, line 68, for "-norΔ$^8$-" read -- -nor-Δ$^8$- --; column 55, lines 56 and 57, for "-eburicene-" read -- -eburicane- --; column 56, line 29, for "3,16-diacetyl-21-nor-eburicane-3β,16α-diol-7," read -- 3-acetyl-21-nor-eburicane-3β-ol-7, --; column 58, line 6, for "-dimethyl-hexanoate", in italics, read -- -dimethylhexanoate --, in italics; line 19, for 3,169,957

"-trimtehyl-" read -- -trimethyl- --; same column 58, line 27, for "-nore-buricane-" read -- -nor-eburicane- --.

Signed and sealed this 17th day of August 1965.

(SEAL)
Attest:

ERNEST W. SWIDER  
Attesting Officer

EDWARD J. BRENNER  
Commissioner of Patents